(12) United States Patent
Rizzolatti et al.

(10) Patent No.: US 12,542,496 B2
(45) Date of Patent: Feb. 3, 2026

(54) HYBRID POWER CONVERTER AND POWER CONVERSION

(71) Applicant: Infineon Technologies Austria AG, Villach (AT)

(72) Inventors: Roberto Rizzolatti, Villach (AT); Mario Ursino, Villach (AT)

(73) Assignee: Infineon Technologies Austria AG, Villach (AT)

( * ) Notice: Subject to any disclaimer, the term of this patent is extended or adjusted under 35 U.S.C. 154(b) by 182 days.

(21) Appl. No.: 18/219,816

(22) Filed: Jul. 10, 2023

(65) Prior Publication Data

US 2023/0353058 A1    Nov. 2, 2023

Related U.S. Application Data

(63) Continuation-in-part of application No. 17/178,472, filed on Feb. 18, 2021, now Pat. No. 11,728,721.

(51) Int. Cl.
| | |
|---|---|
| *H02M 3/155* | (2006.01) |
| *H02M 1/00* | (2006.01) |
| *H02M 3/07* | (2006.01) |
| *H02M 3/158* | (2006.01) |
| *H02M 3/335* | (2006.01) |

(52) U.S. Cl.
CPC ..... *H02M 3/33592* (2013.01); *H02M 1/0058* (2021.05); *H02M 3/07* (2013.01); *H02M 3/1586* (2021.05)

(58) Field of Classification Search
CPC ............. H02M 1/0067; H02M 1/0074; H02M 1/0077; H02M 1/0083; H02M 1/0093; H02M 3/01; H02M 3/155
See application file for complete search history.

(56) References Cited

U.S. PATENT DOCUMENTS

| | | | |
|---|---|---|---|
| 7,071,660 B2* | 7/2006 | Xu | H02M 3/156 |
| | | | 323/272 |
| 7,872,886 B2 | 1/2011 | Xu et al. | |
| 9,006,930 B2* | 4/2015 | Jang | H02J 4/00 |
| | | | 307/82 |
| 9,425,693 B2 | 8/2016 | Wang et al. | |
| 10,164,544 B2* | 12/2018 | Ye | H02M 1/08 |
| 10,608,539 B1 | 3/2020 | Huang | |

(Continued)

FOREIGN PATENT DOCUMENTS

CN    102484427 A    5/2012

OTHER PUBLICATIONS

European Office Action, EP 22 157 159.9, Feb. 24, 2025, pp. 1-8.

(Continued)

*Primary Examiner* — Gary L Laxton
(74) *Attorney, Agent, or Firm* — Armis IP Law, LLC

(57) ABSTRACT

A voltage converter includes a first power converter and a second power converter. The first power converter produces an intermediate voltage and a first output current derived from an input voltage. The first power converter supplies the intermediate voltage to the second power converter. The second power converter produces a second output current based on the intermediate voltage received from the first power converter. An output node of the voltage converter outputs a sum of the first output current and the second output current to produce an output voltage.

25 Claims, 38 Drawing Sheets

(56) References Cited

U.S. PATENT DOCUMENTS

| | | |
|---|---|---|
| 10,804,798 B1 | 10/2020 | Rizzolatti et al. |
| 11,152,853 B2 | 10/2021 | Li et al. |
| 11,532,987 B2 | 12/2022 | Han et al. |
| 11,728,721 B2 * | 8/2023 | Saggini ............... H02M 1/0058 323/282 |
| 2009/0206804 A1 | 8/2009 | Xu et al. |
| 2011/0080146 A1 * | 4/2011 | Li ......................... H02M 3/285 323/237 |
| 2018/0183335 A1 | 6/2018 | Fan et al. |
| 2018/0212535 A1 | 7/2018 | Xia et al. |
| 2020/0358352 A1 | 11/2020 | Rizzolatti et al. |
| 2021/0013798 A1 | 1/2021 | Giuliano |
| 2022/0166314 A1 | 5/2022 | Chen et al. |
| 2022/0181967 A1 | 6/2022 | Petersen |
| 2022/0209664 A1 | 6/2022 | Zhang et al. |
| 2022/0209684 A1 | 6/2022 | Jin et al. |

OTHER PUBLICATIONS

Extended EP Search Report, EP 22 15 7159, Jul. 1, 2022, pp. 1-9.
Li, et al., "A Novel Hybrid 4:1 Step Down Converter Using an Autotransformer with DC Winding Current", Oct. 11, 2020, pp. 173-180, 2020 IEEE Energy Conversion Congress and Exposition.
Office Action, 202210145223.1, Aug. 30, 2025, pp. 1-15.

* cited by examiner

T0 to T1

T1 to T2
T3 to T4

T5 to T6

HYBRID POWER CONVERTER AND POWER CONVERSION

RELATED APPLICATION

This application is a continuation in part application of earlier filed U.S. patent application Ser. No. 17/187,472 entitled "HYBRID POWER CONVERTER AND POWER CONVERSION," filed on Feb. 18, 2021, the entire teachings of which are incorporated herein by this reference.

BACKGROUND

As its name suggests, a conventional switched-capacitor DC-DC converter converts a received DC input voltage into a DC output voltage.

In one conventional application, the input voltage to the conventional switched-capacitor converter falls in a range between 40 VDC to 60 VDC. In such an instance, switches in the switched-capacitor converter are controlled to transfer charge stored in respective capacitors, resulting in conversion of the input voltage such as a 48 VDC to an output voltage such as 12 VDC for a so-called conventional 4:1 switched-capacitor converter. In other words, a conventional switched-capacitor converter can be configured to convert a 48 VDC voltage into a 12 VDC voltage.

BRIEF DESCRIPTION

Implementation of clean energy (or green technology) is very important to reduce our impact as humans on the environment. In general, clean energy includes any evolving methods and materials to reduce an overall toxicity on the environment from energy consumption.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, wireless base stations, etc. In certain instances, energy is stored in a respective one or more battery resource. Regardless of whether energy is received from green energy sources or non-green energy sources, it is desirable to make most efficient use of raw energy (such as storage and subsequent distribution) provided by such systems to reduce our impact on the environment. This disclosure contributes to reducing our carbon footprint and better use of energy via more efficient energy conversion.

Examples herein include novel ways of providing power to a load.

For example, examples herein include an apparatus such as a power supply. The power supply (or apparatus) includes: a first power converter that produces an intermediate voltage (supply voltage, auxiliary voltage, etc.) and a first output current derived from a received input voltage. The first power converter supplies the intermediate voltage to the second power converter. The second power converter produces a second output current based on the intermediate voltage received from the first power converter. An output node of the power converter outputs a summation of the first output current and the second output current to produce an output voltage.

In one example, a magnitude of the intermediate voltage is a less-than-all fraction of a magnitude of the input voltage.

In accordance with further examples, the input voltage supplies power to the first power converter and the second power converter. The first power converter derives the first output current from a first portion of the power supplied by the input voltage to the voltage converter. The second power converter derives the second output current from a second portion of the power supplied by the input voltage to the voltage converter.

In accordance with further examples, both the first power converter and the second power converter are referenced with respect to a common ground reference voltage associated with the input voltage and the output voltage.

In still further examples, the first power converter is a regulated power converter; the second power converter is an unregulated power converter. Alternatively, the first power converter is an unregulated power converter; the second power converter is a regulated power converter.

In yet further example, a magnitude of the first output current is greater than a magnitude of the second output current.

Further examples herein include an energy storage component coupled between the first power converter and the second power converter. The energy storage component performs one or more operations. In one example, during a first portion of a respective control cycle, the energy storage component facilitates conversion of the input voltage into the first output current. The energy storage component is also charged during the first portion of the control cycle. During a second portion of the respective control cycle of converting the input voltage into the output voltage, the energy storage component provides (outputs) the intermediate voltage from the energy storage component to the second power converter.

In accordance with further examples, the first power converter includes multiple switches that: i) during a first portion of a switch control cycle, connect an energy storage component in a series circuit path of the first power converter to support conversion of the input voltage into the output voltage; and ii) during a second portion of the switch control cycle, couple the energy storage component to a ground reference voltage and output the intermediate voltage from the energy storage component to the second power converter.

Yet further examples herein include a controller. In one example, the controller is operative to monitor a magnitude of the output voltage with respect to a setpoint voltage and adjust a magnitude of the second output current derived from the intermediate voltage to maintain the magnitude of the output voltage at the setpoint voltage.

In one example, the first power converter or the second power converter is a resonant power converter.

In still further examples, the first power converter outputs the intermediate voltage (supply voltage) to the second power converter from a capacitor switched in and out of a resonant circuit path of the first power converter. In one example, the capacitor is charged in a first mode in which the capacitor is switched into the resonant circuit path; the capacitor is discharged in a second mode in which the capacitor is switched out of the resonant circuit path. As further discussed herein, the capacitor outputs the intermediate voltage to the second power converter during the second mode; the second power converter converts the intermediate voltage into the second output current during the second mode.

In further examples, the second power converter includes a first switch and a second switch disposed in series between an energy storage component (such as a capacitor or other suitable component) outputting the intermediate voltage and a common ground reference associated with the first power converter and the second power converter. The second power converter also includes an inductor providing connectivity between: i) a node coupling the first switch and the second switch and ii) the output node.

Still further examples include a controller that monitors a magnitude of the summation output current (such as first output current and second output current). The controller adjusts the magnitude of the second output current such that the summation of the first output current and the second output current equals a target output current value.

Further examples herein include adjusting the magnitude of the second output current to equalize the summation of first output current and the second output current of a first voltage converter to a summation of total current supplied by a second voltage converter to the load. In one example, the second voltage converter includes a third power converter and a fourth power converter that contribute to powering the load via the output voltage.

Still further examples herein include an energy storage component coupled between the first power converter and the second power converter. During a first portion of a respective control cycle, the energy storage component provides the intermediate voltage to the second power converter; during a second portion of the respective control cycle, the energy storage component is charged.

In yet further examples, the power supply as discussed herein includes a controller operative to regulate a magnitude of the output voltage with respect to a setpoint voltage.

Yet another example as discussed herein includes an apparatus comprising: a first power converter operative to: i) derive a first output current from an input voltage, and ii) convert the input voltage into an intermediate voltage; a second power converter operative to produce a second output current based on the intermediate voltage; and an output node operative to output a summation of the first output current and the second output current to produce a first output voltage.

The first power converter can be configured to derive the first output current via current conveyed through a capacitor. The capacitor (a.k.a., energy storage device) stores the intermediate voltage. A third power converter produces a second output voltage based at least in part on the current conveyed through the capacitor.

The first output voltage may be regulated with respect to a setpoint reference voltage; the second output voltage may be unregulated. Alternatively, the second output voltage may be regulated with respect to a setpoint reference voltage; and the first output voltage may be unregulated.

Yet further, the apparatus as discussed herein can be configured to include a controller operative to produce a first switch control signal to control a first switch in which switching of the first switch ON and OFF based on the first switch control signal generates the first output voltage. The first switch control signal can be configured to control a second switch in which switching of the second switch ON and OFF based on the first switch control signal generates a second output voltage.

In one example, the apparatus as discussed herein includes a capacitor to store the intermediate voltage. The apparatus includes a controller operative to control a switch to convert energy received from the capacitor into a second output voltage.

Yet further, in an example, the first power converter includes a capacitor to store the intermediate voltage; the capacitor can be a flying capacitor disposed in a resonant circuit path of the first power converter. In such an instance, the flying capacitor is switched in and out of the resonant circuit path to produce the first output current and generate the intermediate voltage.

Still further, the apparatus can be configured to include an energy storage device operative to store the intermediate voltage. The first power converter is operative to produce the first output current based at least in part via current supplied from a first node of the energy storage device; and the second power converter is operative to receive the intermediate voltage from a second node of the energy storage device while the first node is switched to a ground reference voltage.

As previously discussed, the apparatus as discussed herein can be configured to include an energy storage device to store the intermediate voltage. A controller can be configured to switch the energy storage device in and out of a respective circuit path of the first power converter. The energy storage device is charged while switched into the circuit path; the energy storage device is discharged while switched out of the circuit path.

The output node of the power supply (apparatus) as previously discussed may be a first output node. The apparatus can be configured to include a first switch coupled to the energy storage device and controlled by the controller; the first switch is operative to produce a second output voltage outputted from a second output node via energy received from the energy storage device while the energy storage device is switched in the circuit path during a first portion of a control cycle. The controller can be configured to prevent a flow of energy through the first switch to the second output node during a second portion of the control cycle during which the energy storage device is switched out of the circuit path. The circuit path as discussed herein can be configured to include a second switch disposed in series with the energy storage device; the controller can be configured to activate the second switch to an ON-state to switch the energy storage device into the circuit path.

In accordance with yet further examples as discussed herein, a method includes: via a first power converter: i) deriving a first output current from an input voltage, and ii) converting the input voltage into an intermediate voltage; via a second power converter, producing a second output current based on the intermediate voltage; and outputting a summation of the first output current and the second output current from an output node.

The method further includes, via the first power converter, deriving the first output current via current conveyed through a capacitor, the capacitor operative to store the intermediate voltage. Via a third power converter, the method includes producing a second output voltage based at least in part on the current conveyed through the capacitor.

These and other more specific examples are disclosed in more detail below.

Note that although examples as discussed herein are applicable to power converters, the concepts disclosed herein may be advantageously applied to any other suitable topologies as well as general power supply control applications.

Note that any of the resources as discussed herein can include one or more computerized devices, controller, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different examples as described herein.

Yet other examples herein include software programs to perform the steps and operations summarized above and disclosed in detail below. One such example comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, examples herein are directed to methods, systems, computer program products, etc., that support operations as discussed herein.

One example herein includes a computer readable storage medium and/or system having instructions stored thereon. The instructions, when executed by computer processor hardware, cause the computer processor hardware (such as one or more co-located or disparately located processor devices) to: control a first power converter to produce a first output current derived from an input voltage; control a second power converter to produce a second output current based on a supply voltage (a.k.a., intermediate voltage) received from the first power converter; and output a summation of the first output current and the second output current from an output node of a voltage converter to produce an output voltage.

The ordering of the steps above has been added for clarity sake. Note that any of the processing operations as discussed herein can be performed in any suitable order.

Other examples of the present disclosure include software programs and/or respective hardware to perform any of the method example steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of implementing one or more inductor components to deliver current to a load. However, it should be noted that examples herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of examples herein (BRIEF DESCRIPTION OF EXAMPLES) purposefully does not specify every example and/or incrementally novel aspect of the present disclosure or claimed invention(s). Instead, this brief description only presents general examples and corresponding points of novelty over conventional techniques. For additional details and/or possible perspectives (permutations) of the invention(s), the reader is directed to the Detailed Description section (which is a summary of examples) and corresponding figures of the present disclosure as further discussed below.

Figure 1:
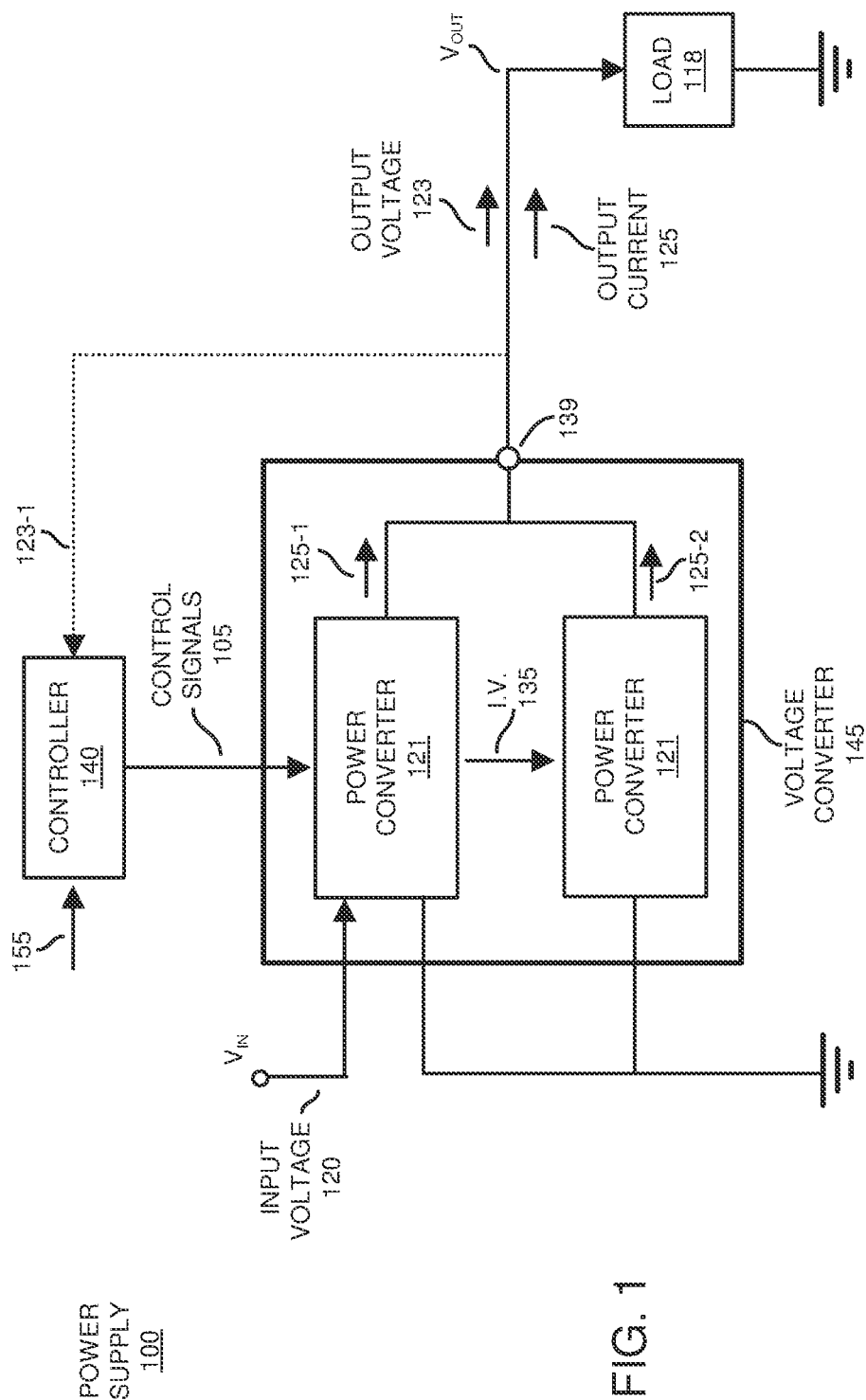
FIG. 1 is an example general diagram illustrating a power converter according to examples herein.

The foregoing and other objects, features, and advantages of the invention will be apparent from the following more particular description of preferred examples herein, as illustrated in the accompanying drawings in which like reference characters refer to the same parts throughout the different views. The drawings are not necessarily to scale, with emphasis instead being placed upon illustrating the examples, principles, concepts, etc.

DETAILED DESCRIPTION

Examples herein include novel ways of implementing a power supply (voltage converter) that powers a load. For example, in one example, the voltage converter includes a first power converter and a second power converter. The first power converter produces an intermediate voltage and a first output current derived from a received input voltage. The first power converter supplies the intermediate voltage to the second power converter. The second power converter produces a second output current based on the intermediate voltage received from the first power converter. An output node of the voltage converter outputs a sum of the first output current and the second output current to produce an output voltage. A power supply can be configured to any number of one or more voltage converters in parallel to power a load.

Now, more specifically, FIG. 1 is an example general diagram of a power system (power supply) including multiple power converters according to examples herein.

In this example, the power supply 100 includes controller 140 and voltage converter 145. Voltage converter 145 includes a first power converter 121 and a second power converter 122.

The first power converter 121 produces intermediate voltage 135 and first output current 125-1, both of which are derived from the input voltage 120. The first power converter 121 supplies the intermediate voltage 135 to the second power converter 122.

The second power converter 122 produces a second output current 125-2 based on the intermediate voltage 135 (a.k.a., supply voltage, auxiliary voltage, etc.) received from the first power converter 121.

The output node 139 of the voltage converter 145 outputs a summation of the first output current 125-1 and the second output current 125-2 to produce an output voltage 123 to power the load 118.

Accordingly, the output voltage 123 supplies output current 125 (such as the sum of output current 125-1 and output current 125-2) to the dynamic load 118. As further discussed herein, one of the power converters in the voltage converter 145 can be configured to provide voltage regulation such that the output voltage 123 is regulated within a desired range.

In further examples, a magnitude of the intermediate voltage 135 is a less-than-all fraction of a magnitude of the input voltage 120. For example, a magnitude of the intermediate voltage 135 is less than the magnitude of the input voltage 120.

As further shown, in one example, both the first power converter 121 and the second power converter 122 are referenced with respect to a common ground voltage associated with the input voltage 120 (such as a first DC voltage) and the output voltage 123 (such as a second DC voltage).

Note further that one of the power converters associated with the voltage converter 145 can be a regulated power converter. For example, in one example, the first power converter 121 is an unregulated power converter; the second power converter 122 is a regulated power converter. In accordance with further examples, alternatively, the first power converter of voltage converter 145 is a regulated power converter 121; the second power converter of voltage converter 145 is an unregulated power converter 122.

The contribution of current supplied by each of the power converters in voltage converter 145 can vary depending on the example. In one example, a magnitude of the first output current 125-1 is greater than a magnitude of the second output current 125-2.

In accordance with further examples, the input voltage 120 supplies power to the first power converter 121 and the second power converter 122. The first power converter 121 derives the first output current 125-1 from a first portion of the power supplied by the input voltage 120 to the voltage converter 145. The second power converter 122 derives the second output current 125-2 from a second portion of the power supplied by the input voltage 120 to the voltage converter 145.

As further shown in FIG. 1, examples of the power supply 100 include a controller 140. In one example, the controller 140 monitors a magnitude of the output voltage 123 (such as via an output voltage feedback signal) with respect to a setpoint voltage 155. The controller 140 controls operation of the first power converter 121 and the second power converter 122. For example, in furtherance of regulating the output voltage feedback signal 123-1 (such as the output voltage 123 or signal derived from the output voltage 123) to the desired setpoint voltage 155, the controller 140 adjusts a magnitude of the second output current 125-2 derived from the intermediate voltage 135 to maintain the magnitude of the output voltage 123 at or around the desired setpoint voltage 155.

Additional variations of examples herein are further discussed below.

Figure 2:
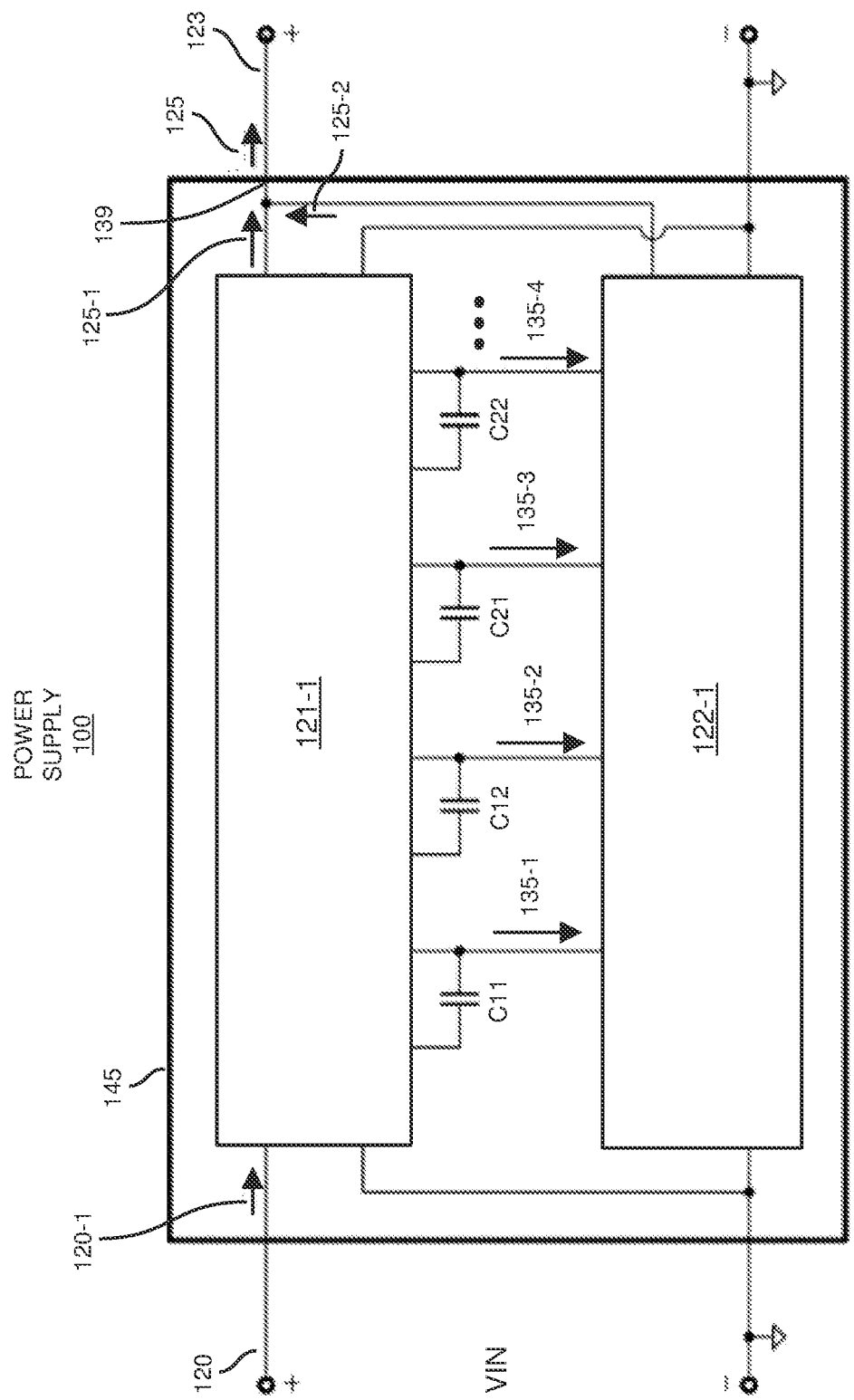
FIG. 2 is an example diagram illustrating a voltage converter including an unregulated power converter and regulated power converter according to examples herein.

FIG. 2 is an example diagram illustrating a hybrid power converter including an unregulated power converter and regulated power converter according to examples herein.

Examples as described herein include a high bandwidth voltage converter 145 providing voltage regulation, very high power density, and high transient load response. The voltage converter 145 also allows the use of non-isolating converters along the entire power conversion.

In this example, the power supply 100 in FIG. 2 (and more specifically voltage converter 145) includes an unregulated power converter 121-1. In such an instance, the power converter 121-1 receives an input voltage 120 and a corresponding input current 120-1 and produces an output voltage 123.

In one example, a second regulating power converter 122-1 of voltage converter 145 receives one or more intermediate voltages 135, each being a fraction of the input voltage 120 as previously discussed.

The power converter 121-1 produces output current 125-1 based on the input voltage 120; the power converter 122-1 produces output current 125-2 based on the intermediate voltages 135 (such as 135-1, 135-2, etc.).

Further, as previously discussed, the output current 125 is a summation of the output current 125-1 produced by the power converter 121-1 and the output current 125-2 produced by the power converter 122-1.

Examples herein can be understood from multiple different perspectives. For example, first, it is noted that this architecture (voltage converter 145 and power supply 100) can be viewed as an ISOP concept (e.g., input serial, output parallel). The power converters 121-1 and 122-1 share a common input current 120-1 (or input voltage 120) and each use a portion of the input voltage 120 (input current 120-1) to produce a respective output current. The power converters share a common parallel output voltage 123 and each contribute to producing the output current 125.

In accordance with further examples, the power converters of voltage converter 145 are not strictly series connected at their inputs. Via intermediate voltage 135, the regulating power converter 122-1 receives a fraction of the input voltage 123 while the unregulated power converter 121-1 receives the entire input voltage 120.

Also, note that, in contrast to classic ISOP configurations, both power converter 121-1 and power converter 122-1 share the same GND reference. In some respects, as further discussed herein, the two power converters of voltage converter 145 are embedded into each other.

In one example, the voltage converter 145 includes capacitance (such as one or more capacitors C11, C12, C13, C14, etc.) being connected in series to a respective input stage of the unregulated power converter 121-1 and in series with the output stage of the unregulated power converter 122-1. As further discussed herein, this capacitance is connected in parallel to an LC network, which is part of the unregulated converter 122-1.

Figure 3:
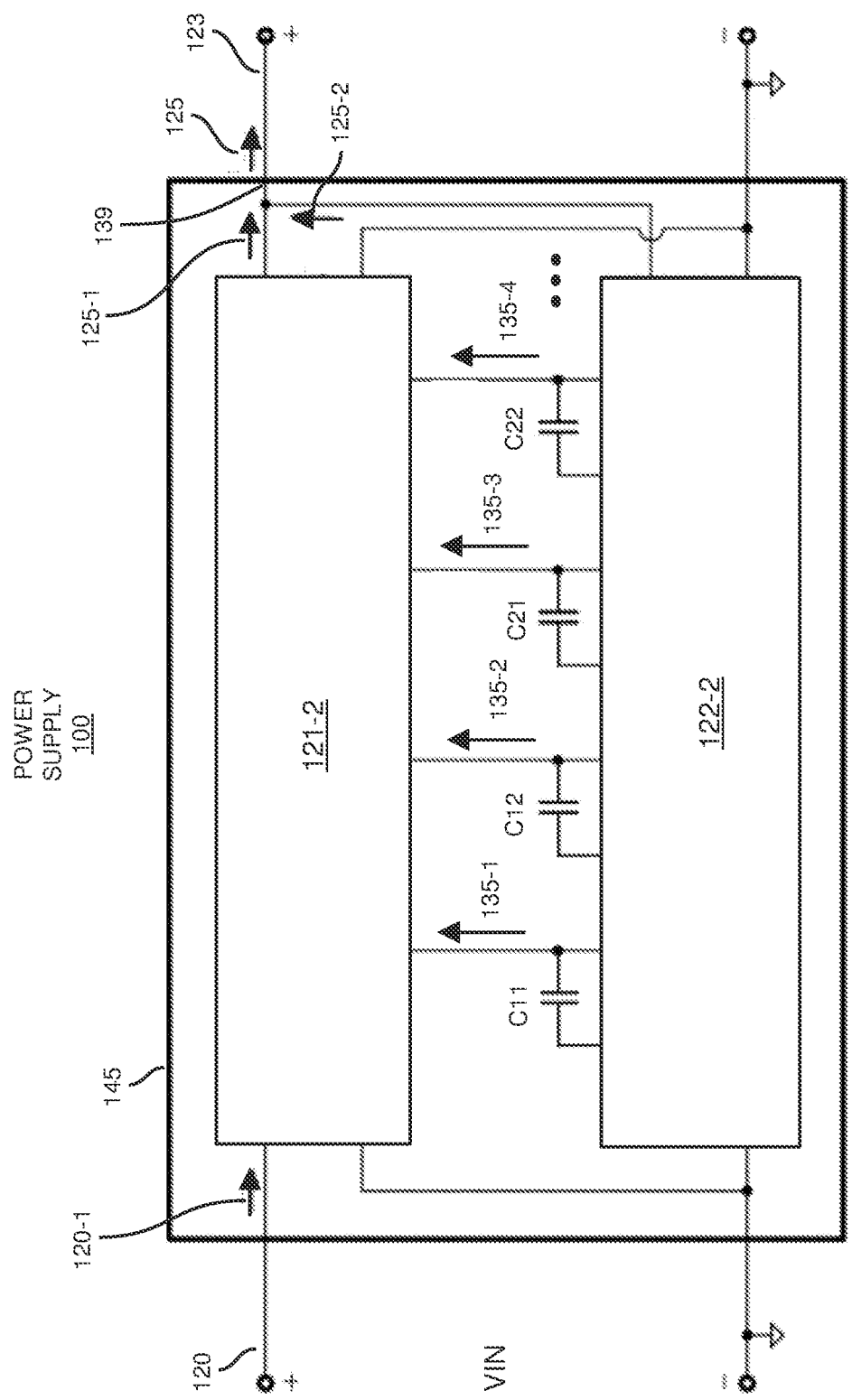
FIG. 3 is an example diagram illustrating a voltage converter including a regulated power converter and an unregulated power converter according to examples herein.

FIG. 3 is an example diagram illustrating a hybrid power converter including an unregulated power converter and regulated power converter according to examples herein.

In this example, the power supply 100 in FIG. 3 includes a regulated power converter 121-2 and unregulated power converter 122-2.

In a similar manner as previously discussed, the power converter 121-2 produces output current 125-1; the power converter 122-2 produces output current 125-2. The output current 125 is a summation of the output current 125-1 produced by the power converter 121-2 and the output current 125-2 produced by the power converter 122-2.

Figure 4:
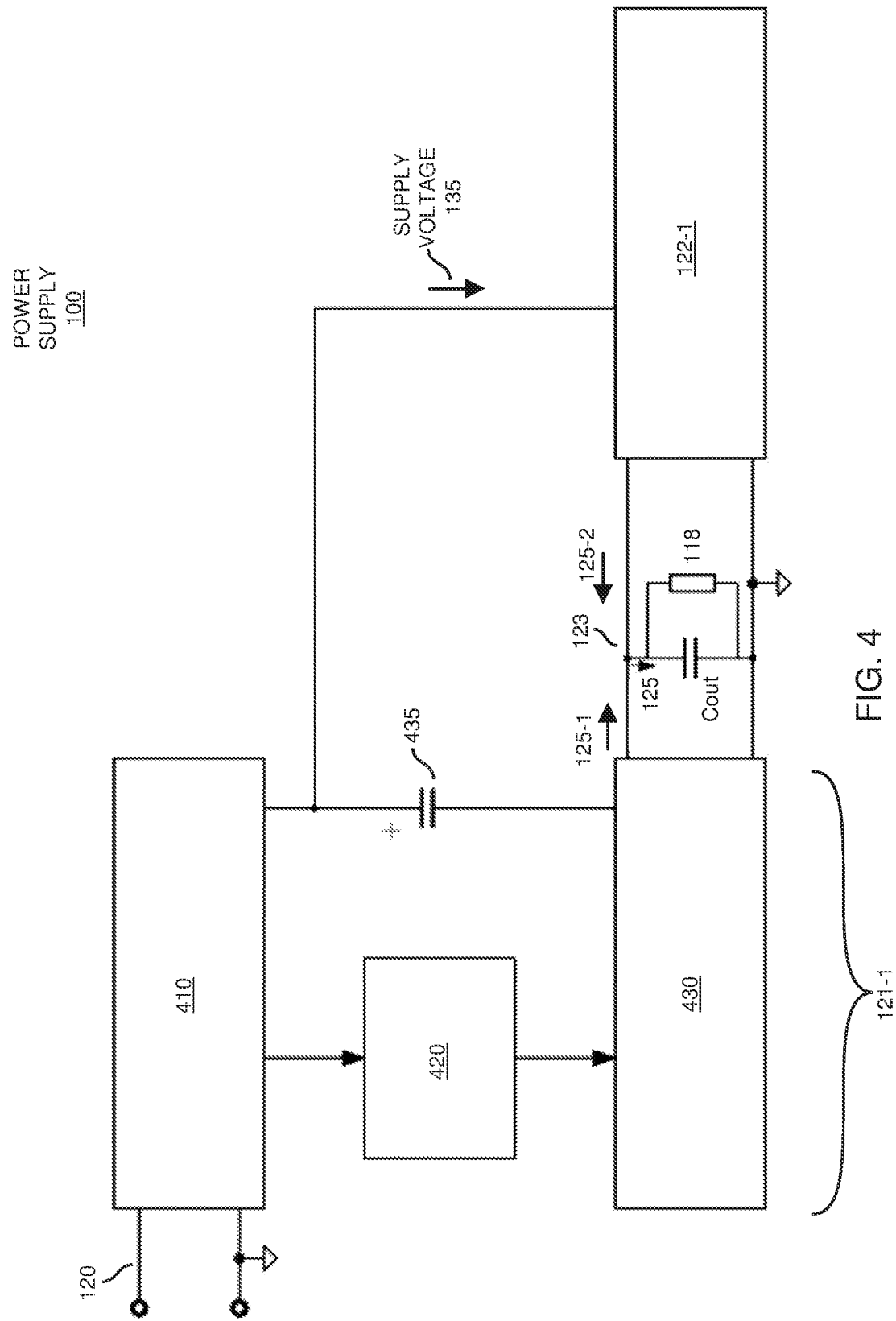
FIG. 4 is an example diagram illustrating components of a power supply circuit according to examples herein.

FIG. 4 is an example diagram illustrating components of a power supply circuit according to examples herein.

As previously discussed with respect to FIG. 2, and now with respect to FIG. 4, the regulating power converter 122-1 receives the supply voltage 135 (a.k.a., inner voltage), which is a fraction of the entire input voltage 120. This is supported by a series connection of input stage 410, capacitor 435, and output stage 430. This architecture allows that both the unregulated power converter 121-1 and the regulated power converter 122-1 to share the same reference GND.

In one example, if the voltage across the capacitor 435 (such as a so-called reservoir capacitor) decreases (e.g., because the regulating power converter 122-1 draws more power as a reaction to a positive current consumption transient by load 118), the voltage drop across the input stage 410 of the unregulated converter increases. The unregulated converter 121-1 consequently and automatically delivers more power to the load 118. In one example, the voltage converter 145 includes a positive feedback, which is the prerequisite for a high bandwidth and a fast reaction on transient load increases.

In contrast to conventional techniques, examples herein allow both the regulated power converter 122-1 and the unregulated power converter 121-1 to be non-isolated as both stages share the same reference GND of the output.

A third perspective of examples herein refers to the concept of partial power. For example, as the regulating stage 122-1 receives only a fraction of the input voltage 120, the power converter 122-1 needs to process (convert) hence only a fraction of the total power supplied by the input voltage 120 in order to provide regulation to the output voltage 123.

In contrast to implementing only a power converter such as a buck converter that converts an input voltage into an output voltage, examples herein include designing the unregulated power converter 121-1 to provide a significant portion of the entire power (such as 55% to 80% or other suitable amount of the total power supplied via the output voltage 123 depending on a range of the input voltage 120 and a range of the output voltage 123) by the unregulated power converter 122-1. In one example, the unregulated power converter 121-1 provides a higher efficiency than the power converter 122-1; however, the overall efficiency increases the more power that is processed by the unregulated power converter 122-1 because its impedance decreases at higher current outputs. Note further that a benefit of the power converter 122-1 is the regulation that it provides to produce the output voltage 123 within a desired voltage range. The unregulated power converter 121-1 has a higher conversion efficiency than the power converter 122-1.

Figure 5:
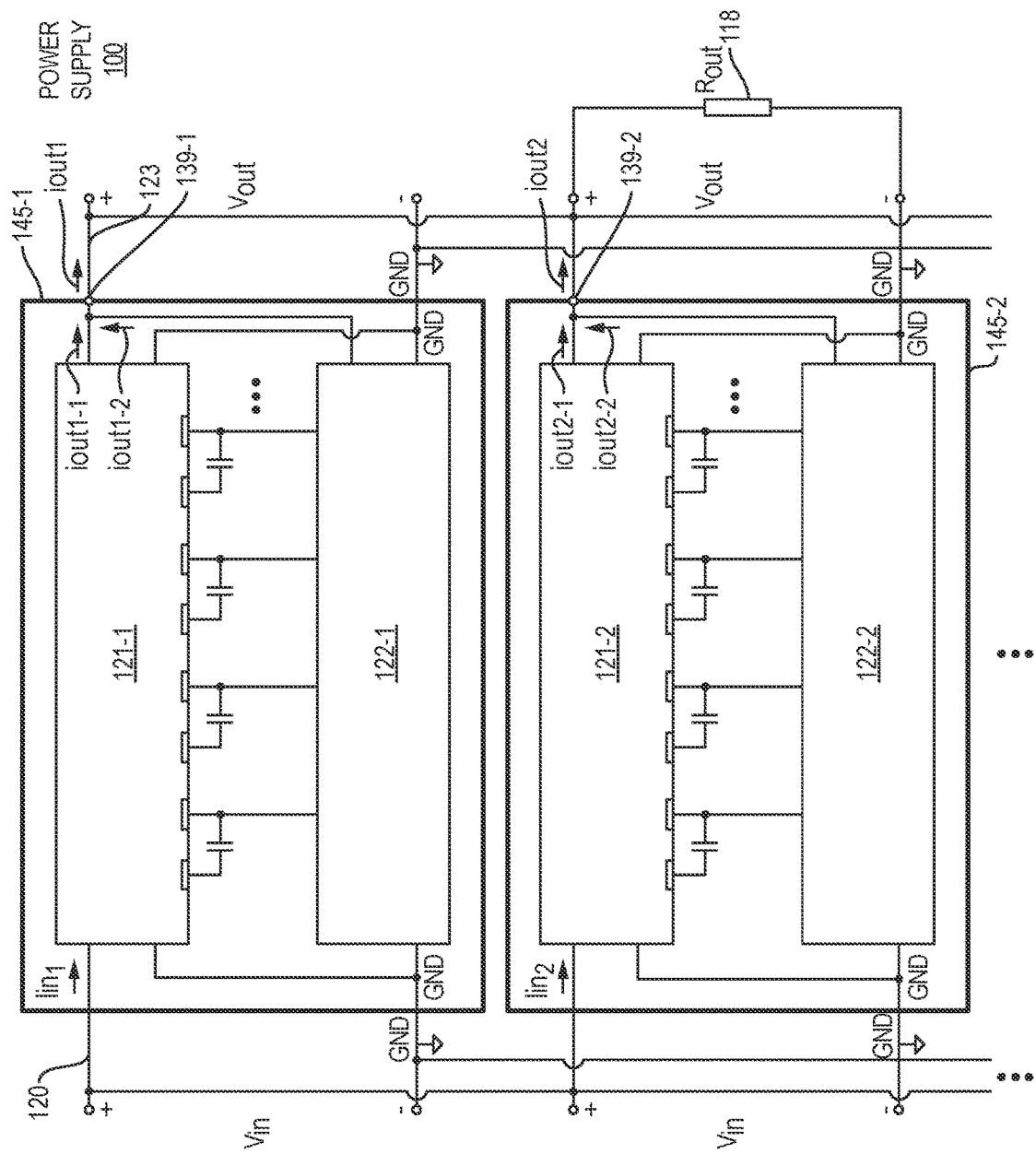
FIG. 5 is an example diagram illustrating a power supply including a parallel implementation of multiple voltage converters according to examples herein.

FIG. 5 is an example diagram illustrating a power supply including a parallel implementation of multiple hybrid power converters (voltage converters) according to examples herein.

In a conventional multi-phase buck converter, converters for digital load include several power stages that are connected in parallel in order to achieve high efficiency and high transient performance. In contrast, via the proposed voltage converter 145, examples herein provide high output current capability when needed.

As further shown in FIG. 5, examples herein include an example power supply 100 including an integer value of N voltage converters 145 (such as voltage converter 145-1, voltage converter 145-2, ... ) arranged in parallel to produce a respective output voltage 123. Each of the proposed voltage converters 145-1, 145-2, etc., shares use of one or more input voltages 120 and contributes to generating the output voltage 123.

Via the proposed voltage converter 145 (such as hybrid power converter) as described herein, which includes an unregulated power converter phase, the power supply 100 can be configured to support active current sharing, avoiding any current imbalance amongst each of the different phases.

For example, in one example, the proposed voltage converter 145 implements two feedback mechanisms. More specifically, the regulated power converter is controlled by a suitable modulation of a PWM signal generated by the controller 140 (i.e. controlling the switches such as field effect transistors of the regulated converter) while a respective unregulated power converter varies its impedance in accordance with the actual average voltage across the so-called reservoir capacitors $C\_(c\_(i\_k))$. As further discussed herein, the average voltage across each of the reservoir capacitors $C\_(c\_(i\_k))$ is directly dependent on the actual transfer function of the regulated power converter (i.e., in a buck converter, its average voltage is defined by the duty-cycle and the actual output voltage V_out).

Figure 6:
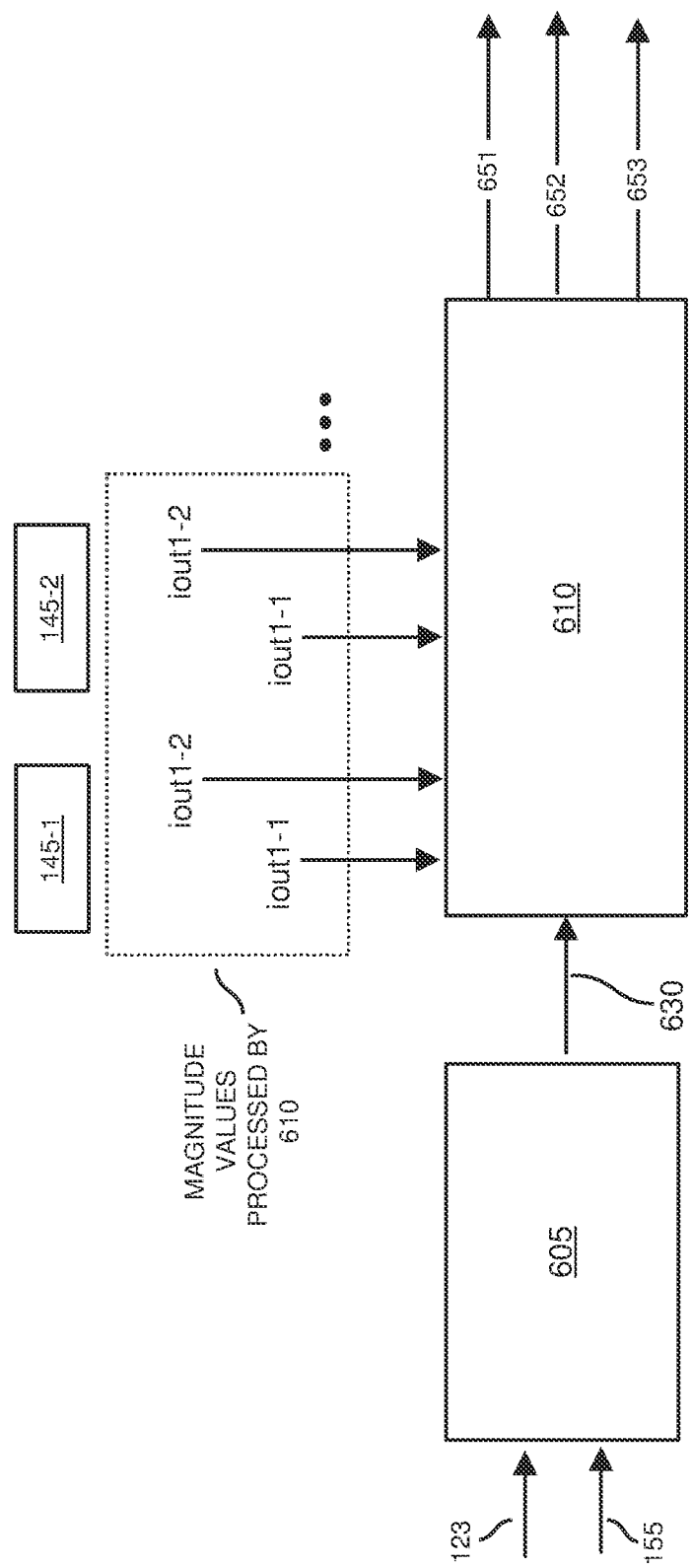
FIG. 6 is an example diagram illustrating regulation of current sharing amongst multiple hybrid power converter according to examples herein.

FIG. 6 is an example diagram illustrating regulation of current sharing amongst multiple hybrid power converter via an active current sharing control loop according to examples herein.

In this example, the controller 140 includes regulator 605 and regulator 610.

During operation, the regulator 610 (such as associated with controller 140) monitors a magnitude of the currents (such as output current from regulated power converter and output current from the unregulated power converter) supplied by each of the voltage converters to the load 118.

In one example, the regulator 610 generates respective pulse width modulation control signals (such as 651, 652, 653, etc.) for each of the regulated power converters such that the total magnitude of output current (such as total current iout1=iout1-1+iout1-2 for the voltage converter 145-1, iout2=iout2-1+iout2-2 for voltage converter 145-2, etc.) supplied by each of the corresponding voltage converters 145-1, 145-2, etc., is identical or substantially the same such as within 10% or less of each other.

In this example, the current value out1-1 represents output current 125-1 supplied by voltage converter 145-1 to load 118; the current value iout1-2 represents output current 125-2 supplied by voltage converter 145-1 to load 118. The current value iout2-1 represents output current 125-1 supplied by voltage converter 145-2; the current value out2-2 represents output current 125-2 supplied by voltage converter 145-2, and so on.

In one example, the regulator 610 generates pulse width modulation control signal 651 to control operation of switches in power converter 122 of voltage converter 145-1; the regulator 610 generates pulse width modulation control signal 652 to control operation of switches in power converter 122 in voltage converter 145-2; and so on. As further discussed below, the controller 140 ensures that the output current iout1, iout2, etc., from each of the voltage converters is the substantially same, providing current balancing amongst multiple voltage converter 145 supplying output current to the load 118.

Figure 7:
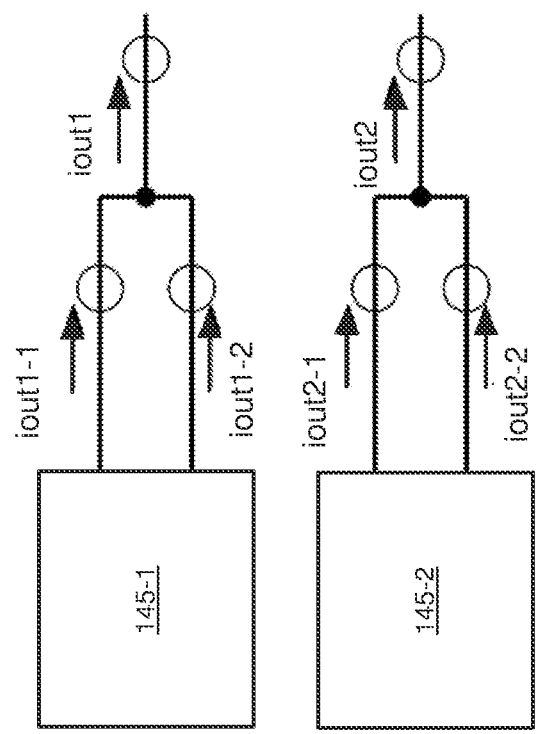
FIG. 7 is an example diagram illustrating monitoring and regulating current from multiple voltage converter according to examples herein.

FIG. 7 is an example diagram illustrating monitoring of current from multiple hybrid power converters according to examples herein.

In one example, the current sensing and control provided by the regulator 610 (such as part of controller 140) is useful to protect the power supply 100 against short circuit events or any abnormal overcurrent condition and to ensure balanced current sharing between amongst each of the voltage converters 145-1, 145-2, etc.

In this example, referring again to FIG. 6 and FIG. 7, the different current sensing, which can be either/both on a respective output node 139 of each voltage converter 145 or/and both the regulated power converter 122 and unregulated power converter 121 (such as with any suitable current sense method).

In one example, the output voltage regulator 605 monitors a magnitude of the output voltage 123 and compares it to the setpoint voltage 155 (Vref). The regulator 605 produces a respective error voltage 630 that is used as a basis to control settings of respective pulse width modulation control signals 651, 652, etc., that control operation of the respective power converter 122.

As previously discussed, the controller 140 can be configured to support current sharing amongst multiple voltage converters 145. For example, in one example, regulator 610 receives signals iout1-1 (such as indicating a magnitude of the output current 125-1 supplied by power converter 121 of a first voltage converter 145-1 to the load 118), iout1-2 (such as magnitude of the output current 125-2 supplied by a second power converter 122 of the first voltage converter 145-1 to the load 118), iout2-1 (such as indicating a magnitude of the output current 125-1 supplied by a second voltage converter 145-2 to the load 118), iout2-2 (such as magnitude of the output current 125-2 supplied by the first voltage converter 145-2 to the load 118), etc.

In one example, the regulator 610 monitors a magnitude of the summation of output current for each voltage converter and controls the total output current from each of the voltage converters to be substantially the same.

For example, the regulator 610 of controller 140 adjusts the magnitude of the output current 125-2 associated with voltage converter 145-1 and the output current 125-2 associated with voltage converter 145-2 such that a magnitude of each of the output currents iout1, iout2, etc., is the same and equals a target output current value.

Thus, examples herein include, via the regulator 610, adjusting the magnitude of the output current 125-2 associated with the regulated power converter of the voltage converter 145-1 to equalize iout1 (such as the sum of first output current 125-1 and the second output current 125-2 of the voltage converter 145-1) to iout2 (such as the sum of first output current 125-1 produced by a respective unregulated power converter and the second output current 125-2 produced by a regulated power converter of the voltage converter 145-2). In other words, in this example, iout1-1+iout 1-2=iout2-1+iout2-2= . . . =ioutn-1+ioutn-2, where iout1-1+iout 1-2 represents a total current supplied by the voltage converter 145-1, iout2-1+iout2-2 represents a total current supplied by the voltage converter 145-2, and so on.

Figure 8:
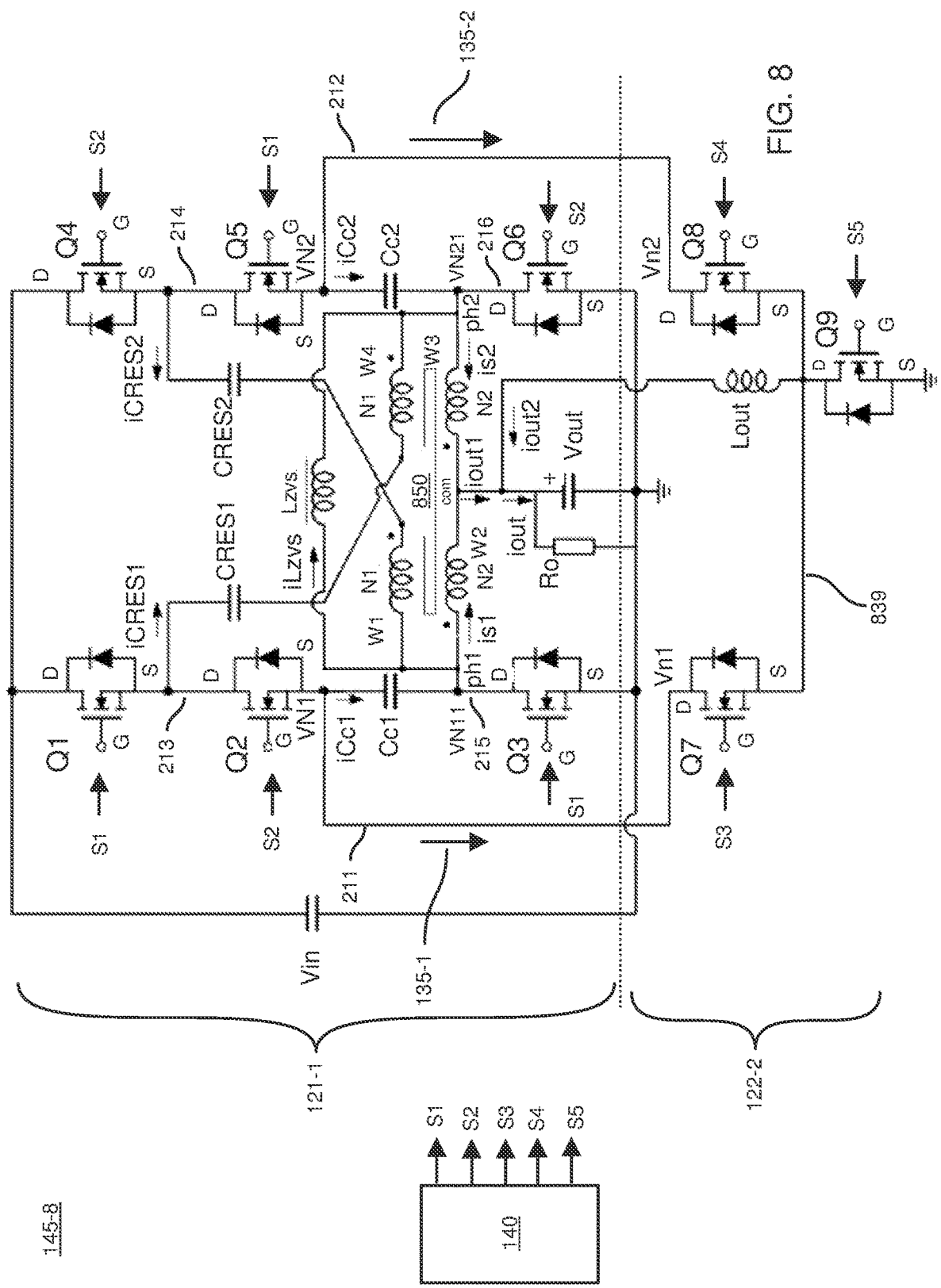
FIG. 8 is an example diagram illustrating a voltage converter according to examples herein.

FIG. 8 is an example diagram illustrating a hybrid power converter according to examples herein.

In this example, the voltage converter 145-8 includes unregulated power converter 121-1 (such as a hybrid switched-capacitor converter), regulated power converter 122-1 (such as a buck converter implementation). The power converter 122-1 provides voltage regulation of the output voltage 123 via intermediate voltage 135-1 and intermediate voltage 135-2, each of which represents a fraction of the input voltage 120.

One advantage of the proposed topology of the voltage converter 145-8 is to provide very high efficiency by the unregulated power converter 121-1 and to provide output voltage regulation capability using only a fraction of the input voltage 120 via the regulated power converter 122-1.

As shown, the example voltage converter 145-8 includes voltage source Vin, power converter 121-1, and power converter 122-1.

The power converter 121-1 (apparatus such as hardware, circuitry, etc.) includes multiple switches Q1, Q2, Q3, Q4, Q5, and Q6 (such as field effect transistors or any other suitable type of switch). Additionally, the power converter 121-1 (such as switched-capacitor converter) includes multiple circuit components including inductor Lzvs, capacitor Cres1, and capacitor Cres2.

Further in this example, the multi-tapped autotransformer 850 of the power converter 121-1 includes primary winding W1 (such as N1 turns), primary winding W4 (such as N1 turns), secondary winding W2 (such as N2 turns), and secondary winding W3 (such as N2 turns). The number of windings (N1, N2, etc.) associated with the primary windings and/or the secondary windings can be any suitable value and vary depending on the example.

In one example, a combination of the primary windings and secondary windings of multi-tapped autotransformer 850 are connected in series. For example, primary winding W1 is connected in series with secondary winding W2; secondary winding W2 is connected in series with secondary winding W3; secondary winding W3 is connected in series with primary winding W4.

In accordance with further examples, the secondary windings (such as a tapped secondary winding, or multiple secondary windings connected in series) is inductively coupled to the primary windings. In other words, as shown, the first primary winding W1, the second primary winding W4, and the secondary winding(s) W2 and W3 are magnetically coupled to each other. If desired, the secondary windings W2 and W3 can be a center tapped winding facilitating generation of the output voltage 123 from a respective output of the center-tapped winding.

Further in this example, the drain node (D) of switch Q1 and the drain node (D) of switch Q4 are connected to the input voltage source Vin.

Further, the source node (S) of the switch Q1 is coupled to the drain node (D) of the switch Q2 (node 213). The source node (S) of the switch Q4 is coupled to the drain node (D) of the switch Q5 (node 214). The source node (S) of the switch Q2 is coupled to node 211 (a.k.a., node VN1). The source node (S) of the switch Q5 is coupled to node 212 (a.k.a., VN2).

Capacitor Cres1 is connected between node 213 and a respective node of primary winding W4. Capacitor Cres2 is connected between node 214 and a respective node of primary winding W1.

Inductor Lzvs is coupled between node 211 and 212.

The drain (D) of switch Q3 is connected to node 215 (a.k.a., node VN11); the source (S) of switch Q3 is connected to ground. The drain (D) of switch Q6 is connected to node 216 (a.k.a., VN21); the source (S) of switch Q6 is connected to ground.

Capacitor Cc1 is connected between node 211 and node 212. Capacitor Cc2 is connected between node 212 and node 216.

The center tap (com or common node) of the secondary winding 162 outputs current Iout1 (a.k.a., output current 125-1) and corresponding output voltage 123 to drive load 118 (a.k.a., Ro).

In one example, the magnitude of the output voltage 123 is Vin/8. Thus, if Vin=48 VDC, the magnitude of the output voltage 123 is 6 volts. However, as discussed herein, settings of components in the power supply 100 can be adjusted to produce an output voltage 123 (Vout) of any suitable value.

In general the output voltage 123, Vout=Vin*(N2/(2*(2N2+N1))), where N1=the number of turns on the primary windings of transformer 850 and N2 is the number of turns on each of the secondary windings of transformer 850.

Further in this example, control signal S1 generated by the controller 140 drives gates (G) of respective switches Q1, Q3, and Q5. Accordingly, control signal S1 controls a state of each of the switches Q1, Q3, and Q5.

Control signal S2 drives respective gates (G) of switches Q2, Q4, and Q6. Accordingly, control signal S2 controls a state of each of the switches Q2, Q4, and Q6.

Note that each of the switches as described herein can be any suitable devices such as (Metal Oxide Semiconductor) field effect transistors, bipolar junction transistors, etc.

The settings of capacitors Cres1 and Cres2 can be any suitable value. In one example, the voltage converter 135 as described herein provides better performance when Cres1=Cres2, and works well even if Cres1/Cres2.

In one example, additional inductance (such as inductor Lzvs) in parallel with the multi-tapped autotransformer 850 is optionally present to achieve zero voltage switching (ZVS) for one or more switches Q1-Q6. As further discussed below, the Lzvs inductance alternatively can be integrated in the multi-tapped autotransformer 850 (such as with gaps in the respective core or using core with lower permeability).

As previously discussed, switches in power converter 121 are divided into two switch groups: the first switch group including switches Q1, Q3, and Q5 controlled by respective control signal S1, and a second switch group including switches Q2, Q4, and Q6, controlled by respective control signal S2, which is generally a 180 degrees phase shift with respect to timing of control signal S1.

In one example, the pulse width modulation of control signals S1 and S2 is approximately 50% to obtain the minimum RMS current.

The magnitude of the output voltage 123 depends on the turns (# of windings ratio N1/N2 of the primary winding to the secondary winding). In one example, the switching frequency does not change directly the magnitude of the output voltage, but in general is changing it because the losses are increasing or decreasing based on the difference between Fres and Fsw, where Fres is the resonant frequency of the tank formed by Cres1 or Cres2 and the leakage of the multi-tapped autotransformer when Cres1=Cres2.

Examples herein include taking advantage of the leakage inductance, Lk, of the multi-tapped autotransformer 850 to (soft) charge the capacitors Cres1 and Cres2 during different control cycles. For example, in one example, the capacitors Cres1 and Cres2 function as flying capacitors, enabling use of lower voltage field effect transistors at the primary side in comparison to a classic LLC topology.

Note further that one enabler of high efficiency and high-power density of the proposed voltage converter 145 is the ability to implement lower voltage rating field effect transistors and the implementation of Class II ceramic capacitors (such as capacitors Cres1 and Cers2), which inherently offer high capacitance density.

As further shown, the voltage converter 145-8 include power converter 122. Power converter 122 (such as a buck converter) includes switches Q7, Q8, and Q9. The switch Q7 is connected between node 211 and node 839; the switch Q8 is connected between node 212 and node 839. Q9 is connected between node 839 and ground. The corresponding inductor Lout is connected between node 839 and the center tap node (common) of the transformer 850.

Figure 9:
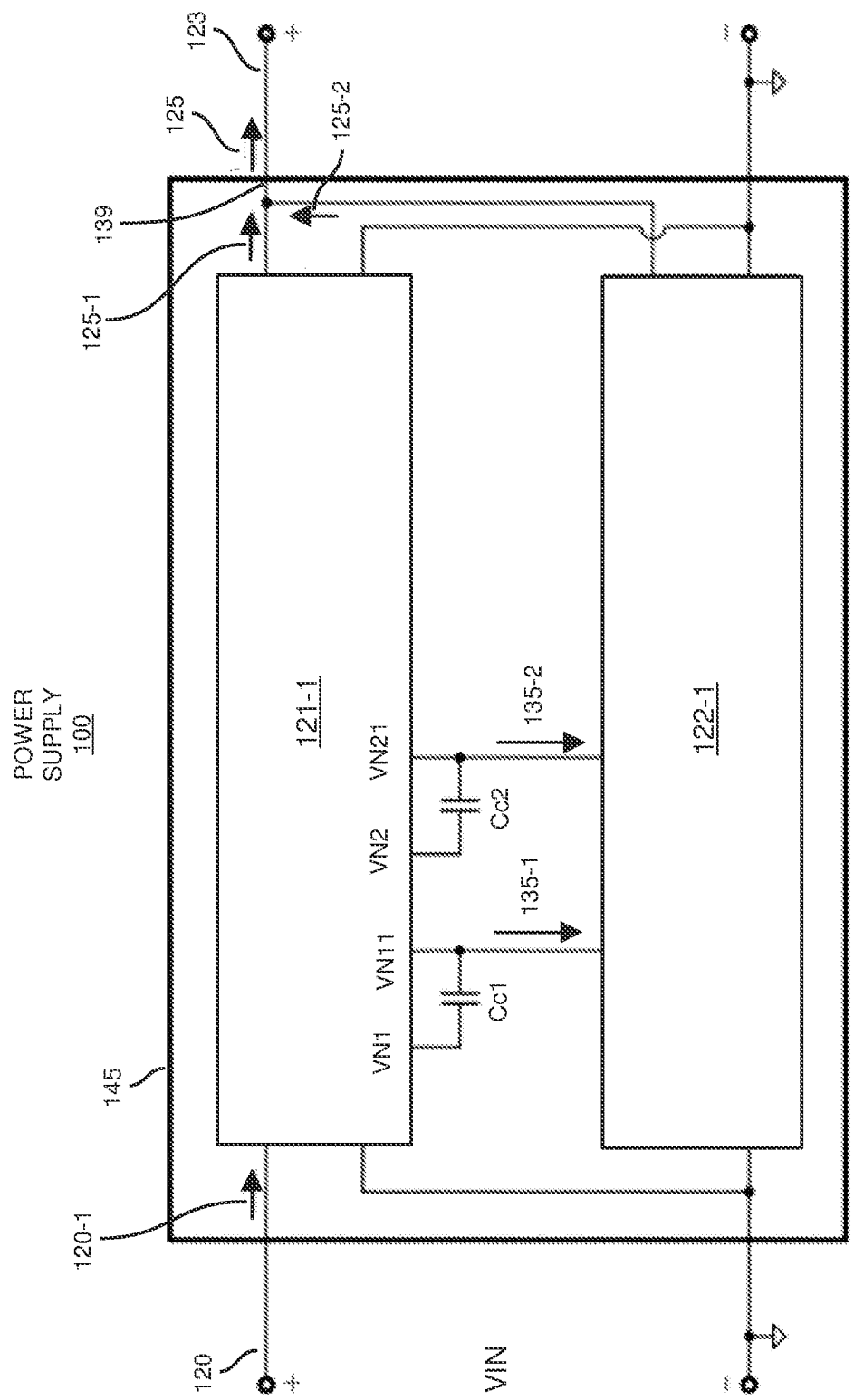
FIG. 9 is an example diagram illustrating of a voltage converter according to examples herein.

FIG. 9 is an example diagram illustrating of a hybrid power converter according to examples herein.

Voltage converter 145 in FIG. 9 is an equivalent circuit of the topology in FIG. 8. The voltage converter 145 in FIG. 9 includes two reservoir capacitors placed in series between convenient nodes of the unregulated power converter 121-1. For example, reservoir capacitor Cc1 is disposed between node VN1 and VN11; reservoir capacitor Cc2 is disposed between node VN2 and VN21.

As previously discussed, the reservoir capacitor Cc1 and resonant capacitor Cc2 provide a source voltage (reservoir capacitor Cc1 supplies intermediate voltage 135-1 to power converter 121, reservoir capacitor Cc2 supplies intermediate voltage 135-2 to power converter 122) to the regulated power converter 122-1, with the GND path being closed by either switch Q3 or switch Q6, depending on the PWM signal phase of the voltage converter 145.

As shown in FIG. 8, compared with FIG. 9, the reservoir capacitors Cc1 and Cc2 are placed in series between respective switches Q2, Q3 and Q5, Q6. More specifically, the reservoir capacitor Cc1 resides in series between switch Q2 and switch Q3; the reservoir capacitor Cc2 resides in series between switch Q5 and switch Q6.

The location of the reservoir capacitors Cc1 and Cc2 allows a respective direct path to GND both from the unregulated power converter 121-1 and regulated power converter 122-1 and storage of energy (such as intermediate voltage 135-1 and intermediate voltage 135-2) used as voltage source by the regulated power converter 122.

As will be shown later in this disclosure, reservoir capacitor Cc1 and reservoir capacitor Cc2 are alternatively disposed in series with the LC resonant tank of power converter 121-1 and with the output inductance L_out (i.e. powering the load) of power converter 122-1.

Now, with reference to both FIGS. 8 and 9, the voltage converter 145 comprises:
an unregulated power converter 121-1 such as a switched capacitor converter: formed by an interleaved flying capacitor structure Cres1 and Cres2 connected to a multi-tapped autotransformer 850. An additional inductor Lzvs in parallel with the multi-tapped autotransformer is added to achieve zero voltage switching (ZVS) for all switches, which can be also integrated in the MTA to reach higher power density.

Figure 11:
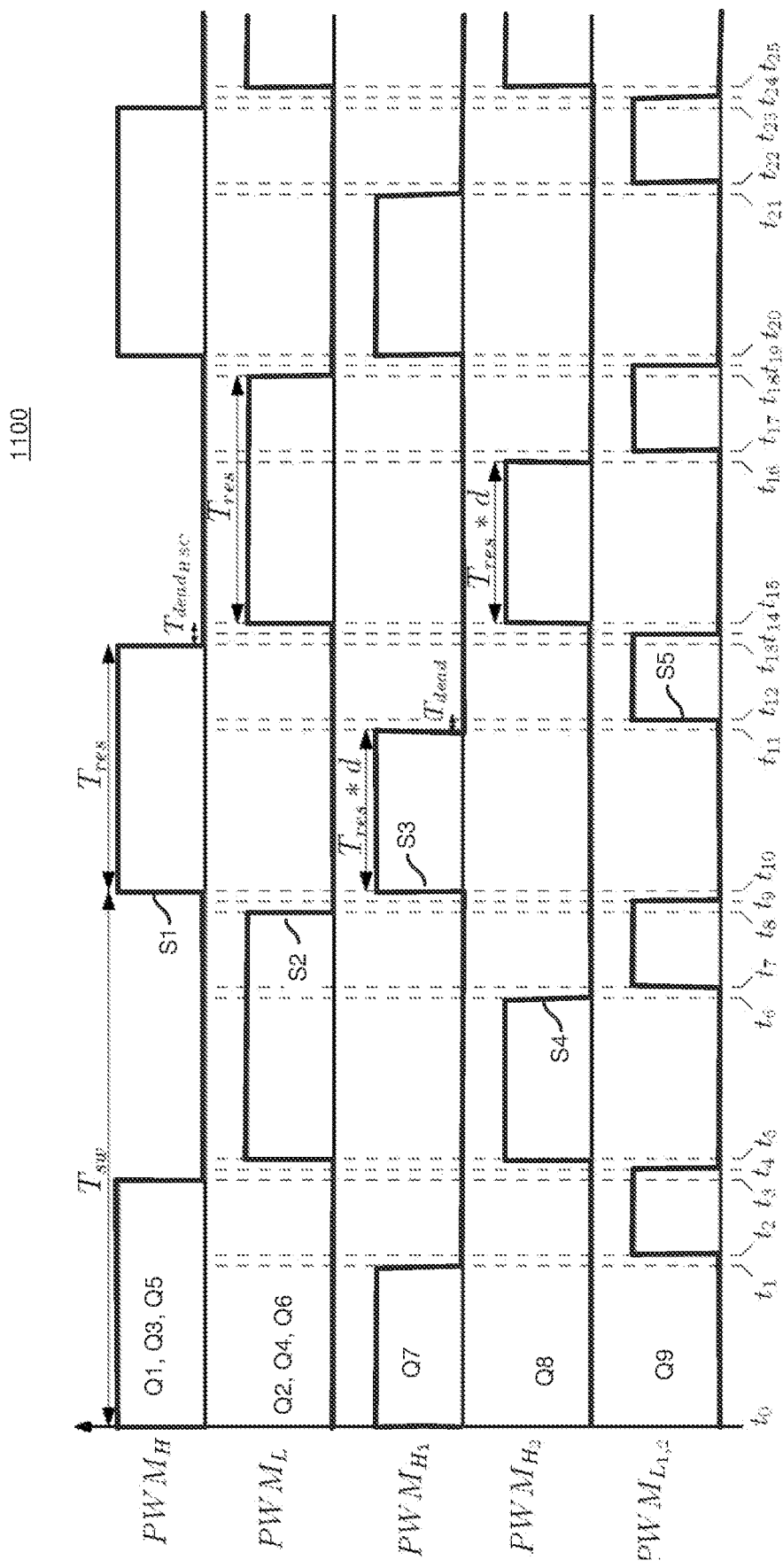
FIG. 11 is an example diagram illustrating a timing diagram of controlling a voltage converter according to examples herein.

In one example, all switches can be divided into two switch groups: the first switch group is formed by Q1, Q3 and Q5 (driven by control logic PWM_H or signal S1 as shown in FIG. 11), and the second switch group (switches Q2, Q4 and Q6) is controlled by a 180° phase shifted PWM (control logic PWM_L or signal S2 as shown in FIG. 11) with respect to the first group with the same duty cycle. The power converter 121 operates with a fixed duty cycle of ideally near 50% to obtain the minimum RMS current. As previously discussed, two additional reservoir capacitors Cc1 and Cc2 are added to act as source voltage (intermediate voltage 135) for the regulated power converter 122-1. As previously discussed, reservoir capacitor Cc1 resides in series between switch Q2 and Q3 and reservoir capacitor Cc2 resides between switch Q5 and switch Q6.

the regulated power converter 122-1 such as a buck converter comprises: 3 switches Q7 (driven by control logic PWM_H1 or signal S3) referring to FIG. 11), switch Q8 (driven by control logic PWM_H2 or signal S4 referring to FIG. 11) and switch Q9 (driven by control logic PWM_(L_1,2) or signal S5 referring to FIG. 11) and an output inductance L_out. Switches Q7 and Q8 are high side (or control) switches sharing use of the same synchronous switch (a.k.a., low-side switch Q9).

In one example, the voltage converter 145-8 in FIG. 8 cannot operate without the regulated power converter 122-1, as the reservoir capacitors Cc1 and Cc2 would act as DC-blocking impedances. In other words, in one example, the power converter 122 continuously or repeatedly draws power from these reservoir capacitors Cc1 and Cc2.

Figure 10:
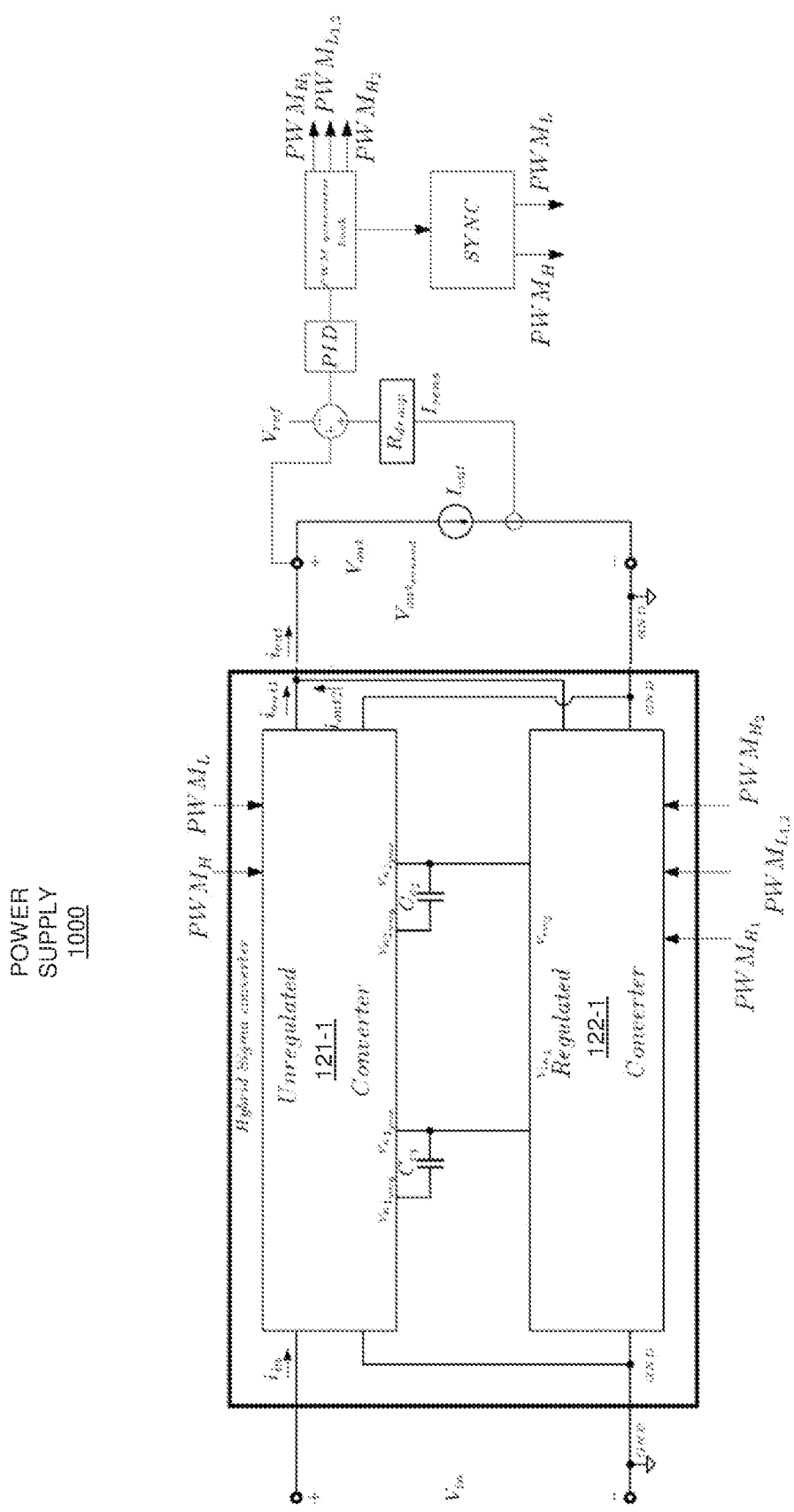
FIG. 10 is an example diagram illustrating implementation of a hybrid power converter according to examples herein.

FIG. 10 is an example of a control system of the proposed voltage converter 145 based on the circuit shown in FIG. 8.

As depicted in FIG. 10, the power supply 1000 can be configured to include a closed loop control with the output voltage, Vout, and/or output current Iout information (i.e., droop function implemented). In one example, the output current Iout is the sum of the currents of the unregulated power converter 121-1 and the regulated power converter 122-1. Based on the voltage converter depicted in FIG. 8, the regulated power converter 122-1 comprises two buck stages, phase shifted by 180° sharing the same inductance L_out and the same low-side FET (i.e. can be identified also as single buck converter with two input terminals since two high-side FETs are sharing the same output inductance L_out). As described herein, the regulated power converter 122 is controlled by PWM_H1 (control signal S3), PWM_H2 (control signal S4), and PWM_(L_1,2) (control signal S5), where duty-cycle modulation is implemented via the controller 140 to maintain the magnitude of the output voltage 123 in a desired range.

FIG. 11 is an example diagram illustrating control of a hybrid power converter according to examples herein.

In one example, the unregulated power converter and regulated power converter as described herein are synchronized with control signals generated by the controller 140. This is achieved by the SYNC block level. As shown in the timing diagram 1100 of FIG. 11, the rising edge of control signal PWM_H (S1) is synchronized with the rising edge of control signal PWM_H1 (S3) such as at time TO, T10, etc.; the rising edge of control signal PWM_L (S2) is synchronized with the rising edge of control signal PWM_H2 (S4) such as at time T5, T15, etc.

In such an instance, the voltage converter 145 is running at a fixed switching frequency f_sw, but also can be controlled in a narrow frequency range to improve the steady state efficiency of the unregulated power converter 122.

The voltage converter 145 as described herein operates in different modes at different times in FIG. 11 as discussed below.

Figure 12:
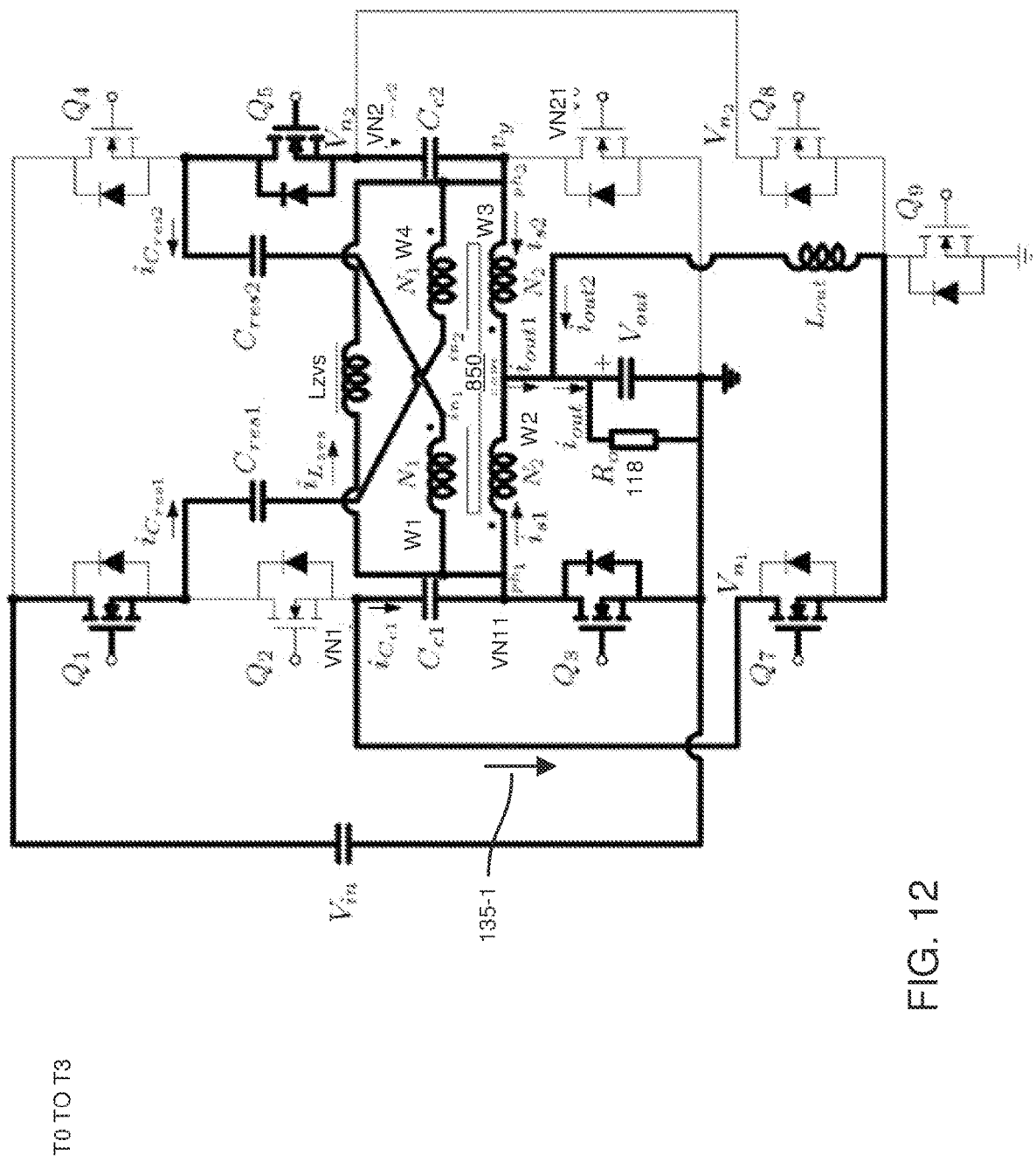
FIG. 12 is an example diagram illustrating operation of a voltage converter in a first mode according to examples herein.

FIG. 12 is an example diagram illustrating operation of a hybrid power converter in a first mode according to examples herein.

The following discussion of modes references multiple FIGS. including FIG. 11.

t0-t1: at time=t0, the controller 140 controls switches Q1, Q3, and Q5 to an ON state in ZVS and the first resonant transition takes place between resonant capacitor C_res1 and the leakage inductance of the multi-tapped autotransformer 850, whilst the second resonant transition takes place between resonant capacitor C_res2 and the leakage inductance of the transformer 850 (a.k.a., MTA). The corresponding operation of the voltage converter 145 for this operational mode is shown in FIG. 12. In this mode, capacitor C_res1 is soft-charged from the input voltage 120 as shown in the equivalent circuit shown in FIG. 13. Resonant capacitor C_res2 is being discharged, resulting in charging of the reservoir capacitor C_c2, which is not connected to the regulated power converter during this mode.

Figure 13:
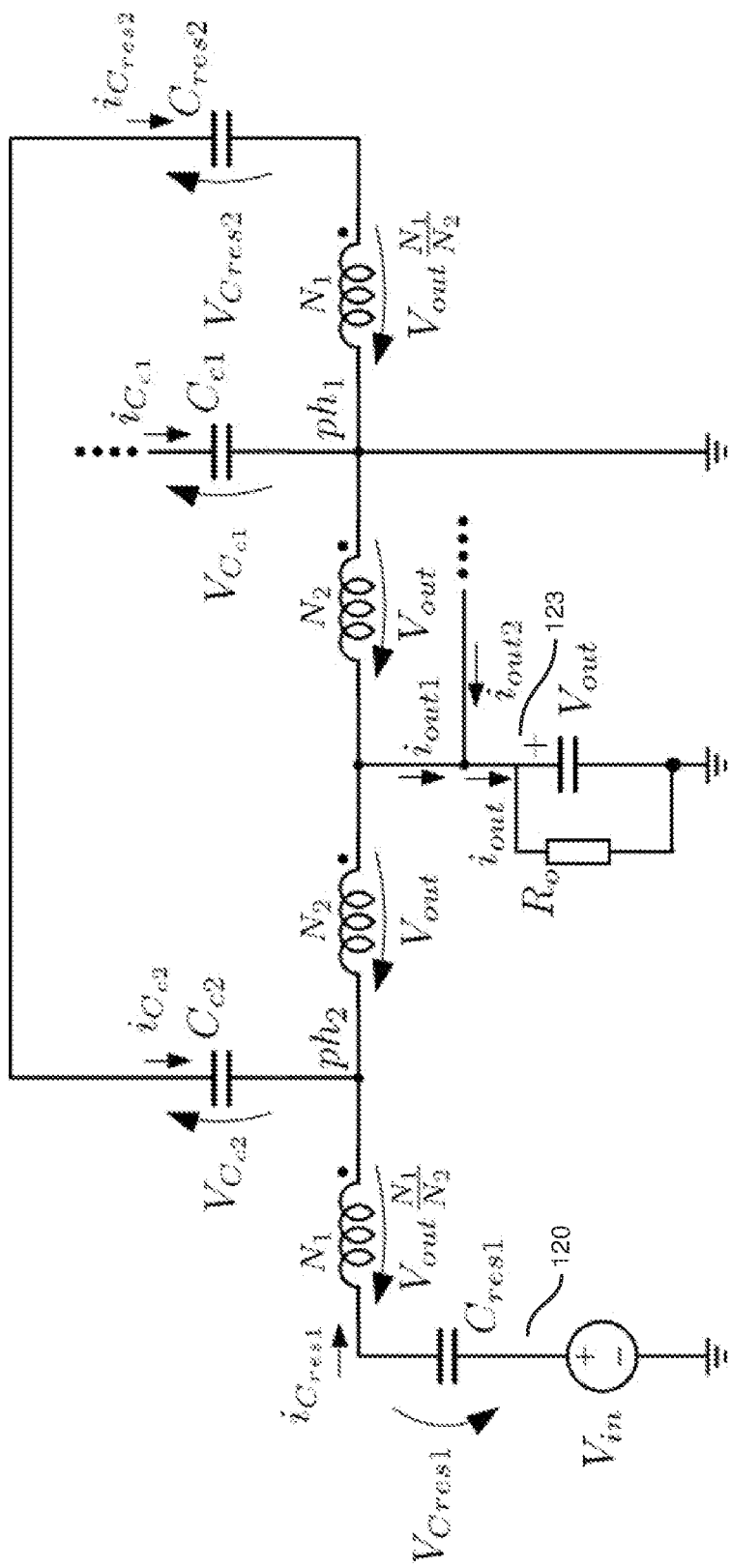
FIG. 13 is an example diagram illustrating an equivalent circuit of the voltage converter operating in the first mode according to examples herein.

Based on the equivalent electric circuit during the subinterval $t_0$-$t_3$ as shown in FIG. 13, the following equations are valid:

$$V_{Cres1} = V_{in} - V_{out}\left(\frac{N_1}{N_2} + 2\right) \quad (1)$$

$$2V_{out} + V_{C_{c2}} + V_{out}\left(\frac{N_1}{N_2} + 2\right) + V_{out}\frac{N_1}{N_2} = V_{in} \quad (2)$$

Considering the flux balance on the inductor $L_{out}$ and the equivalent total duty cycle $D_{tot}=2*d$, it follows that $$V_{C_{c1}} = V_{C_{c2}} = \frac{V_{out}}{D_{tot}}.$$

Considering that $V_{Cres1}=V_{Cres2}$ the following transfer function from input to output is obtained, combining equation (1) and equation (2):

$$\frac{V_{in}}{V_{out}} = 4 + 2\frac{N_1}{N_2} + \frac{1}{D_{tot}} \quad (3)$$

As it can be seen from equation (3), the output voltage 123 (a.k.a., Vout) is directly controlled by the duty cycle of the regulated power converter 122.

1. $t_1$-$t_2$: at $t=t_1$, the controller 140 turns off switch $Q_7$, current (power) stops flowing from the reservoir capacitor $C_{C_1}$ to the power converter 122. During this phase (i.e., mode), resonant capacitor $C_{res1}$ is still soft-charged to an intermediate voltage from the input voltage source $V_{in}$ and resonant capacitor $C_{res2}$ is still being discharged, resulting in charging of the reservoir capacitor $C_{C_2}$ (a.k.a., clamping capacitor).
2. $t_2$-$t_3$: at $t=t_2$, the controller 140 turns on switch $Q_9$ after a dead-time starting at $t=t_1$ with a duration $T_{dead}$ in order to avoid cross conduction with switch $Q_7$. After $t=t_2$, the inductance current is flowing through switch $Q_9$ and the output inductor Lout is discharged to produce the output voltage 123, $V_{out}$. During this phase, capacitor $C_{res1}$ is still soft-charged from the input voltage source $V_{in}$ and $C_{res2}$ is still being discharged, resulting in charging of the capacitor $C_{C_2}$.
3. $t_3$-$t_4$: at $t=t_3$, the controller turns off switches $Q_1$, $Q_3$ and $Q_5$ and the parasitic capacitance of $Q_1$ is charged to $$V_{in}\left[1 - \frac{1}{4 + 2\frac{N_1}{N_2} + \frac{1}{D_{tot}}}\left(2 + \frac{1}{D_{tot}}\right)\right],$$

$Q_3$ is charged to $2V_{out}$, $Q_5$ is charged to $$V_{in}\left(1 - \frac{1}{4 + 2\frac{N_1}{N_2} + \frac{1}{D_{tot}}}\frac{1}{D_{tot}}\right),$$

whilst the parasitic capacitance of $Q_2$, $Q_4$ and $Q_6$ are discharged to zero, using the inductive energy stored in the $L_{zvs}$ inductor at $t=t_3$. When the capacitance of $Q_2$, $Q_4$ and $Q_6$ are discharged to zero their body diodes start conducts to enable ZVS turn on. The state is shown in now reported in FIG. 14. During this phase the output inductance is still discharged to produce the output voltage $V_{out}$ and with $Q_9$ on. The current $i_{L_{zvs}}(t_3)$ that enables ZVS operation is denoted as $i_{L_{zvs,pk}}$ and is given by the following equation:

$$I_{L_{zvs,pk}} = -\frac{V_{out}}{2*L_{zvs}*f_{sw}} = -\frac{V_{in}}{2*L_{zvs}*f_{sw}\left(4 + 2\frac{N_1}{N_2} + \frac{1}{D_{tot}}\right)} \quad (4)$$

FIG. 13 illustrates the equivalent circuit of the resonant tank, during phase between time t0-t3. As depicted in FIG. 13, the reservoir capacitor Cc2 is in series with resonant capacitor C_res2, the resonant transition is not considered influenced by capacitor Cc2 under the assumption that Cc2=Cc1>>Cres2=Cres1.

At t=t_0, also switch Q7 of the regulated power converter (buck converter) is turned on via controller 140, discharging the reservoir capacitor Cc1 while powering the load 118 through the output inductor L_out with a current variation which depends on the voltage across the reservoir capacitor Cc1 and the actual output voltage 123.

Considering the equivalent electric circuit during the subinterval $t_0$-$t_3$ shown in FIG. 13, the following equations are valid:

$$V_{Cres1} = V_{in} - V_{out}\left(\frac{N_1}{N_2} + 2\right) \quad (1)$$

$$2V_{out} + V_{C_{c2}} + V_{out}\left(\frac{N_1}{N_2} + 2\right) + V_{out}\frac{N_1}{N_2} = V_{in} \quad (2)$$

Considering the flux balance on the inductor $L_{out}$ and the equivalent total duty cycle $D_{tot}=2*d$, it follows that $$V_{C_{c1}} = V_{C_{c2}} = \frac{V_{out}}{D_{tot}}.$$

Considering that $V_{Cres1}=V_{Cres2}$ the following transfer function from input to output is obtained, combining equation (1) and equation (2):

$$\frac{V_{in}}{V_{out}} = 4 + 2\frac{N_1}{N_2} + \frac{1}{D_{tot}} \quad (3)$$

As it can be seen from equation (3), the output voltage 123 is directly controlled by the duty cycle of the regulated power converter 122-1.

4. $t_1$-$t_2$: at $t=t_1$, switch $Q_7$ is turned off via controller 140, power (current 135-1) stops flowing from the reservoir capacitor $C_{C_1}$ to the power converter 122 (buck stage). During this phase, $C_{res1}$ is still soft-charged from the input voltage source $V_{in}$ and $C_{res2}$ is still being discharged, charging the clamping reservoir capacitor $C_{c2}$. to an intermediate voltage value.

5. $t_2$-$t_3$: at t=$t_2$, switch $Q_9$ is turned on after a dead-time started at t=$t_1$ with a duration $T_{dead}$ in order to avoid cross conduction with switch $Q_7$. After t=$t_2$ the inductance current is flowing through switch $Q_9$ and the output inductor Lout is discharged to produce the output voltage $V_{out}$. During this phase, $C_{res1}$ is still soft-charged from the input voltage source $V_{in}$ and $C_{res2}$ is still getting discharged, charging the clamping capacitor $C_{c2}$.

6. $t_3$-$t_4$: at t=$t_3$, switches $Q_1$, $Q_3$ and $Q_5$ are turned off via controller 140 and the parasitic capacitance of $Q_1$ is charged to $$V_{in}\left[1 - \frac{1}{4 + 2\frac{N_1}{N_2} + \frac{1}{D_{tot}}}\left(2 + \frac{1}{D_{tot}}\right)\right],$$

Figure 14:
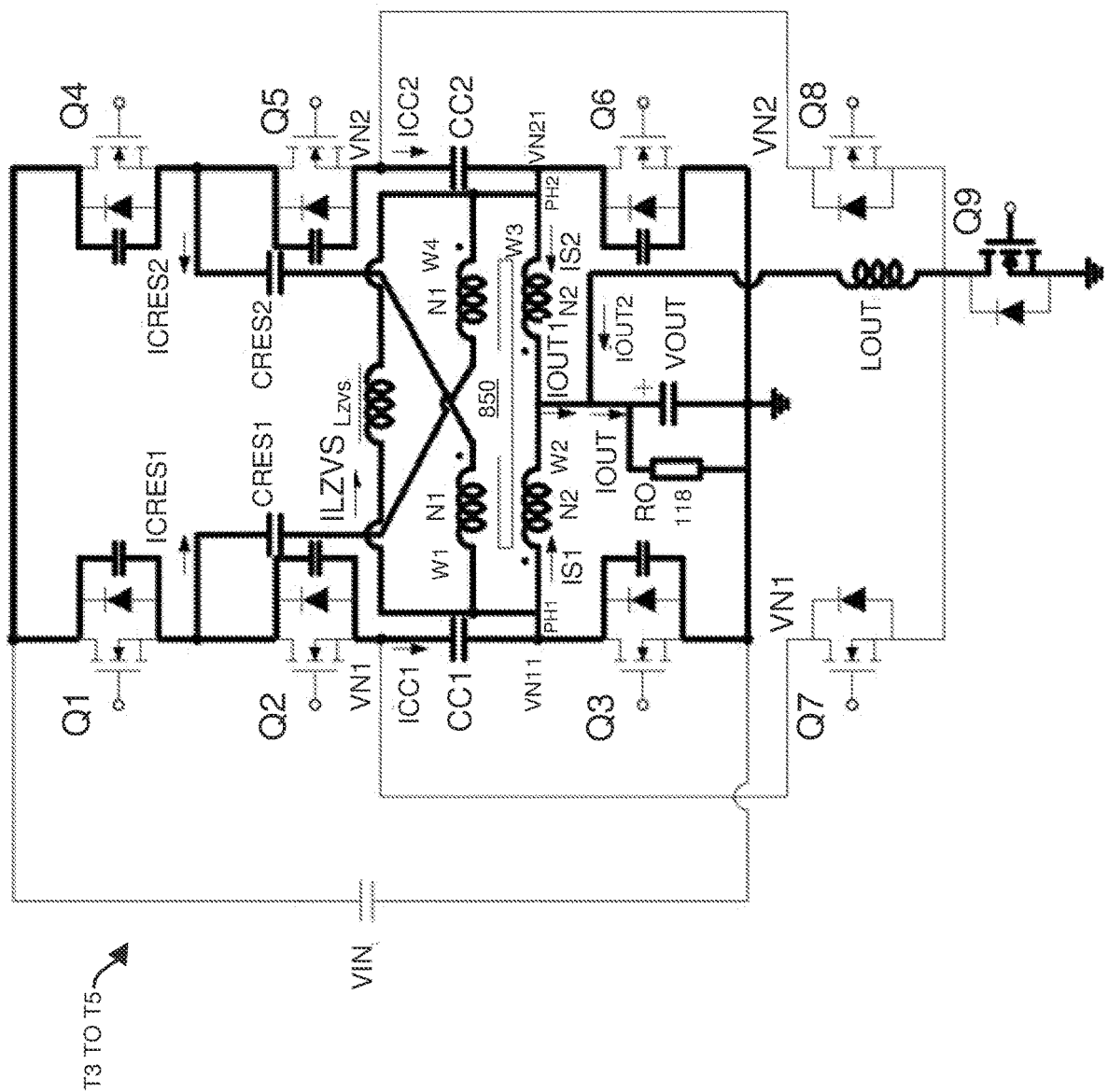
FIG. 14 is an example diagram illustrating operation of a voltage converter in a second mode (dead time operation) according to examples herein.

$Q_3$ is charged to $2V_{out}$, $Q_5$ is charged to $$V_{in}\left(1 - \frac{1}{4 + 2\frac{N_1}{N_2} + \frac{1}{D_{tot}}}\frac{1}{D_{tot}}\right),$$

whilst the parasitic capacitance of switches $Q_2$, $Q_4$ and $Q_6$ are discharged to zero, using the inductive energy stored in the $L_{zvs}$ inductance at t=$t_3$. When the capacitance of $Q_2$, $Q_4$ and $Q_6$ are discharged to zero their body diodes start conducts to enable ZVS turn on. The topological state is shown in FIG. 14. During this phase the output inductance Lout is still discharged to produce the output voltage $V_{out}$ and with switch $Q_9$ on. The current $i_{L_{zvs}}(t_3)$ that enables ZVS operation is denoted as $i_{L_{zvs,pk}}$ and is given by the following equation:

$$I_{L_{zvs,pk}} = -\frac{V_{out}}{2*L_{zvs}*f_{sw}} = -\frac{V_{in}}{2*L_{zvs}*f_{sw}\left(4 + 2\frac{N_1}{N_2} + \frac{1}{D_{tot}}\right)} \quad (4)$$

7. $t_4$-$t_5$: at t=$t_4$, switch $Q_9$ is turned off to avoid cross conduction with $Q_8$. During this phase, the ZVS on the unregulated converter are not finalized yet because generally $T_{dead} > T_{dead_{HSC}}$.

Figure 15:
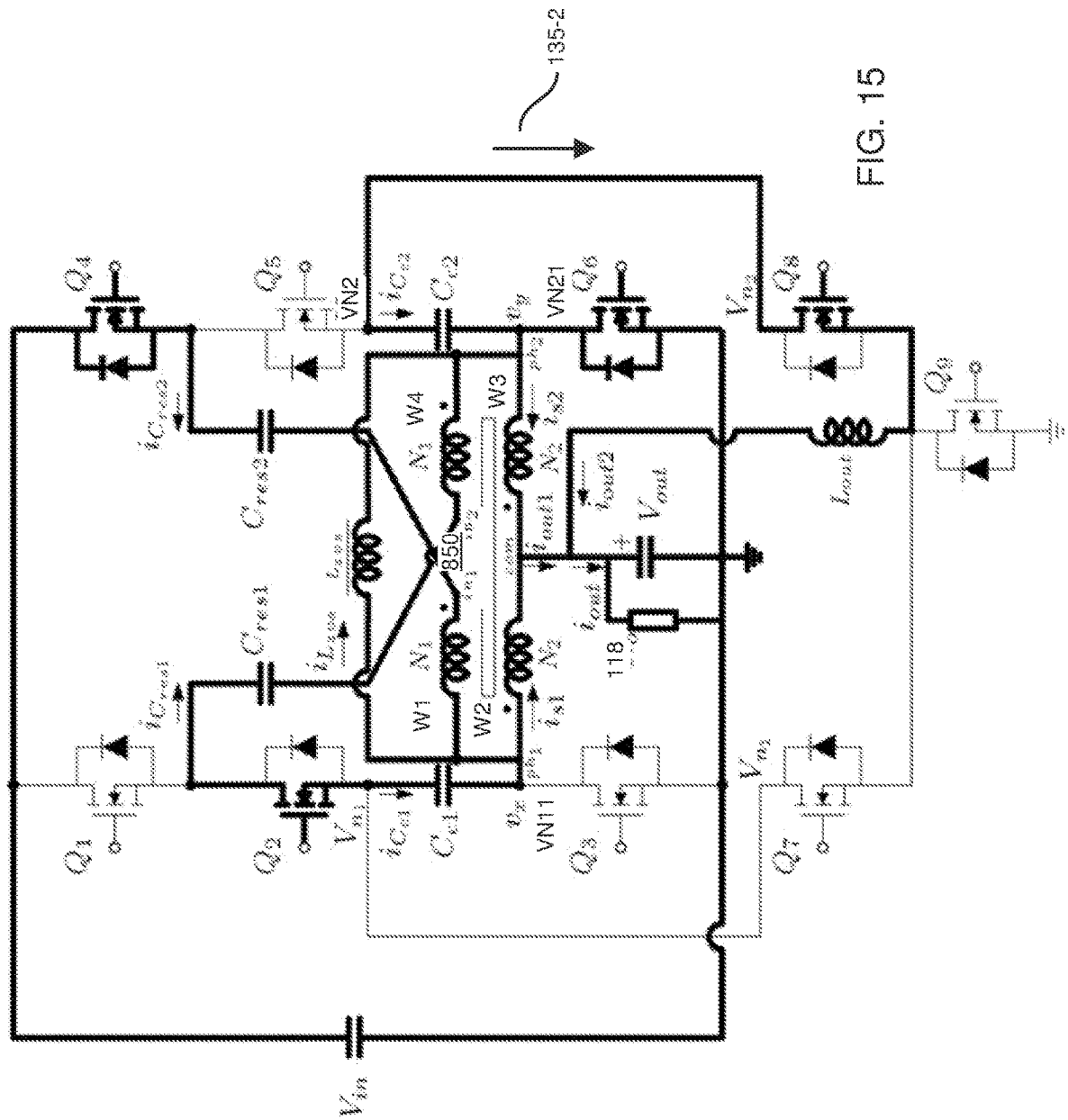
FIG. 15 is an example diagram illustrating operation of a voltage converter in a third mode according to examples herein.
Figure 16:
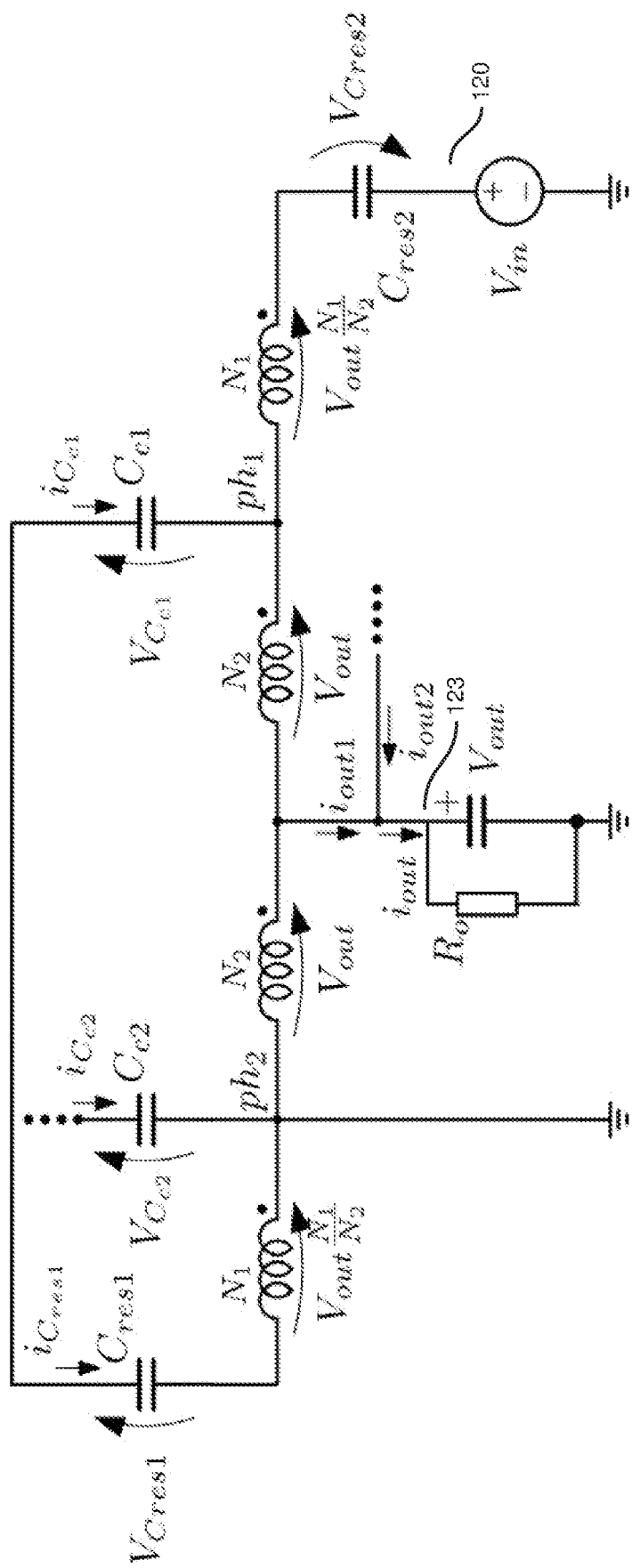
FIG. 16 is an example diagram illustrating an equivalent circuit of the voltage converter operating in the third mode according to examples herein.

8. $t_5$-$t_6$: at t=$t_5$ switch $Q_8$ is turned on via controller 140 after a dead-time started at t=$t_4$ with a duration $T_{dead}$ in order to avoid cross conduction with switch $Q_7$. Now the output inductance $L_{out}$ is charged with a slope which depends on the voltage across the reservoir capacitor $C_{c2}$ and the actual output voltage $V_{out}$. During this phase $C_{c2}$ is discharged while $C_{c1}$ is charged in series with $C_{res1}$. In this phase also switches $Q_2$, $Q_4$ and $Q_6$ are turned on with ZVS. After t=$t_5$ the resonant transition takes place between $C_{res1}$ and the leakage inductance of the multi-tapped autotransformer 850, whilst the second resonant mode transition takes place between $C_{res2}$ and the leakage inductance of the multi-tapped autotransformer 850. Similar to phase $t_0$-$t_3$, but differently, $C_{res2}$ is soft-charged from the input voltage source $V_{in}$ whilst $C_{res1}$ is soft-discharged. This state is shown in FIG. 15. FIG. 16 shows the equivalent circuit during the subintervals $t_5$-$t_8$ as previously discussed.

FIG. 16 is an example diagram illustrating an equivalent circuit of the hybrid power converter operating in the third mode according to examples herein.

Based on the equivalent resonant circuit of the proposed voltage converter 145 shown in FIG. 16, the following equations can be derived:

$$V_{Cres2} = V_{in} - V_{out}\left(\frac{N_1}{N_2} + 2\right) \quad (5)$$

$$2V_{out} + V_{C_{c1}} + V_{out}\left(\frac{N_1}{N_2} + 2\right) + V_{out}\frac{N_1}{N_2} = V_{in} \quad (6)$$

Considering the flux balance on the inductor $L_{out}$ and the equivalent total duty cycle $D_{tot}$=2*d if follows that $$V_{C_{c2}} = V_{C_{c1}} = \frac{V_{out}}{D_{tot}}.$$

With $V_{Cres1}=V_{Cres2}$ the same equation, as derived in equation (3), can be also calculated during this phase. Hence, considering phases between $t_0$-$t_3$ and $t_5$-$t_5$ it follows that the proposed converter is a dual phase resonant converter, as demonstrated in equation 3.

9. $t_6$-$t_7$: at t=$t_6$, switch $Q_8$ is turned off via controller 140 and the current 135-2 stops flowing from the reservoir capacitor $C_{C_2}$ to the power converter 122 (buck stage). During this phase, $C_{res2}$ is still soft-charged from the input voltage source 120 and $C_{res1}$ is still being discharged, resulting in charging the clamping capacitor $C_{c1}$. During this phase, $C_{res2}$ is still soft-charged from the input voltage source $V_{in}$ and $C_{res1}$ is still being discharged, resulting in charging of the clamping capacitor $C_{c1}$.

10. $t_7$-$t_8$: at t=$t_7$, switch $Q_9$ is turned on via controller 140 after a dead-time is started at t=$t_6$ with a duration $T_{dead}$ in order to avoid cross conduction with switch $Q_8$. After time t=$t_7$, the inductance current flows through switch $Q_9$ and the output inductor Lout is discharged to produce the output voltage $V_{out}$. During this phase, capacitor $C_{res2}$ is still soft-charged from the input voltage source $V_{in}$ and $C_{res1}$ is still being discharged, resulting charging of the clamping capacitor $C_{c1}$.

11. $t_8$-$t_9$: at t=$t_8$, switches $Q_2$, $Q_4$ and $Q_6$ are turned off via controller 140 and the parasitic capacitance of switch $Q_4$ is charged to $$V_{in}\left[1 - \frac{1}{4 + 2\frac{N_1}{N_2} + \frac{1}{D_{tot}}}\left(2 + \frac{1}{D_{tot}}\right)\right],$$

switch $Q_6$ is charged to $2V_{out}$, switch $Q_2$ is charged to $$V_{in}\left(1 - \frac{1}{4 + 2\frac{N_1}{N_2} + \frac{1}{D_{tot}}}\frac{1}{D_{tot}}\right),$$

whilst the parasitic capacitance of switches $Q_1$, $Q_5$ and $Q_3$ are discharged to zero, using the inductive energy stored in the inductor $L_{zvs}$ inductance at t=$t_8$. When the capacitance of switches $Q_1$, $Q_5$ and $Q_3$ are discharged to zero, their corresponding body diodes start to conduct to enable ZVS turn on. This state is shown in FIG. 14. During this phase, the output inductance is still discharged with the output voltage $V_{out}$ with switch $Q_9$ on. The current $i_{L_{zvs}}(t_8)$ that enables ZVS operation, is denoted as $i_{L_{zvs,pk}}$, is given by the following equation:

$$I_{L_{zvs,pk}} = \frac{V_{out}}{2*L_{zvs}*f_{sw}} = \frac{V_{in}}{2*L_{zvs}*f_{sw}\left(4+2\frac{N_1}{N_2}+\frac{1}{D_{tot}}\right)} \quad (7)$$

The current that enables ZVS is $i_{L_{zvs}}(t_8)$ which correspond with $-i_{L_{zvs,pk}}(t_3)$. Thus, $i_{L_{zvs,pk}}$ is a good index to establish when ZVS condition is achieved for all switches.

12. $t_9$-$t_{10}$: at t=$t_9$, switch $Q_9$ is turned off via controller 140 to avoid cross conduction with switch $Q_7$. During this phase the ZVS commutations on the unregulated power converter are not finalized yet because generally $T_{dead} > T_{dead_{HSC}}$. At t=$t_{11}$ switches $Q_1$, $Q_3$ and $Q_5$ are turned on in ZVS and switch $Q_7$ is turned on which correspond with one-cycle of the switching period $T_{sw}$.

With reference to FIG. 11, the time between time T0 and T10 (switching period) represents a first control cycle; the time between time T10 and T20 (switching period) represents a first control cycle; and so on. The duty cycle of activating the switches $Q_1$-$Q_6$ associated with power converter 121-1 is fixed. The duty cycle of activating the switches $Q_7$, $Q_8$, and $Q_9$ varies over time depending on consumption of current by the load 118.

Referring again to FIGS. 8 and 11, as well as other FIGS., examples herein include an energy storage component (such as reservoir capacitor Cc1, capacitor Cc2) coupled between the first power converter 121 and the second power converter 122. The energy storage component performs multiple operations. For example, during a first portion (such as between time T0 and time T3) of a respective control cycle (between T0 and T10), the energy storage component (reservoir capacitor Cc2) facilitates conversion of the input voltage 120 into the first output current 125-1 via activation of switches Q1, Q3, and Q5. In such an instance, the reservoir capacitor Cc2 is part of a resonant circuit path including the reservoir capacitor Cc2 in between node VN2 and node VN21. During a second portion (such as between time T5 and T8) of the respective control cycle of converting the input voltage 120 into the output voltage 123, node VN21 is connected to ground via switch Q6 on. In such an instance, the energy storage component (reservoir capacitor Cc2) provides (outputs) the intermediate voltage 135-2 from the energy storage component to the second power converter 122 through switch Q8. As previously discussed, the intermediate voltage 135-2 (current) serves as supply voltage (supply current) that energizes the inductor Lout through activated switch Q8 to produce the output current 125-2 and corresponding regulated output voltage 123.

Conversely, during the second portion (such as between time T5 and time T8) of the respective control cycle (between T0 and T10), the energy storage component (reservoir capacitor Cc1) facilitates conversion of the input voltage 120 into the first output current 125-1 via activation of switches Q2, Q4, and Q6. In such an instance, the reservoir capacitor Cc1 is part of a resonant circuit path between node VN1 and node VN11. During the first portion (such as between time T0 and T3) of the respective control cycle of converting the input voltage 120 into the output voltage 123, node VN11 is connected to ground via switch Q7 on. In such an instance, the energy storage component (reservoir capacitor Cc1) provides (outputs) the intermediate voltage 135-1 from the energy storage component (reservoir capacitor Cc1) to the second power converter 122 through switch Q7. As previously discussed, the intermediate voltage 135-1 (or current) serves as supply voltage (or supply current) that energizes the inductor Lout through activated switch Q8 to produce the output current 125-2 and corresponding regulated output voltage 123.

In accordance with further examples, as previously discussed, the second power converter 122-1 includes switch Q7 and switch Q9 disposed in series between the node VN1 of the reservoir capacitor Cc1 and a common ground reference associated with the first power converter 121-1 and the second power converter 122-2. The second power converter 122-1 also includes an inductor Lout disposed between node 839 (which couples the switch Q7 and switch Q8) and the output node 139.

Figure 17:
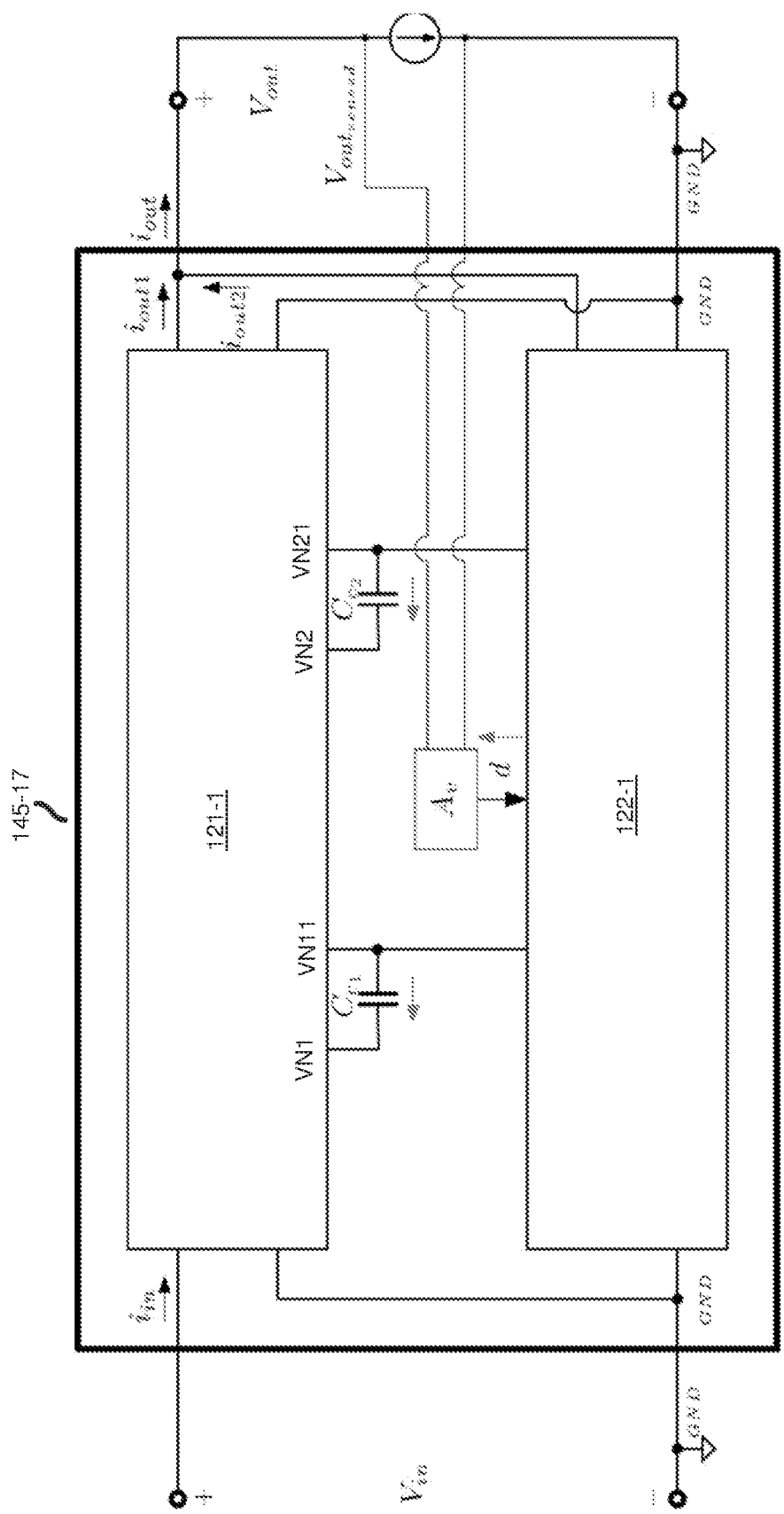
FIG. 17 is an example diagram illustrating analysis of a voltage converter according to examples herein.

FIG. 17 is an example diagram illustrating analysis of a hybrid power converter according to examples herein.

As shown, the voltage converter 145-17 achieves the output voltage regulation during a current variation of the output voltage 123. There are two feedback mechanisms:

1. Feedback from a closed loop control which works as the conventional control method (i.e. duty cycle modulation in a buck converter). In one example, the closed-loop control implemented by controller 140 increases the duty cycle of $PWM_{H1}$ driving switch $Q_9$ and $PWM_{H2}$ driving switch $Q_{10}$ to increase output voltage 123 and compensate for the decrease of the output voltage 123.

2. In case a positive load step occurs (such as transient increase in current consumption by the load 118), the output voltage 123 decreases. In one example, most of the additional output current 125 will be provided by the unregulated power converter 121-1. As the buck power converter 122-1 increases its duty cycle during this condition, the average voltage of the reservoir capacitor $C_{c1}$ and $C_{c2}$ decreases. The reduced voltage across the reservoir capacitors Cc1 and Cc2 increases the power drawn by the unregulated power converter 121-1 due to a shift of the actual ratio of the input voltage 120 to output voltage 123. Hence, this compensation lowers the actual impendence of the unregulated power converter 121-1, increasing the actual load current 125 such as $i_{out1}$ (i.e. output current of the unregulated stage).

Adaptive Dead-Time Control for the Unregulated Converter

As reported in equation (4) and equation (7) above, the energy which defines the ZVS capability depends on the output voltage 123. To achieve ZVS (Zero Voltage Switching) in all conditions, an active modulation of the dead time for $T_{dead-HSC}$ helps to keep high efficiency within the entire output voltage range. In one example, the system as described herein implements a direct dependency between regulated output voltage 123 and $T_{dead-HSC}$. Such a strategy can be applied in all unregulated converters where a zero voltage switching strategy is required.

Variation of the Division Ratio of the Unregulated Stage to Improve Regulation Capability in Wide Input Voltage Conditions As reported in equation (3) the proposed converter depicted in FIG. 8 shows a voltage regulation capability directly dependent on the duty-cycle of the regulated stage. From an overall efficiency perspective, it may be desired to use only a small fraction of the input voltage 120 for the regulation of the output voltage 123. In the case of a large input voltage 120 range, it might be required to adjust the division ratio of the unregulated power converter stage in multiple steps so as to keep the voltage across the reservoir capacitors Cc1 and Cc2 always within a reasonable voltage window range. Such an adjustment can be done by, for example, providing switches to the MTA to activate a different transformer ratio at input voltages outside an inner voltage band.

Alternative Unregulated Converters Used in the Novel Hybrid Sigma Converter

As previously discusses, the unregulated power converter 122 stage can be designed with several different unregulated topologies.

There are two key aspects to be considered when developing the proposed voltage converter 145 into a more generalized converter proposal. In one example, an embedded reservoir capacitor Cc1 or Cc2 needs to be periodically charged and discharged to operate in accordance with examples herein. First, the regulating power converter 122 draws periodic power (such as via intermediate voltage 135) from the respective reservoir capacitor and delivers this power to the load 118.

Second, in one example, the charging of each reservoir capacitors needs to be refilled precisely with the amount of energy depleted from the capacitor during the discharging cycle. Examples herein include a resonant charging cycle, which automatically refills the reservoir capacitors with the required amount of energy without further regulation: in case of deeper discharge the driving voltage across the resonant inductor is higher leading to a steeper di/dt and a higher peak current pulse. At lower discharge this principle works vice versa.

Nevertheless, according to examples herein, non-resonant charging cycles may be used. In this case, the controller (such as a regulation circuit) regulates the voltage across each of the reservoir capacitors and keeps it within the desired band.

Figure 18:
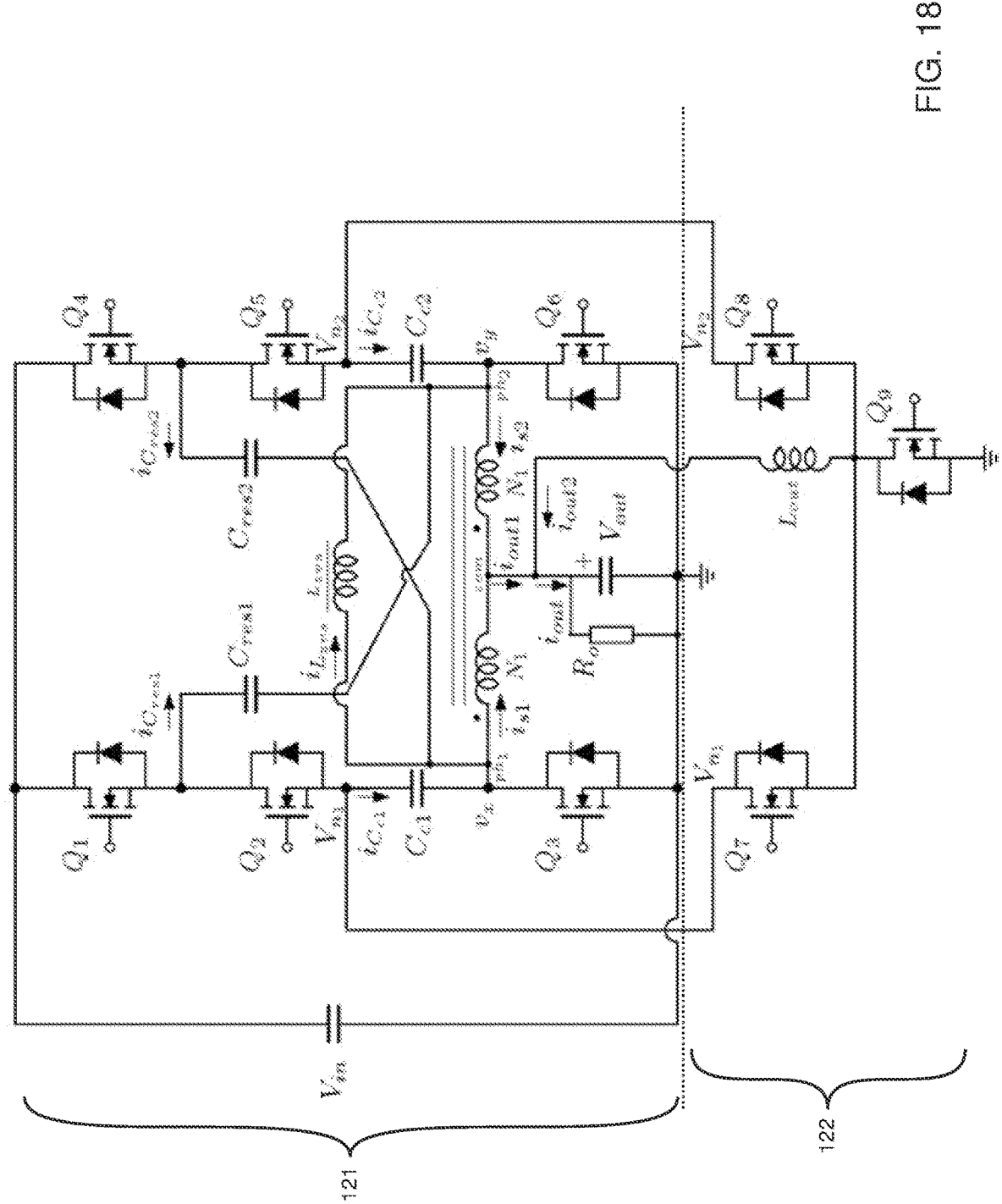
FIG. 18 is an example diagram illustrating a voltage converter according to examples herein.

FIG. 18 is an example diagram illustrating a hybrid power converter according to examples herein.

As previously discussed, the introduction of the reservoir capacitors is a major modification in the proposed voltage converter 145. Indeed, in one example, the power converter 121 performs a 4:1 conversion from input voltage 120 to the output voltage 123 without regulation; however, according to examples herein, the regulation capability increases this ratio to be greater than ratio 4 from input to output.

In FIG. 18, the voltage converter 145 is implemented as a switched-capacitor dual-phase resonant converter as the unregulated power converter 121. The unregulated power converter 122 performs, by design, at a fixed ratio conversion by having two windings fully coupled and with the same turns.

Figure 20:
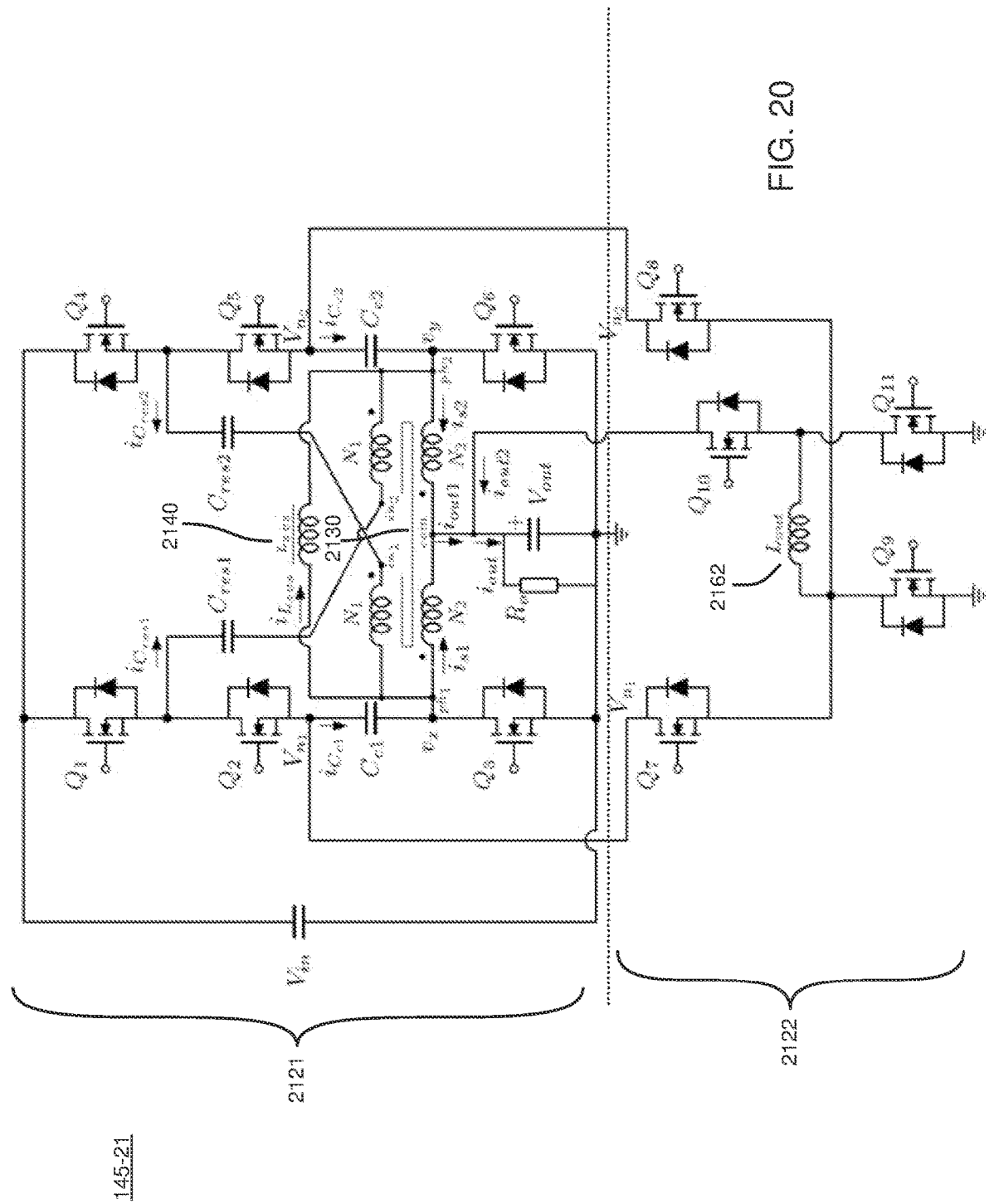
FIG. 20 is an example diagram illustrating of a voltage converter according to examples herein.

In FIG. 18, the unregulated power converter 121 is a dual-phase hybrid resonant switched capacitor converter. As mentioned, in general examples, the voltage converter 145 comprises two general blocks: an unregulated converter 121 and a regulated converter 122.

unregulated power converter 121 such as a switched-capacitor converter: composed by an interleaved flying capacitor structure connected to an autotransformer (i.e. having two windings with $N_1$ turns connected as shown in FIG. 20). An additional inductance in parallel with the autotransformer is added to achieve zero voltage switching (ZVS) for all switches. This inductance can be integrated in the autotransformer (i.e. as magnetizing inductance). All switches can be divided into two switch groups: the first switch group is formed by $Q_1$, $Q_3$ and $Q_5$ (control logic $PWM_H$ as shown in FIG. 11), and the second switch group ($Q_2$, $Q_4$ and $Q_6$) is controlled by a 180° phase shifted PWM signal (control logic $PWM_L$ as shown in FIG. 11) with respect to the first group having the same duty cycle. The converter operates with a fixed duty cycle (controlling the power converter 121) of ideally near 50% to obtain a minimum RMS current. As previously discussed, two additional reservoir capacitors $C_{c1}$ and $C_{c2}$ are added to act as source voltage for the regulated stage respectively between $Q_2$ $Q_3$ and $Q_5$ $Q_6$.

regulated power converter 122: comprises 3 switches $Q_7$ (control logic $PWM_{H_1}$), $Q_8$ (control logic $PWM_{H_2}$) and $Q_9$ (control logic $PWM_{L_{12}}$) and an output inductance Lout. Switches $Q_7$ and $Q_8$ act as high side FET sharing the same MOSFET low side $Q_9$.

Figure 19:
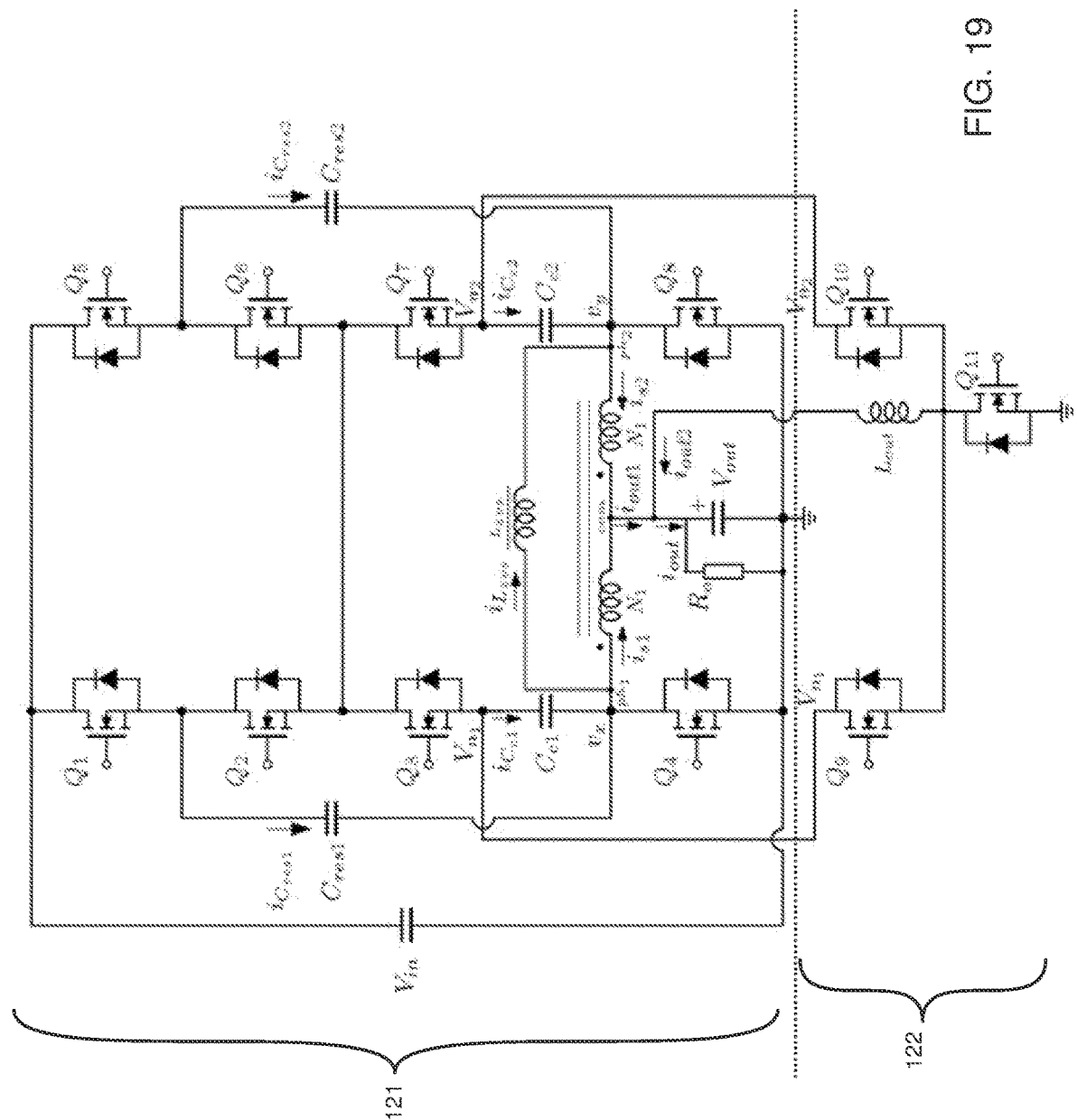
FIG. 19 is an example diagram illustrating a voltage converter according to examples herein.

FIG. 19 is an example diagram illustrating a hybrid power converter according to examples herein.

To provide a better figure of merit (FOM) for the switches of the converter reported in FIG. 18, an alternative solution is proposed in FIG. 19. For example, examples herein include voltage converter 145 implemented with a Hybrid Switched capacitor dual-phase resonant converter as an unregulated power converter stage. The unregulated power converter performs, by design, at a fixed ratio conversion by having two windings fully coupled with the same turns.

unregulated power converter circuit 121: formed by an interleaved flying capacitor structure connected to an autotransformer (i.e. having two windings with $N_1$ turns). An additional inductance in parallel with the autotransformer is added to achieve zero voltage switching (ZVS) for all MOSFETs. This inductance can be integrated in the autotransformer (i.e. as magnetizing inductance). All switches can be divided into two switch groups: the first switch group is formed by $Q_1$, $Q_3$, $Q_6$ and $Q_8$ (control logic $PWM_H$ as shown in FIG. 11), and the second switch group ($Q_2$, $Q_4$, $Q_5$ and $Q_7$) is commanded by a 180° phase shifted PWM signal (control logic $PWM_L$ as shown in FIG. 11) with respect to the first group having the same duty cycle. The converter operates with a fixed duty cycle ideally near 50% to obtain a minimum RMS current. Two additional reservoir capacitor $C_{c1}$ and $C_{c2}$ are added to act as source voltage for the regulated stage respectively between $Q_3$ $Q_4$ and $Q_7$ $Q_8$.

regulated buck converter: comprises 3 switches $Q_9$ (control logic $PWM_{H_1}$), $Q_{10}$ (control logic $PWM_{H_2}$) and $Q_{11}$ (control logic $PWM_{L_{12}}$) and an output inductance $L_{out}$. Switches $Q_9$ and $Q_{10}$ are acting as high-side switches sharing the same low-side switch $Q_{11}$.

FIG. 20 is an example diagram illustrating of a hybrid power converter according to examples herein.

As shown, the voltage converter 145-21 includes an unregulated power converter 2121 (such as a Hybrid Switched capacitor dual-phase resonant converter) having variable designed voltage ratio (such as ratio between N1 and N2) and a regulated power converter 2122 such as a non-inverting buck-boost as regulated stage.

The regulated non-inverting buck-boost converter (power converter 2122) includes 5 switches Q7, Q8, Q9, Q10, and Q11 and an output inductor Lout (inductor 2162). Switches Q7 and Q8 share use of the same low-side switch Q9 and represent an input portion of a half-bridge of the non-inverting buck-boost power converter 2122. The output half-bridge comprises switches Q10 and Q11.

Figure 21:
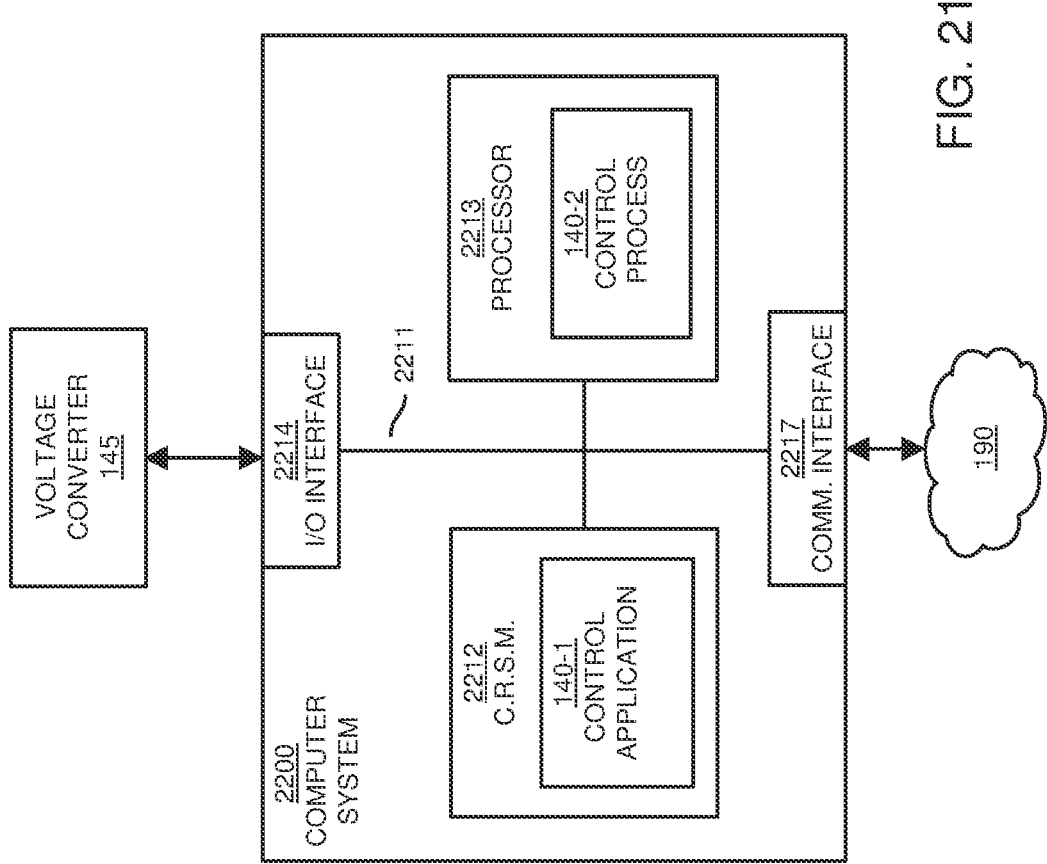
FIG. 21 is an example diagram illustrating computer processor hardware and related software instructions that execute methods according to examples herein.

FIG. 21 is an example block diagram of a computer device for implementing any of the operations as discussed herein according to examples herein.

As shown, computer system 2200 (such as implemented by any of one or more resources such as controller 140, power converter 121, power converter 122, etc.) of the present example includes an interconnect 2211 that couples computer readable storage media 2212 such as a non-transitory type of media (or hardware storage media) in which digital information can be stored and retrieved, a processor 2213 (e.g., computer processor hardware such as one or more processor devices), I/O interface 2214 (e.g., to output control signals to the power converter phases, monitor current, etc.), and a communications interface 2217.

I/O interface 2214 provides connectivity to any suitable circuitry such as power supply 100 and corresponding power converter phases 121, 122, etc.

Computer readable storage medium 2212 can be any hardware storage resource or device such as memory, optical storage, hard drive, floppy disk, etc. In one example, the computer readable storage medium 2212 stores instructions and/or data used by the controller application 140-1 to perform any of the operations as described herein.

Further in this example, communications interface 2217 enables the computer system 2200 and processor 2213 to communicate over a resource such as network 190 to retrieve information from remote sources and communicate with other computers.

As shown, computer readable storage media 2212 (such as computer-readable storage hardware) is encoded with controller application 140-1 (e.g., software, firmware, etc.) executed by processor 2213. Controller application 140-1 can be configured to include instructions to implement any of the operations as discussed herein.

During operation of one example, processor 2213 accesses computer readable storage media 2212 via the use of interconnect 2211 in order to launch, run, execute, interpret or otherwise perform the instructions in controller application 140-1 stored on computer readable storage medium 2212.

Execution of the controller application 140-1 produces processing functionality such as controller process 140-2 in processor 2213. In other words, the controller process 140-2 associated with processor 2213 represents one or more aspects of executing controller application 140-1 within or upon the processor 2213 in the computer system 2200.

In accordance with different examples, note that computer system 2200 can be a micro-controller device, logic, hardware processor, hybrid analog/digital circuitry, etc., configured to control a power supply and perform any of the operations as described herein.

Functionality supported by the different resources will now be discussed via flowchart in FIG. 22. Note that the steps in the flowcharts below can be executed in any suitable order.

Figure 22:
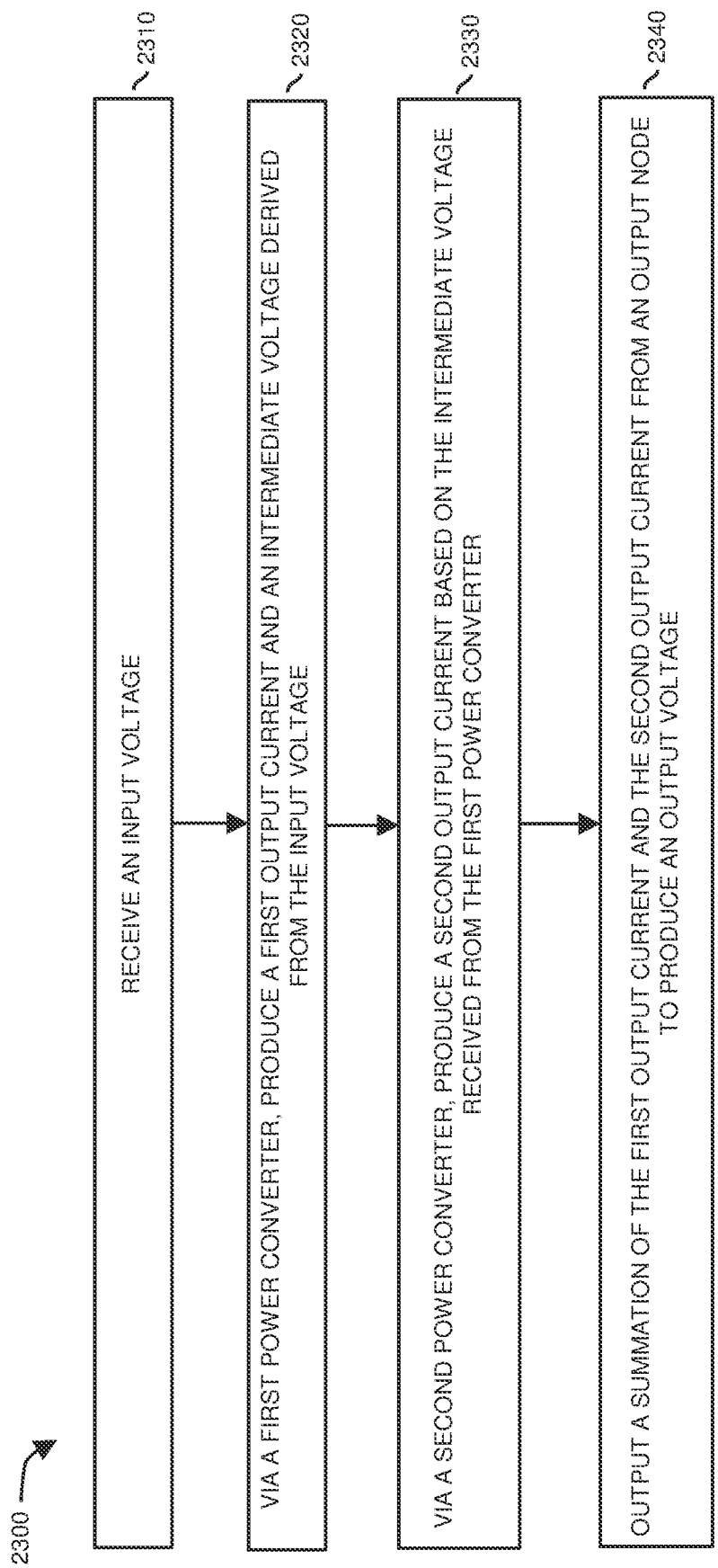
FIG. 22 is an example diagram illustrating a method according to examples herein.

FIG. 22 is an example diagram illustrating a method of controlling a power converter according to examples herein.

In processing operation 2310, the voltage converter 145 receives the input voltage 120.

In processing operation 2320, the controller 140 controls a first power converter 121 to produce a first output current 125-1 derived from an input voltage 120.

In processing operation 2330, the controller 140 controls a second power converter 122 to produce a second output current 125-2 based on a supply voltage 135 received from the first power converter 121.

In processing operation 2340, the voltage converter 145 (such as a combination of the first power converter 121 and the second power converter 122) outputs a summation (such as output current 125) of the first output current 125-1 and the second output current 125-2 from a respective output node 139 of the voltage converter 135 to produce the output voltage 123 powering load 118.

Figure 23:
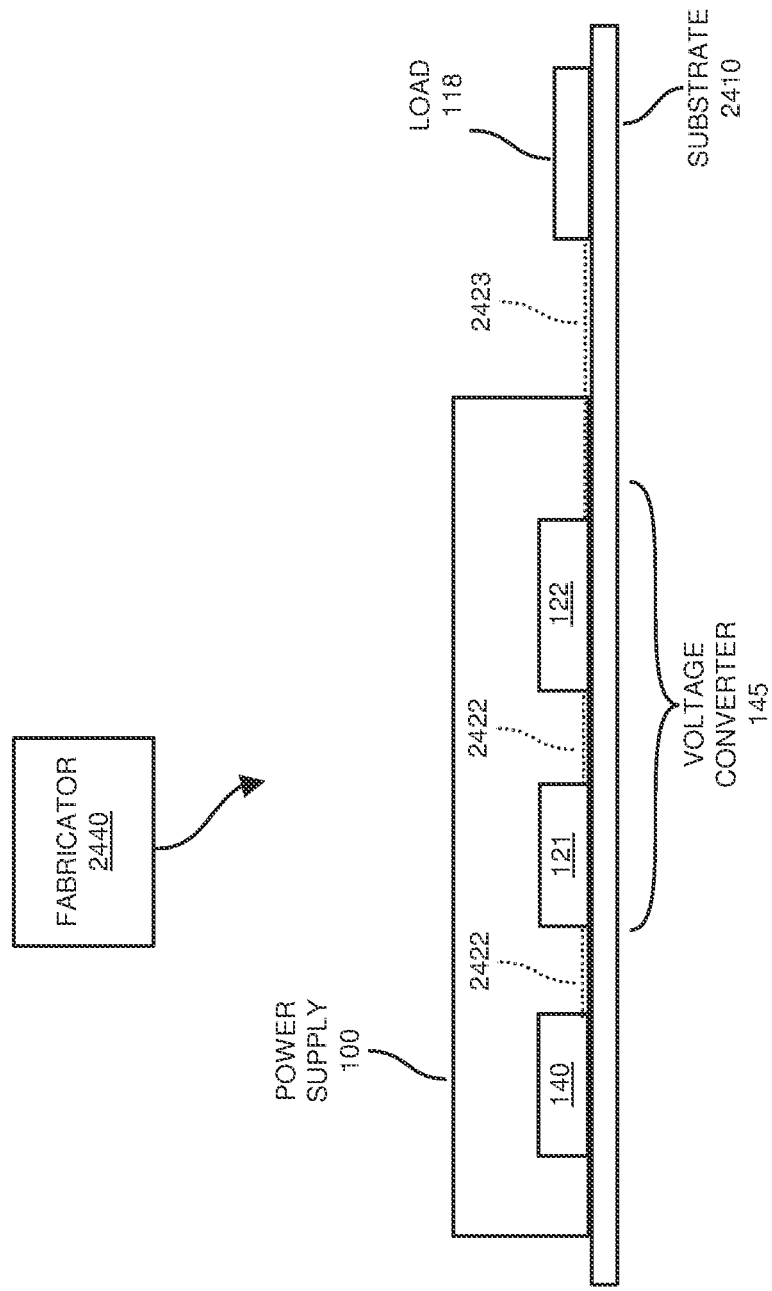
FIG. 23 is an example diagram illustrating assembly of a power supply and related circuitry according to examples herein.

FIG. 23 is an example diagram illustrating assembly of a power supply and multiple interconnected power converter phases on a circuit board according to examples herein.

In this example, assembler 2440 receives a substrate 2410 and corresponding components of power supply 100 to fabricate controller 140, power converter 121, and power converter 122. The assembler 2440 affixes (couples) the controller 140 and other components such as associated with the power supply 100 to the substrate 2410.

Via respective circuit paths 2422 as described herein, the assembler 1440 provides connectivity between the controller 140, power converter 121, and power converter 122. Circuit paths (or one or more links) connect the power converter 121 and the power converter 122 to the load 118.

Note that components such as the controller 140, power converter 121, power converter 122, etc., and corresponding components can be affixed or coupled to the substrate 2410 in any suitable manner. For example, each of the one or more of the components in power supply 100 can be soldered to the substrate 2410, inserted into respective sockets disposed on the substrate 2410, etc.

Note further that the substrate 2410 is optional. Any of one or more circuit paths or connectivity as shown in the drawings and as described herein can be disposed in cables or other suitable medium.

In one nonlimiting example, the load 118 is disposed on its own substrate independent of substrate 2410; the substrate of the load 118 (such as substrate 2410 or other substrate) is directly or indirectly connected to the substrate 2410 via connectivity 2423 such as one or more of wires, cables, links, etc. The controller 140 or any portion of the power supply 100 and corresponding power converters 121 and 122 can be disposed on a standalone smaller board plugged into a socket of the substrate 2410 as well.

Via one or more circuit paths 2423 (such as one or more traces, cables, connectors, wires, conductors, electrically conductive paths, etc.), the assembler 2440 couples the power supply 100 and corresponding components to the load 118. In one example, the circuit path 2423 conveys the output voltage 123 and corresponding current 125 (such as output current 125-1 and output current 125-2) to the load 118.

Accordingly, examples herein include a system comprising: a substrate 2410 (such as a circuit board, standalone board, mother board, standalone board destined to be coupled to a mother board, host, etc.); a power supply system 100 including corresponding components as described herein; and a load 118 (such as a motor, winding, etc.).

Note that the load 118 can be any suitable circuit or hardware such as one or more CPUs (Central Processing Units), GPUs (Graphics Processing Unit) and ASICs (Application Specific Integrated Circuits such those including one or more Artificial Intelligence Accelerators), which can be located on the substrate 2410 or disposed at a remote location.

Figure 24:
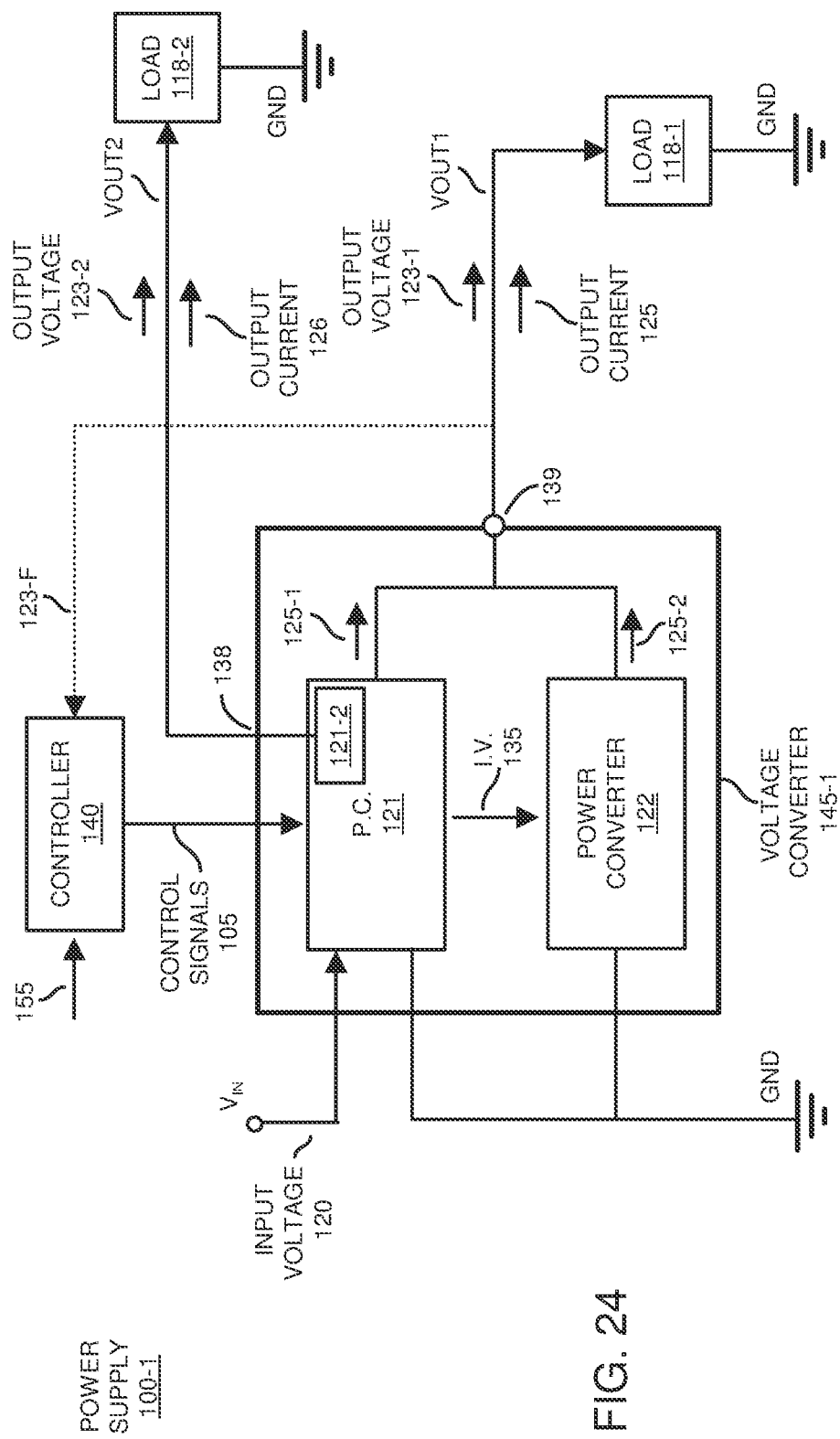
FIG. 24 is an example general diagram illustrating a power converter as discussed herein.

FIG. 24 is an example general diagram illustrating a power converter as discussed herein.

In this example, this instance of the power supply 100-1 includes controller 140 and voltage converter 145-1. Voltage converter 145-1 includes a first power converter 121, a second power converter 122, and a third power converter 121-2.

The first power converter 121 produces intermediate voltage 135 and first output current 125-1, both of which are derived from the input voltage 120. The first power converter 121 supplies the intermediate voltage 135 to the second power converter 122.

The second power converter 122 produces a second output current 125-2 based on the intermediate voltage 135 (a.k.a., supply voltage, auxiliary voltage, etc.) received from the first power converter 121.

As previously discussed, power converter 121 can be configured to include supplemental circuit components such as associated with power converter 121-2. The power converter 121-2 generates output current 126 and corresponding respective output voltage 123-2 (VOUT2) outputted from the output node 138 to power the load 118-2.

Note that the output node 139 of the voltage converter 145-1 outputs a summation of the first output current 125-1 and the second output current 125-2 (output current 125) to produce an output voltage 123 to power the load 118.

Thus, output voltage 123-1 (a.k.a., VOUT1) powers load 118-1 such as via the sum of output current 125-1 and output current 125-2 to the dynamic load 118. Output voltage 123-2 (a.k.a., VOUT2) generated by the power converter 121-2 of the power converter 121 powers the load 118-2 via corresponding output current 126.

As further discussed herein, one of the power converters in the voltage converter 145-1 can be configured to provide voltage regulation such that the output voltage 123 is regulated within a desired range.

In further examples, a magnitude of the intermediate voltage 135 is a less-than-all fraction of a magnitude of the input voltage 120. For example, a magnitude of the intermediate voltage 135 may be less than the magnitude of the input voltage 120.

As further shown, in one example, both the first power converter 121 and the second power converter 122 are referenced with respect to a common ground voltage (GND) associated with the input voltage 120 (such as a first DC voltage) and the output voltage 123 (such as a second DC voltage).

Note further that one of the power converters associated with the voltage converter 145-1 can be a regulated power converter. For example, in one example, the first power converter 121 is an unregulated power converter; the second power converter 122 is a regulated power converter. In accordance with further examples, alternatively, the first power converter of voltage converter 145-1 is a regulated power converter 121; the second power converter of voltage converter 145-1 is an unregulated power converter 122. Further examples are discussed below. The power converter 122-1 may be unregulated or semi-regulated to the extent that the output voltage 123-2 is approximately maintained within a voltage range as opposed to being tightly controller with respect to a setpoint reference voltage.

The contribution of current supplied by each of the power converters in voltage converter 145-1 can vary depending on the example. In one example, a magnitude of the first output current 125-1 is greater than a magnitude of the second output current 125-2.

In accordance with further examples, the input voltage 120 supplies power to the first power converter 121 and the second power converter 122. As previously discussed, the first power converter 121 derives the first output current 125-1 from a first portion of the power supplied by the input voltage 120 to the voltage converter 145-1. The second power converter 122 derives the second output current 125-2 from a second portion of the power supplied by the input voltage 120 to the voltage converter 145-1.

As further shown in FIG. 1, examples of the power supply 100-1 include a controller 140. In one example, the controller 140 monitors a magnitude of the output voltage 123-1 (such as via an output voltage feedback signal 123-F) with respect to a setpoint voltage 155. The controller 140 controls operation of the first power converter 121 and the second power converter 122. For example, in furtherance of regulating the output voltage feedback signal 123-F (such as the output voltage 123 or signal derived from the output voltage 123) and corresponding output voltage 123-1 with respect to the desired setpoint voltage 155, the controller 140 adjusts a magnitude of the output current 125-1 and/or magnitude of the second output current 125-2 derived from the intermediate voltage 135 to maintain the magnitude of the output voltage 123 at or around the desired setpoint voltage 155.

Additional examples herein are further discussed below.

Figure 25:
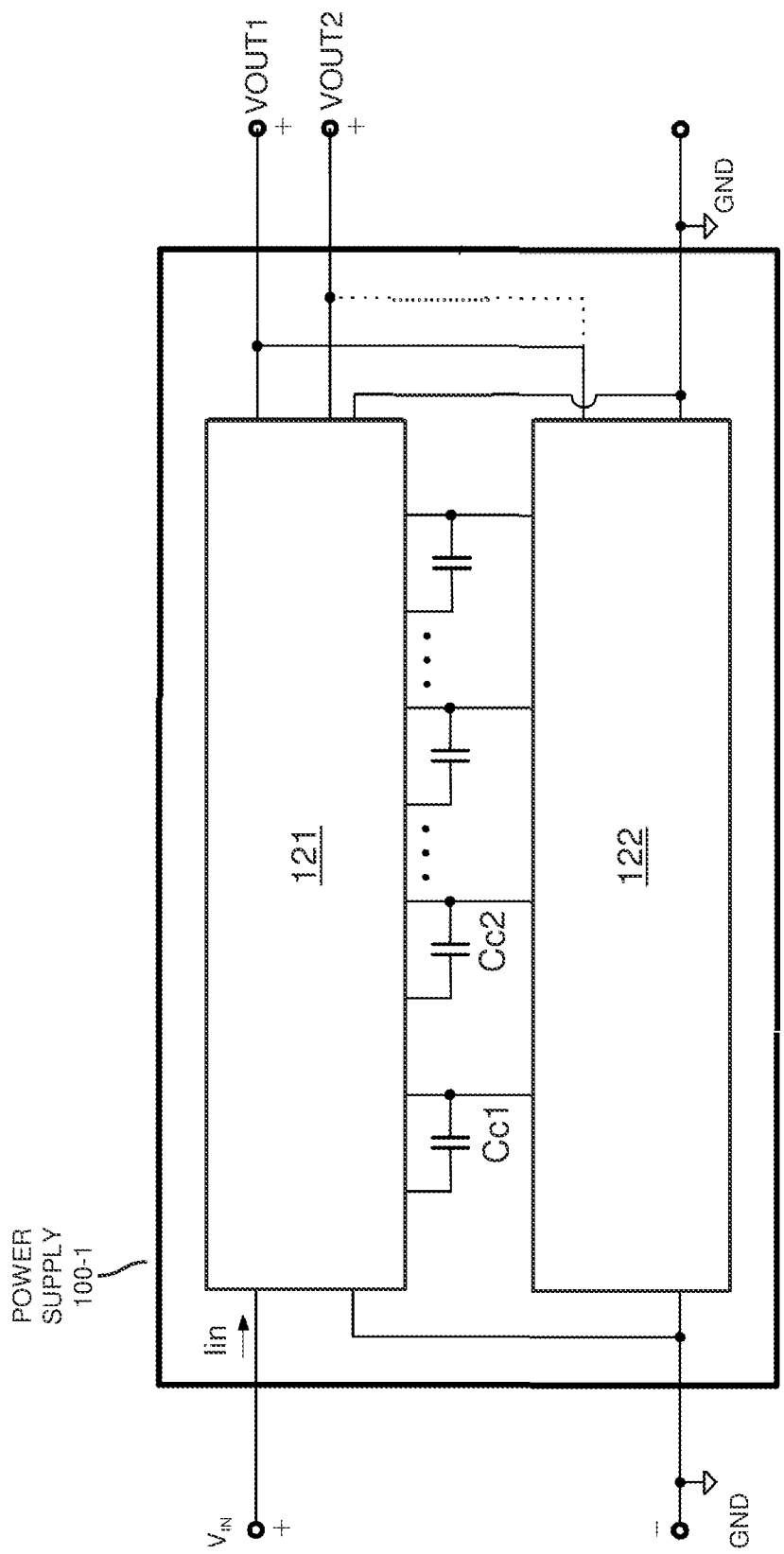
FIG. 25 is an example diagram illustrating a multi-rail hybrid switched capacitor converter as described herein.

FIG. 25 is an example diagram illustrating a multi-rail hybrid switched capacitor converter as described herein.

As shown, the implementation of the power supply 100-1 in FIG. 25 supplies, as derived from an input voltage VIN, one regulated voltage rail such as VOUT1. As discussed herein, proposed is a Sigma Hybrid Switched capacitor power converter which, from a single input voltage rail such as VIN, supplies in parallel two output voltage rails (such as VOUT1 and VOUT2) within the same power supply converter where the power supply 100-1 may be a so-called sigma hybrid switched capacitor converter.

The proposed Multi-Rail Sigma Hybrid Switched capacitor (M-converter, where a general description is reported in FIG. 25, is operative to provide high efficiency, high power density, scalability (i.e. several Multi-Rail Sigma Hybrid Switched capacitor converter can be parallelized). The proposed Multi-Rail Sigma Hybrid Switched capacitor (M-SHSC) converter can be configured to include multiple power stages, which they have their inputs strictly series connected and their outputs paralleled. As, referring to other FIGS., the unregulated and regulated converter as discussed herein can be configured to share the same GND as the output or implement a non-isolating topology can be chosen here.

As previously discussed, FIG. 25 may be a generalized Multi-Rail Sigma Hybrid Switched Capacitor (M-SHSC) converter as discussed herein.

In this example M-SHSC power converter, by merging unregulated hybrid switched capacitor converter and regulated converter it is possible to supply two rails where the first one is regulated whilst the second one presents a semi-regulated behavior. Semi regulated means that the magnitude of the output voltage VOUT2 falls within a range as opposed to be tightly controlled to a setpoint reference voltage.

The power converter 100-1 provides from a single input voltage VIN two rails VOUT1 and VOUT2 where the output voltage of one converter depends on the duty cycle applied to the regulated stage whilst the second rails depends primarily on the duty cycle applied to the regulated stage and secondary depending on its output impedance (i.e. dependent on the load condition on the first rail).

$$V_{out1} = \frac{V_{in}}{n_1 + \frac{1}{D_{tot}}} - I_{out1} * R_{out1}(I_{out2}) \quad (1)$$

$$V_{out_2} = \frac{V_{in}}{n_2 + \frac{1}{D_{tot}}} - I_{out2} * R_{out2}(I_{out1}) \quad (2)$$

As can be notices from eq. (1) and eq. (2) the two output voltages f M-SHSC have a direct dependencies with $D_{tot}$ (i.e. equivalent duty-cycle imposed by the regulated topology), however, due to their different impedance, full regulation can be achieved only on one of the two rails (i.e. on the first rail $V_{out_1}$). Nevertheless, a semi-regulation capability can be achieved also on the second rail (i.e. on the first rail $V_{out_2}$) since the converter has a low impedance on the output (i.e. it depends mainly on the unregulated converter which intrinsically offers low output impedance behavior).

Considering that the output voltage $V_{out_2}$ is regulated at the reference voltage $V_{out_{2_{ref}}}$, and taking into account equation 1 and equation 2, the following equations are valid:

$$V_{out_{ref}} = \frac{V_{in}}{n_2 + \frac{1}{D_{tot}}} - I_{out2} * R_{out2}(I_{out1}) \quad (3)$$

from where it follows that:

$$V_{in} \simeq \quad (4)$$
$$V_{out_{ref}} * \left(n_2 + \frac{1}{D_{tot}}\right) + I_{out2} * R_{out2}(I_{out1}) * \left(n_2 + \frac{1}{D_{tot}}\right) - I_{out1} * R_{out1}(I_{out2})$$

considering that the ideal target for $$V_{out_1} = V_{out1_{ref}} * \frac{n_2}{n_1},$$

it follows that the voltage error on $V_{out_1}$ is given by the following equation:

$$\Delta V_{out_1}(I_{out1}, I_{out2}) \simeq I_{out2} * R_{out2}(I_{out1}) * \frac{n_2 + \frac{1}{D_{tot}}}{n_1 + \frac{1}{D_{tot}}} - I_{out1} * R_{out1}(I_{out2}) \quad (5)$$

From the above demonstration, it follows further that the proposed converter 100-1 can be configured to supply from the same received input bus VIN, two distinct rails: one regulated and the second semi-regulated/regulated. The semi-regulation/regulation capability is explained by equation 8 from where it follows that low converter output impedance are making such rail semi-regulated/regulated. Semi-regulated means that the magnitude of the output voltage may generally by around a setpoint reference voltage. For this reason, a multi-rail Hybrid Sigma Switching capacitor converter is used for such approach.

As reported in FIG. 25, the regulated converter can be connected either to $V_{out_1}$ or to $V_{out_2}$ as shown with the dotted connection where the current coming from the regulated stage is respectively $i_{out1,2}$ or $i_{out2,2}$.

Figure 26:
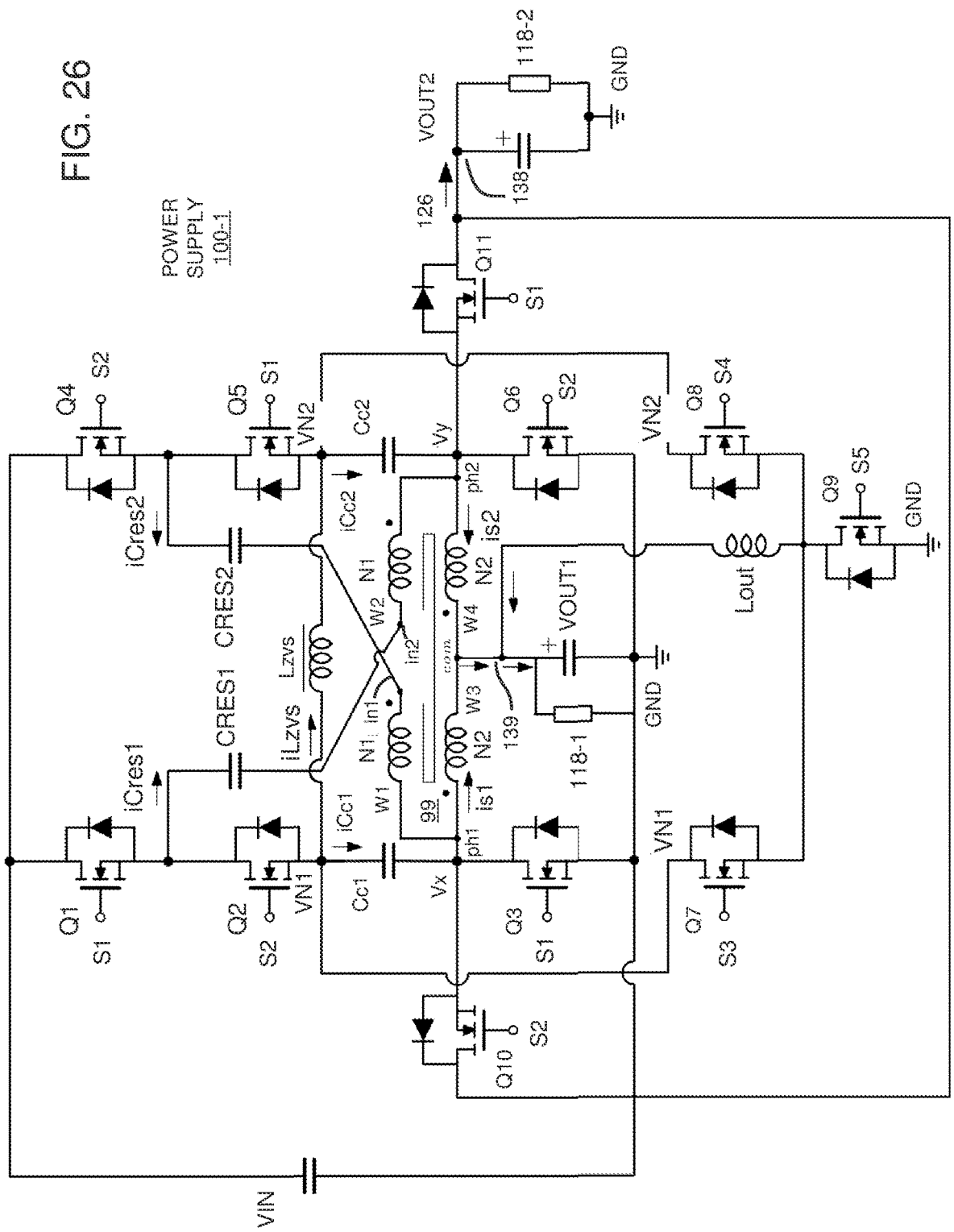
FIG. 26 is an example diagram illustrating implementation of a power supply as described herein.

FIG. 26 is an example diagram illustrating implementation of a power supply is described herein.

In this example, the power supply 100-1 is a Sigma Hybrid Switched capacitor converter, which comprises two converters (i.e. one is regulated and the other is unregulated) supplying two voltage rails VOUT1 and VOUT2. If desired, the two rails VOUT1 and VOUT2 can be configured to track each other during a load transient due to an intrinsic dependency of the output resistive impedance on each of the two voltage rails.

An example of multi-rail hybrid switched capacitor M-SHSC converter comprising an HSC as unregulated stage and a buck converter as regulated stage (switches Q7, Q8, Q9, and inductor Lout) as shown in FIG. 26.

The proposed power supply 100-1 can be configured to supply two rails in parallel $V_{out1}$ and $V_{out2}$. Considering the implementation of the power converter 100-1 reported in FIG. 26, below is reported a possible transfer function of the converter 100-1:

$$\frac{V_{in}}{V_{out_1}} = 4 + 2\frac{N_1}{N_2} + \frac{1}{D_{tot}} \quad (6)$$

Where $D_{tot}$ is the equivalent duty cycle of the regulated stage. Considering the circuit reported in FIG. 26, the output voltage $V_{out_2}$ is $2*V_{out_1}$ therefore the ratio between input voltage $V_{in}$ and output voltage $V_{out_2}$ is given by the following equation:

$$\frac{V_{in}}{V_{out_2}} = 2 + \frac{N_1}{N_2} + \frac{1}{2D_{tot}} \quad (7)$$

According to this, the proposed power converter is scalable itself to different conversion ratios by designing only the ratio between $N_1$ and $N_2$. This is a new family of regulated multi-rail sigma hybrid switched dc-dc converter with different ratios.

The implementation of the power converter 100-1 in FIG. 25 and FIG. 26 can be configured to include:

The unregulated Hybrid switched capacitor converter: formed by an interleaved flying capacitor structure) capacitor Cc1 and Cc2) connected to a multi-tapped autotransformer 99. An additional inductance Lzvs in parallel with the multi-tapped autotransformer 99 is added to achieve zero voltage switching (ZVS) for all switches, which can be also integrated in the transformer 99 to reach higher power density. All switches Q1-Q11 can be divided into two switch groups: the first switch group is formed by $Q_1$, $Q_3$, $Q_5$ and $Q_{11}$ (control logic $PWM_H$ as shown in FIG. 11), and the second switch group ($Q_2$, $Q_4$, $Q_6$ and $Q_{10}$) is controlled by a 180° phase shifted PWM (control logic $PWM_L$ as shown in FIG. 11) with respect to the first group with the same duty cycle. The converter operates with a fixed duty cycle ideally near 50% to obtain the minimum RMS current. Two additional reservoir capacitors $C_{c1}$ and $C_{c2}$ are added to act as source voltage for the regulated stage respectively between switch $Q_2$ $Q_3$ and $Q_5$ $Q_6$.

The regulated buck converter in this example comprises 3 FETs $Q_7$ (control logic $PWM_{H_1}$ referring to FIG. 13), $Q_8$ (control logic $PWM_{H_2}$ referring to FIG. 13) and $Q_9$ (control logic $PWM_{L_{1,2}}$ referring to FIG. 13) and an output inductance Lout. Switches $Q_7$ and $Q_8$ are acting as high side FETs sharing the same sync switch, low-side switch $Q_9$.

Figure 27:
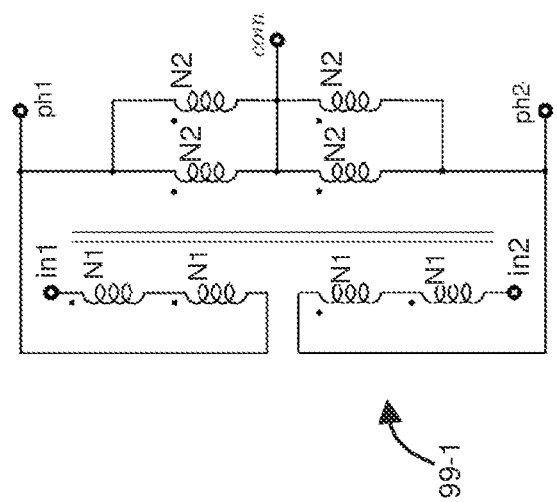
FIG. 27 is an example diagram illustrating a multi-matrix autotransformer with multi-elements inter-wired as a magnetic component as described herein.

FIG. 27 is an example diagram illustrating a multi-Matrix autotransformer with 2 elements inter-wired as a magnetic component as described herein.

To further increase the performance of the magnetic transformer 99 (winding W1, winding W2, winding W3, winding W4). the implementation of a multi-tapped matrix autotransformer 99-1 (MMTA) is shown in FIG. 27.

As previously reported in above equation 6 and equation 7, the actual ratio between input voltage 121 and a respective output voltage depends on the ratio between $N_1$ and $N_2$, considering the converter depicted in FIG. 26. Instead, if the multi-tapped matrix autotransformer, reported in FIG. 27 is used, the ratio between input voltage $V_{in}$ and output voltage $V_{out_1}$ and output voltage $V_{out_2}$ is given by the following equations:

$$\frac{V_{in}}{V_{out_1}} = 4 + 2\frac{2N_1}{N_2} + \frac{1}{D_{tot}} \quad (8)$$

$$\frac{V_{in}}{V_{out_2}} = 2 + \frac{2N_1}{N_2} + \frac{1}{2D_{tot}} \quad (9)$$

Figure 28:
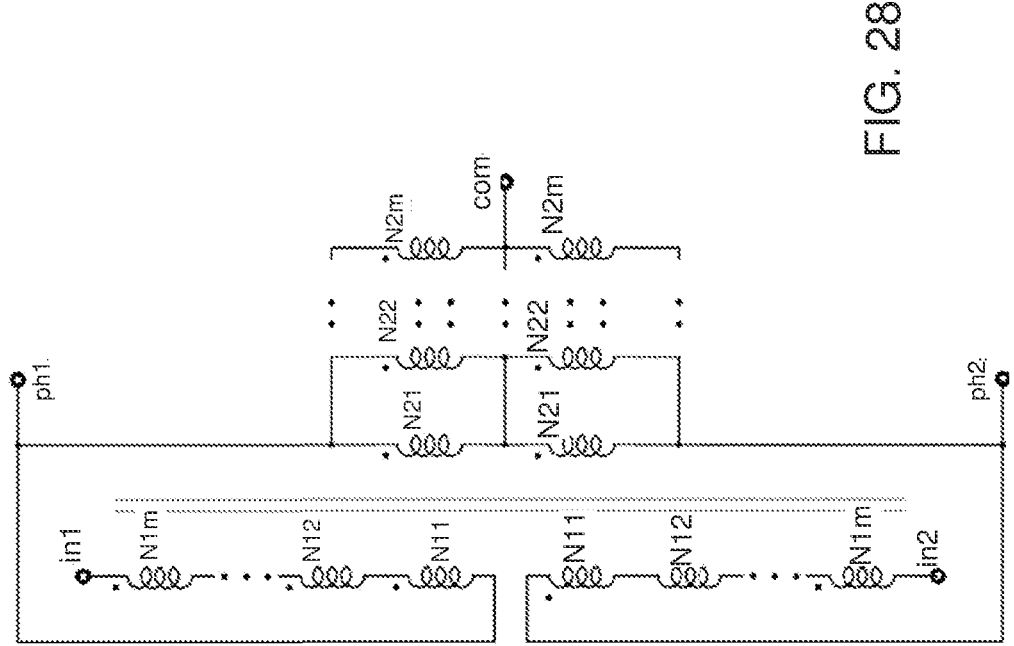
FIG. 28 is an example diagram illustrating a multi-tap matrix autotransformer with multiple inter-wired elements as described herein.

FIG. 28 is an example diagram illustrating multi-tap matrix autotransformer with multiple inter-wired elements as described herein.

If an array of MMTA 99-2 is used in the power converter 100-1 as reported in FIG. 28, with $N_{1_x}$ windings connected in series at the corresponding input side, whilst at the corresponding output side $N_{2_x}$ windings are connected in parallel. If an array of multi-tapped matrix autotransformer is used, the ratio between input voltage $V_{in}$ and output voltage $V_{out_1}$ and output voltage $V_{out_2}$ is given by the following equations:

$$\frac{V_{in}}{V_{out_1}} = 4 + 2\frac{MN_1}{N_2} + \frac{1}{D_{tot}} \quad (10)$$

$$\frac{V_{in}}{V_{out_2}} = 2 + \frac{MN_1}{N_2} + \frac{1}{2D_{tot}} \quad (11)$$

where M is the number of windings connected in series at the input windings and in parallel at the output windings. The benefits of using a MMTA, in the proposed topology, are that it can split current between output windings connected in parallel reducing the leakage inductance of the output windings loop and reducing the overall winding losses, as shown in equation 3.

As previously discussed, FIG. 10 reports an example of a control system of the proposed Multi-rail Hybrid Sigma converter based on the circuit shown in FIG. 26. As depicted in FIG. 10, the system establishes a closed loop control with the output voltage $V_{out}$ and/or output current Iout information (i.e. droop function implemented). The output current $I_{out}$ is the sum of the current from the unregulated and the regulated stage. Considering the circuit depicted in FIG. 26, the regulated converter comprises two buck stages \, phase shifted by 180° sharing the same inductance $L_{out}$ and the same low-side FET (i.e. can be identified also as single buck converter with two input terminals since two high-side FETs Q7 and Q8 are sharing the same output inductance $L_{out}$). The regulated converter is controlled by $PWM_{H_1}$, $PWM_{H_2}$ and $PWM_{L_{1,2}}$, where a duty-cycle modulation is used.

Note that the unregulated stage and the regulated stage can be synchronized and this may be done at SYNC block level. As shown in timing diagram 1100 in FIG. 11 driving respective switches, the rising edge of $PWM_H$ is synchronized with the rising edge of $PWM_{H_1}$ as ensured also for $PWM_L$ with $PWM_{H_2}$. The system and controller 140 can be configured to produce signals S1 to S5 at a fixed switching frequency $f_{sw}$, but might also be controlled in a narrow frequency variation to improve the steady state efficiency of the unregulated stage.

Figure 29:
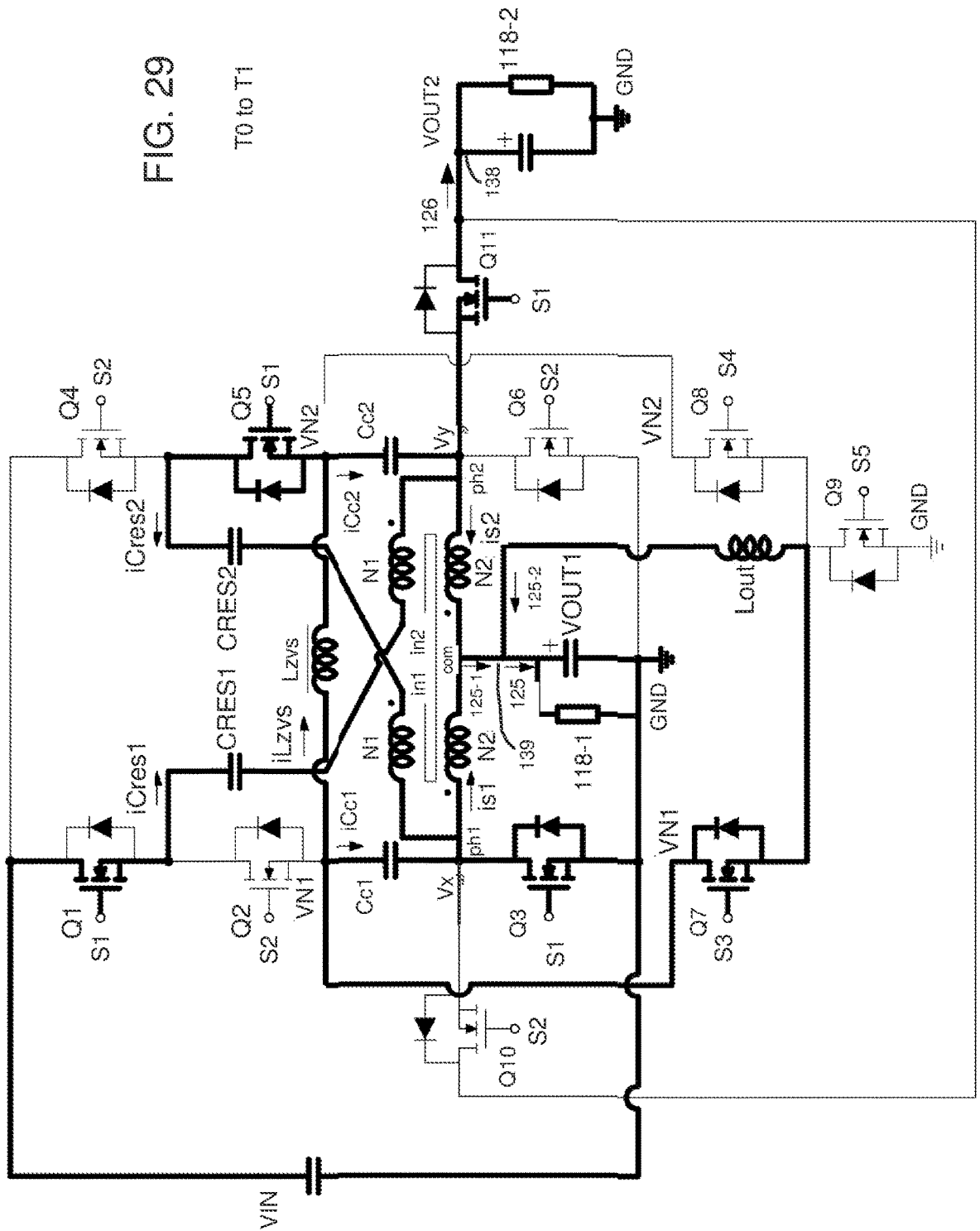
FIG. 29 is an example diagram illustrating a state of a hybrid power converter as described herein.
Figure 30:
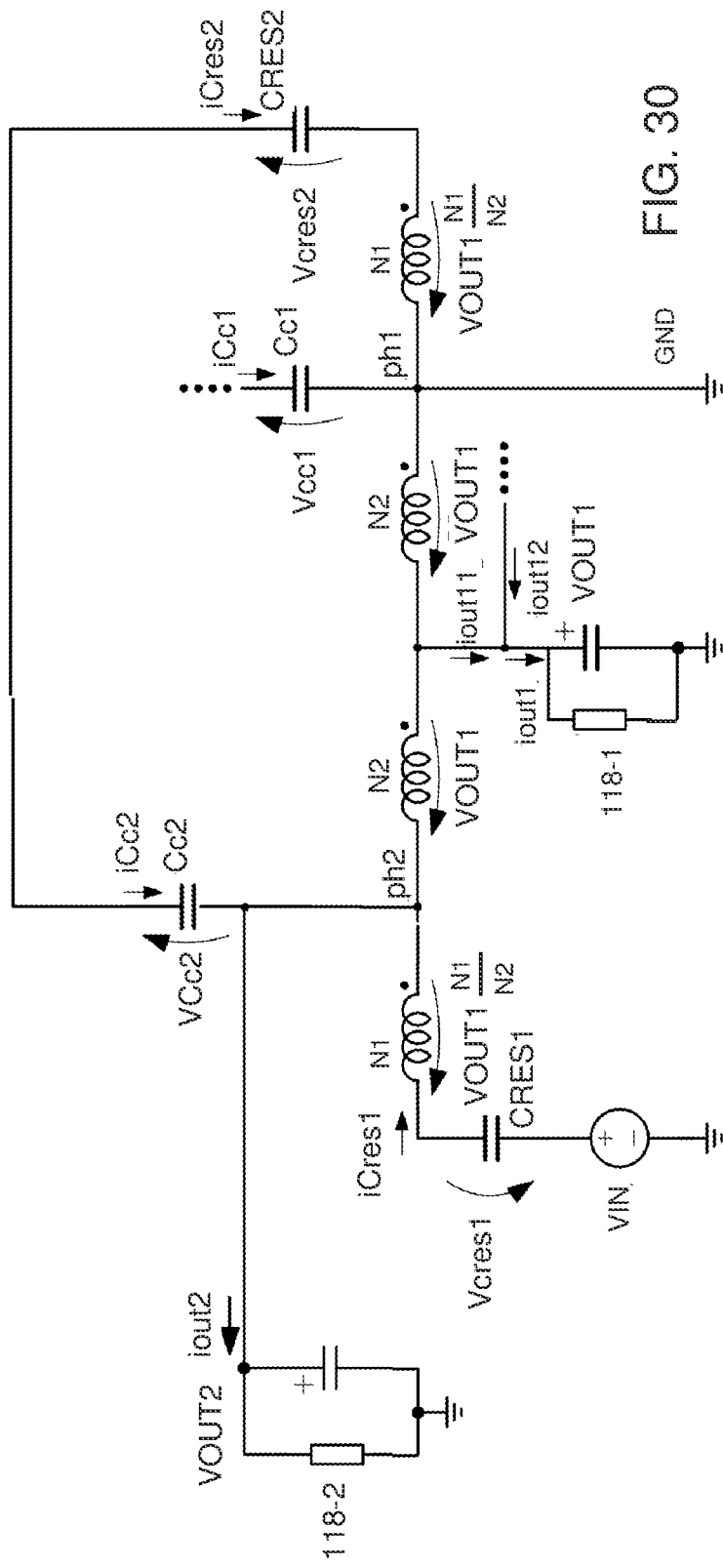
FIG. 30 is an example equivalent circuit diagram associated with the hybrid power converter as described herein.
Figure 31:
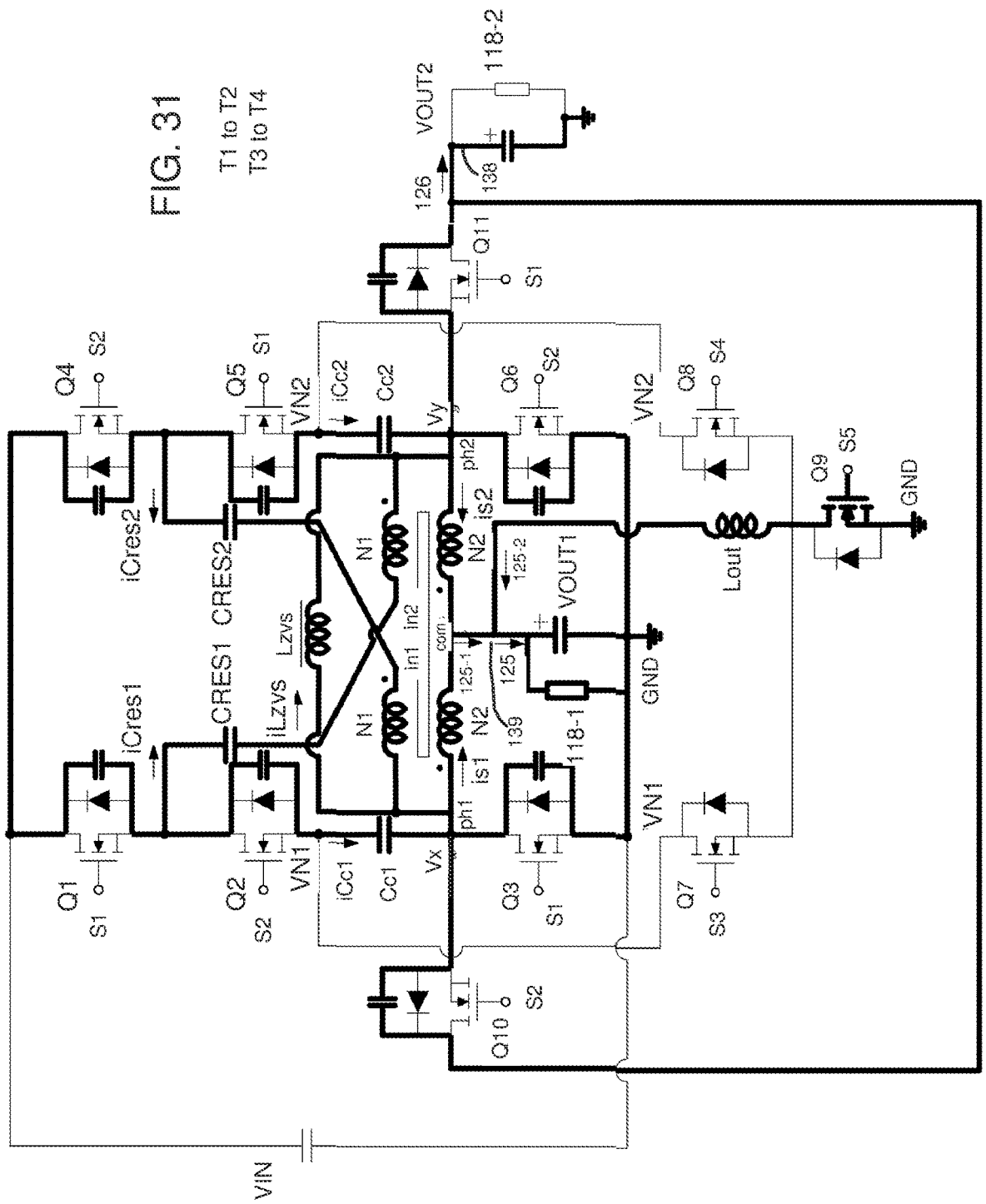
FIG. 31 is an example diagram illustrating a state of a hybrid power converter described herein.
Figure 32:
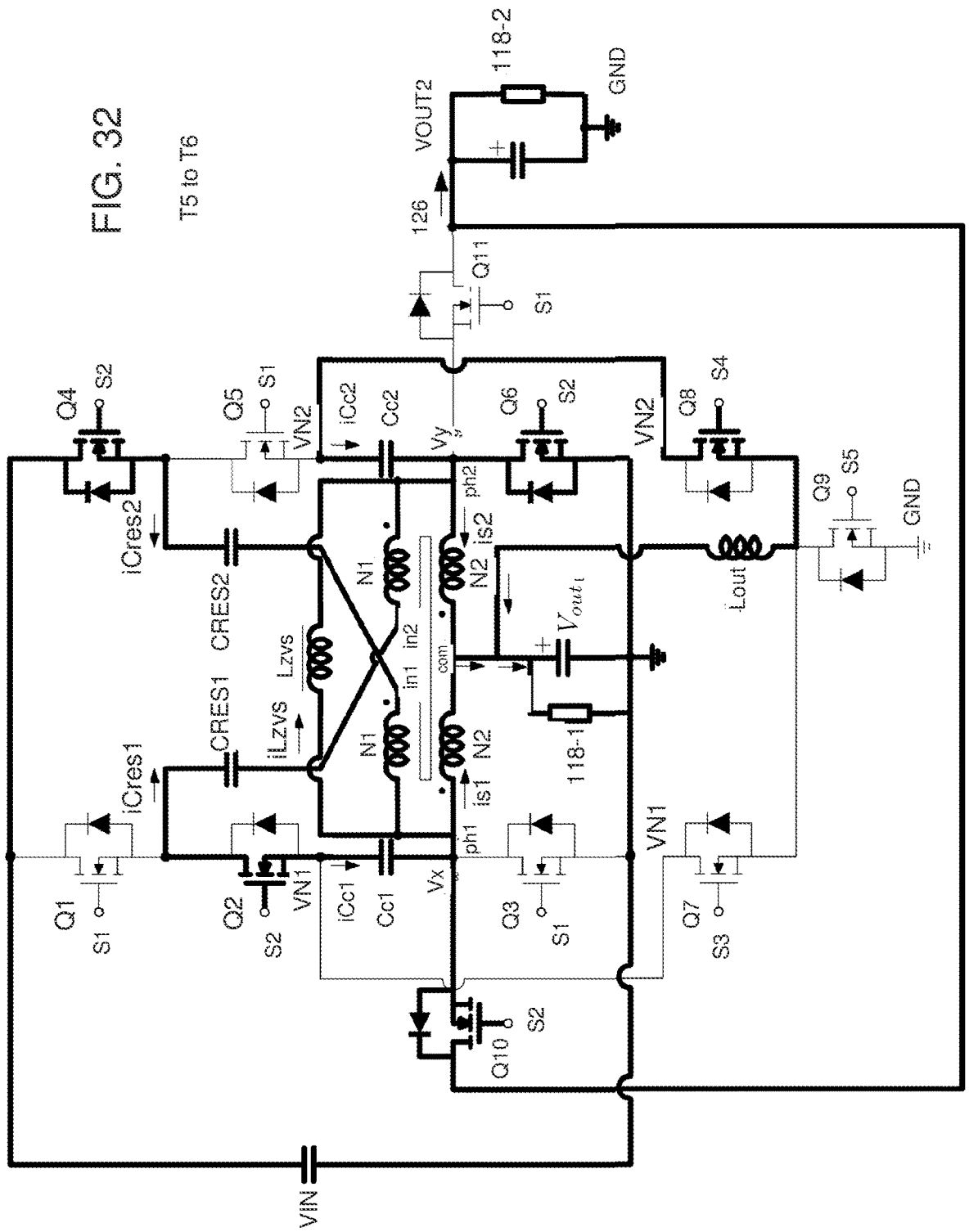
FIG. 32 is an example diagram illustrating a state of a hybrid power converter as described herein.
Figure 33:
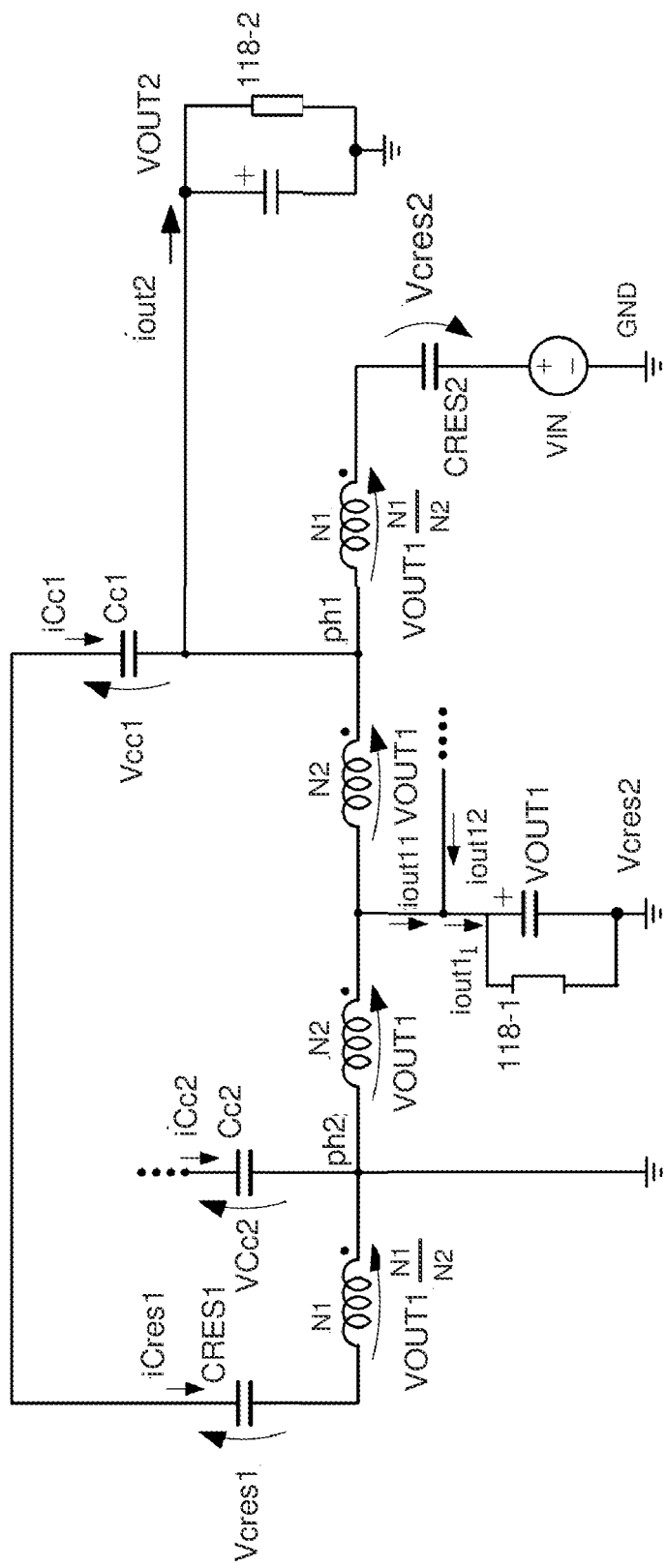
FIG. 33 is an example equivalent circuit diagram associated with the hybrid power converter as described herein.

Considering the converter reported in FIG. 26, the converter operations in one switching cycle $T_{sw}$ are described in 10 subintervals with the subintervals topological states shown in FIGS. 29-33. FIG. 29 is an example diagram illustrating a state of a hybrid power converter for time T0 to time T1 as described herein. FIG. 30 is an example equivalent circuit diagram associated with the hybrid power converter as described herein. FIG. 31 is an example diagram illustrating a state of hybrid power converters for time T1 to T2 and time T3 to T4 as described herein. FIG. 32 is an example diagram illustrating a state of a hybrid power converter for time T5 to T6 as described herein. FIG. 33 is an example equivalent circuit diagram associated with the hybrid power converter as described herein.

The four subintervals are described as follows:

1. $t_0$-$t_1$: at $t=t_0$ switches $Q_1$, $Q_3$, $Q_5$ and $Q_{11}$ are turned on in ZVS and the first resonant transition takes place between Cres and the leakage inductance of the multi-tapped autotransformer, whilst the second resonant transition takes place between $C_{res2}$ and the leakage inductance of the MTA 99. The topological state and corresponding states of switches is shown in FIG. 29. In this phase (T0 to T1), $C_{res1}$ is soft-charged from the input voltage source $V_{in}$ as reported in the equivalent circuit shown in FIG. 29. Instead, $C_{res2}$ is discharged, charging the reservoir capacitor $C_{c2}$ (flying capacitor) which is not connected to the regulated stage during this phase. In FIG. 30 is reported the equivalent circuit of the resonant tank during phase $t_0$-$t_3$. As depicted, the reservoir capacitor $C_{c2}$ is in series with $C_{res2}$, the resonant transition is not considered influenced by $C_{c2}$ under the assumption that $C_{c2}=C_{c1}>>C_{res2}=C_{res1}$.

At $t=t_0$ also switch $Q_7$ of the regulated buck converter is turned on, discharging the reservoir capacitor $C_{c1}$ (flying capacitor) while powering the load through the output inductance $L_{out}$ with a current variation which depends on the voltage across the reservoir capacitor $C_{c1}$ and the actual output voltage $V_{out_1}$.

During phase $t_0$-$t_1$, both rails $V_{out_1}$ and $V_{out_2}$ are powered as shown in the equivalent circuit reported in FIG. 30. During phase $t_0$-$t_1$, rail $V_{out_2}$ is powered from $Q_{11}$.

Considering the equivalent resonant circuit of the proposed Multi-Rail Hybrid Sigma converter reported in FIG. 30, the following equations can be derived:

$$V_{Cres2} = V_{in} - V_{out1}\left(\frac{N_1}{N_2} + 2\right) \quad (12)$$

$$2V_{out1} + V_{C_{c1}} + V_{out1}\left(\frac{N_1}{N_2} + 2\right) + V_{out1}\frac{N_1}{N_2} = V_{in} \quad (13)$$

Considering the flux balance on the inductor $L_{out}$ and considering the equivalent total duty cycle $D_{tot}=2*d$ if follows that $$V_{C_{c2}} = V_{C_{c1}} = \frac{V_{out1}}{D_{tot}}.$$

With $V_{Cres1}=V_{Cres2}$ the same equation, as derived in equation (8), can be also calculated during this phase. Hence, considering phase between $t_0$-$t_3$ and $t_5$-$t_8$ it follows that the proposed converter is a dual phase resonant converter.

Similar equations (i.e. equation 12 and equation 13) can be demonstrated with the option having the regulated converter connected to $V_{out2}$.

2. $t_1$-$t_2$: at $t=t_1$ switch $Q_7$ is turned off the power stops to flow from the reservoir capacitor $C_{C_1}$ to the buck stage. During this phase $C_{res1}$ is still soft-charged from the input voltage source $V_{in}$ and $C_{res2}$ is still getting discharge, charging the clamping capacitor $C_{c2}$.

3. $t_2$-$t_3$: at $t=t_2$ switch $Q_9$ is turned on after a dead-time started at $t=t_1$ with a duration $T_{dead}$ in order to avoid cross conduction with $Q_7$. After $t=t_2$ the inductance current is flowing through switch $Q_9$ and the output inductance is discharged with the output voltage $V_{out1}$. During this phase $C_{res1}$ is still soft-charged from the input voltage source $V_{in}$ and $C_{res2}$ is still getting discharge, charging the clamping capacitor $C_{c2}$.

4. $t_3$-$t_4$: at $t=t_3$ switches $Q_1$, $Q_3$, $Q_5$ and $Q_{11}$ are turned off and the parasitic capacitance of $Q_1$ is charged to $$V_{in}\left[1 - \frac{1}{4+2\frac{N_1}{N_2}+\frac{1}{D_{tot}}}\left(2+\frac{1}{D_{tot}}\right)\right],$$

$Q_3$ is charged to $2V_{out1}$, $Q_5$ is charged to $$V_{in}\left(1 - \frac{1}{4+2\frac{N_1}{N_2}+\frac{1}{D_{tot}}}\frac{1}{D_{tot}}\right),$$

whilst the parasitic capacitance of $Q_2$, $Q_4$, $Q_6$ and $Q_{10}$ are discharged to zero, using the inductive energy stored in the $L_{zvs}$ inductance at $t=t_3$. When the capacitance of $Q_2$, $Q_4$, $Q_6$ and $Q_{10}$ are discharged to zero their body diodes start conducts to enable ZVS turn on. The topological state is now reported in FIG. 31. During this phase the output inductance is still discharge with the output voltage $V_{out1}$ with $Q_9$ on. The current $i_{L_{zvs}}(t_3)$ that enables ZVS operation, is denoted as $i_{L_{zvs,pk}}$ which is given by the following equation:

$$I_{L_{zvs,pk}} = -\frac{V_{out1}}{2*L_{zvs}*f_{sw}} = -\frac{V_{in}}{2*L_{zvs}*f_{sw}\left(4+2\frac{N_1}{N_2}+\frac{1}{D_{tot}}\right)} \quad (14)$$

5. $t_4$-$t_5$: at $t=t_4$ switch $Q_9$ is turned off to avoid cross conduction with $Q_8$. During this phase the ZVS on the unregulated converter are not finalized yet because generally $T_{dead}>T_{dead_{HSC}}$.

6. $t_5$-$t_6$: at $t=t_5$ switch $Q_8$ is turned on after a dead-time started at $t=t_4$ with a duration $T_{dead}$ in order to avoid cross conduction with $Q_7$. Now the output inductance $L_{out}$ is charged with a slopes which depends on the voltage across the reservoir capacitor $C_{c2}$ and the actual output voltage $V_{out}$. During this phase $C_{c2}$ is discharged while $C_{c1}$ is charged in series with $C_{res1}$. In this phase also switches $Q_2$, $Q_4$, $Q_6$ and $Q_{10}$ are turned on with ZVS. After $t=t_5$ the resonant transition takes place between $C_{res1}$ and the leakage inductance of the multi-tapped autotransformer 99, whilst the second resonant mode transition takes place between $C_{res2}$ and the leakage inductance of the multi-tapped autotransformer. Similarly to phase $t_0$-$t_3$, but differently $C_{res2}$ is soft-charged from the input voltage source $V_{in}$ whilst $C_{res1}$ is soft-discharged. The topological state is refigured in FIG. 32.

7. In FIG. 33 is reported the equivalent circuit during the subintervals $t_5$-$t_8$.

Considering the equivalent resonant circuit of the proposed Hybrid Sigma converter reported in FIG. 33 the following equations can be derived:

$$V_{Cres2} = V_{in} - V_{out1}\left(\frac{N_1}{N_2}+2\right) \quad (15)$$

$$2V_{out1} + V_{C_{c1}} + V_{out1}\left(\frac{N_1}{N_2}+2\right) + V_{out1}\frac{N_1}{N_2} = V_{in} \quad (16)$$

Considering the flux balance on the inductor $L_{out}$ and considering the equivalent total duty cycle $D_{tot}=2*d$ if follows that $$V_{C_{c2}} = V_{C_{c1}} = \frac{V_{out1}}{D_{tot}}.$$

With $V_{Cres1}=V_{Cres2}$ the same equation, as derived in equation (8), can be also calculated during this phase. Hence, considering phase between $t_0$-$t_3$ and $t_5$-$t_8$ it follows that the proposed converter is a dual phase resonant converter.

8. $t_6$-$t_7$: at $t=t_6$ switch $Q_8$ is turned off the power stops to flow from the reservoir capacitor $C_{C_2}$ to the buck stage. During this phase $C_{res2}$ is still soft-charged from the input voltage source $V_{in}$ and $C_{res1}$ is still getting discharged, charging the clamping capacitor $C_{c1}$. During this phase $C_{res2}$ is still soft-charged from the input voltage source $V_{in}$ and $C_{res1}$ is still getting discharge, charging the clamping capacitor $C_{c1}$.

9. $t_7$-$t_8$: at $t=t_7$ switch $Q_9$ is turned on after a dead-time started at $t=t_6$ with a duration $T_{dead}$ in order to avoid cross conduction with $Q_8$. After $t=t_7$ the inductance current is flowing through switch $Q_9$ and the output inductance it's discharged with the output voltage $V_{out1}$. During this phase $C_{res2}$ is still soft-charged from the input voltage source $V_{in}$ and $C_{res1}$ is still getting discharge, charging the clamping capacitor $C_{c1}$.

10. $t_8$-$t_9$: at $t=t_8$ switches $Q_2$, $Q_4$, $Q_6$ and $Q_{10}$ are turned off and the parasitic capacitance of $Q_4$ is charged to $$V_{in}\left[1 - \frac{1}{4+2\frac{N_1}{N_2}+\frac{1}{D_{tot}}}\left(2+\frac{1}{D_{tot}}\right)\right],$$

$Q_6$ is charged to $2V_{out}$, $Q_2$ is charged to $$V_{in}\left(1 - \frac{1}{4+2\frac{N_1}{N_2}+\frac{1}{D_{tot}}}\frac{1}{D_{tot}}\right),$$

whilst the parasitic capacitance of $Q_1$, $Q_3$, $Q_5$ and $Q_{11}$ are discharged to zero, using the inductive energy stored in the $L_{zvs}$ inductance at $t=t_8$. When the capacitance of $Q_1$, $Q_3$, $Q_5$ and $Q_{11}$ are discharged to zero their body diodes start conducts to enable ZVS turn on. The topological state is now reported in FIG. 31. During this phase the output inductance is still discharge with the output voltage $V_{out1}$ with $Q_9$ on. The current $i_{L_{zvs}}(t_8)$ that enables ZVS operation, is denoted as $i_{L_{zvs,pk}}$ which is given by the following equation:

$$I_{L_{zvs,pk}} = \frac{V_{out1}}{2*L_{zvs}*f_{sw}} = \frac{V_{in}}{2*L_{zvs}*f_{sw}\left(4+2\frac{N_1}{N_2}+\frac{1}{D_{tot}}\right)} \quad (17)$$

The current that enables ZVS is $i_{L_{zvs}}(t_8)$ which correspond with $-i_{L_{zvs,pk}}(t_3)$. Thus $i_{L_{zvs,pk}}$ is a good index to establish when ZVS condition is achieved for all switches.

11. $t_9$-$t_{10}$: at $t=t_9$ switch $Q_9$ is turned off to avoid cross conduction with $Q_7$. During this phase the ZVS on the unregulated converter are not finalized yet because generally $T_{dead} > T_{dead_{HSC}}$. At $t=t_{11}$ switches $Q_1$, $Q_3$ and $Q_5$ are turned on in ZVS and switch $Q_7$ is turned on which correspond with one-cycle of the switching period $T_{sw}$.

Thus, in a first portion of each respective control cycle between time T0 and T1, the capacitor Cc1 (such as a flying capacitor) stores the intermediate voltage, which is used to generate the output voltage VOUT1 via activation of switch Q7 and corresponding current 125-2 through the inductor Lout. Node Vx is set to ground via activation of switch Q3. In a second portion of each respective control cycle between time T5 and T6, the capacitor Cc2 (such as a flying capacitor) stores an intermediate voltage at node VN2, which is used to generate the output voltage VOUT1 via activation of switch Q8, resulting in corresponding current 125-2 through the inductor Lout.

Also, between time T0 and T1, the controller 140 controls switch Q11 (i.e., such as part of a third power converter such as power converter 121-2) to an ON-state to convert energy received from the capacitor Cc2 and/or auto-transformer windings into a second output voltage VOUT2. The first power converter 121 derives the first output current 125-1 based at least in part via current (iCc2) conveyed through the capacitor Cc2, which also charges to the intermediate voltage of capacitor Cc2. Between time T5 and T6, the controller 140 controls switch Q10 (i.e., such as part of a third power converter such as power converter 121-2) to convert energy received from the capacitor Cc1 and/or auto-transformer windings into a second output voltage VOUT2. The first power converter 121 derives the first output current 125-1 via current (iCc1) conveyed through the capacitor Cc1, which also charges the capacitor Cc2.

In accordance with a further perspective of the power supply as discussed herein, and as previously discussed, the capacitor Cc1 such as an energy storage device stores an intermediate voltage. The controller 140 switches the capacitor Cc1 in and out of a respective circuit path (such as series circuit path switch Q2 and capacitor Cc1) of the first power converter 121. Between T0 and T1, the capacitor Cc1 is discharged while switched out of the circuit path when switch Q7 is activated to supply current to inductor Lout. Between time T5 and T6, the capacitor Cc1 is charged based on the capacitor Cc1 being switched into the circuit path via activation of switch Q2. The controller 140 activates the switch Q2 to an ON-state to switch the capacitor Cc1 into the circuit path (series circuit path switch Q2 and capacitor Cc1). Further, between time T5 and T6, the controller 140 activates switch Q10 to produce a second output voltage VOUT2 outputted from a second output node 138 via energy received from the capacitor Cc1 while the capacitor Cc1 is switched in the circuit path.

Between at least time T0 and T1, the controller 140 deactivates the switch Q10 to prevent a flow of energy through the switch Q10 to the second output node 138 during a portion of the control cycle during which the capacitor Cc1 is switched out of the circuit path (series circuit path switch Q2 and capacitor Cc1).

Additionally, it is noted based on the above operation and description that the power supply 100-1 includes a capacitor Cc1 switched (via switch Q2) in and out of a series circuit path (such as series circuit path including capacitor Cres1, capacitor Cc1, and windings of transformer 99). The power supply 100-1 includes a first power converter 121 (such as switches Q1 to Q6, capacitors Cres1, Cres2, Cc1, Cc2, transformer 99), a second power converter 121-2 (such as components including switches Q10 and Q11), and a third power converter 122 (such as components including switches Q7, Q8, Q9, and inductor Lout).

In one example, the first power converter is operative to, during a first portion of a control cycle (see first portion of control cycle in FIG. 32 and between time T5 and T6 when switches Q2, Q4, and Q6 are ON) during which the capacitor Cc1 is switched into the series circuit path (such as components capacitors Cres1, Cc1, and transformer 99 in series), produce the first output voltage VOUT1 to power a first load 118-1. The second power converter is operative to, during the first portion of the control cycle (between time T5 and T6) during which the capacitor Cc1 is switched into the series circuit path, produce a second output voltage VOUT2 to power the second load 118-2. The third power converter is operative to, during a second portion of a control cycle (see FIG. 29 and between time T0 and T1 when switch Q7 is ON) during which the capacitor Cc1 is switched out of the series circuit path, convert an intermediate voltage stored in the capacitor Cc1 into the first output voltage VOUT1 to power the load 118-1.

Yet further, as previously discussed, a flow of current through the capacitor Cc1 and the series circuit path during the first portion of the control cycle (T5 to T6) contributes to generation of both the first output voltage VOUT1 and the second output voltage VOUT2.

The third power converter can be configured to include a switch Q7 coupled to a first node of the capacitor Cc1. Activation of the switch Q7 is operative to convey an intermediate voltage stored in the capacitor Cc1 to an inductor Lout of the power supply 100-1 outputting the first output voltage VOUT1 to the first load 118-1 during the second portion of the control cycle (T0 to T1).

In accordance with still further examples, the controller 140 as discussed herein is operative to produce a first switch control signal S2 to control a switch Q2 of the first power converter; switching of the first switch Q2 ON and OFF based on the switch control signal S2 is operative to switch the capacitor Cc1 in and out of the series circuit path to generate the first output voltage VOUT1. The switch control signal S2 is also operative to control a switch Q10 disposed in the second power converter (such as components Q10 and Q11). Switching of the switch Q10 ON and OFF via the switch control signal S2 generates the second output voltage VOUT2. More specifically, the controller is further operative to generate the switch control signal S2 to a first state (logic high) to activate each of the switch Q2 and the switch Q10 to an ON-state during the first portion of the control cycle (T5 to T6). The controller 140 is operative to generate the switch control signal S2 to a second state (logic low) during the second portion of the control cycle (T0 to T1) to deactivate each of the switch Q2 and the switch Q10 to an OFF-state.

Figure 34:
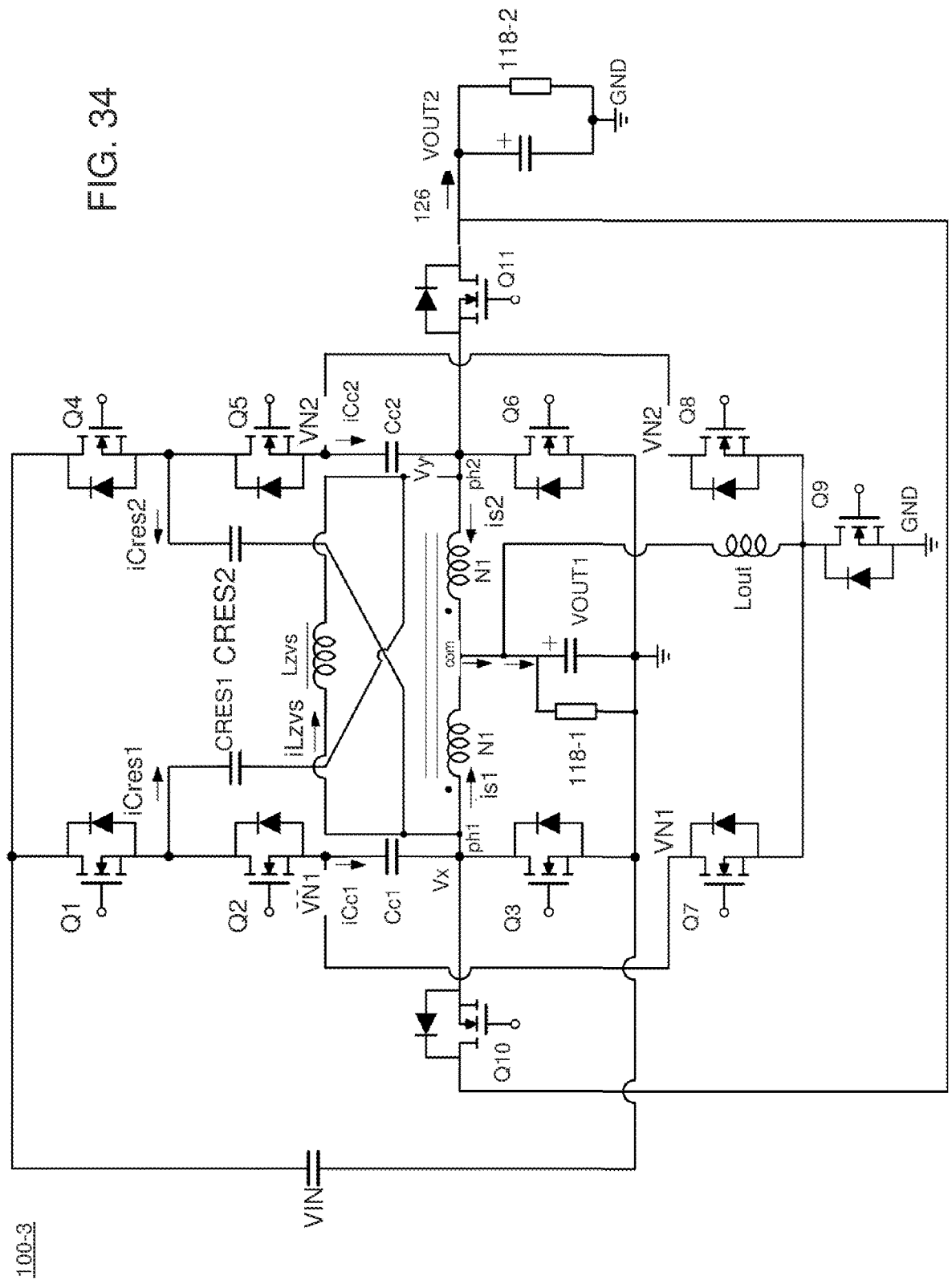
FIG. 34 is an example power converter including an unregulated multi-rail hybrid switched capacitor dual phase resonant converter as described herein.

FIG. 34 is an example power converter including an unregulated multi-rail hybrid switched capacitor dual phase resonant converter as described herein.

As shown in FIG. 34, the power converter 100-2 is a Multi Rail Hybrid Sigma converter implemented with a Hybrid Switched capacitor dual-phase resonant converter as unregulated stage. The unregulated converter performs by design at a fixed ratio having two windings fully coupled with the same turns.

The converter shown in FIG. 34 can be referred to the generalized concept of the proposed power converter in FIG. 26. The unregulated converter is a dual-phase hybrid resonant switched capacitor converter. As mentioned in the general invention, the converter comprises two general blocks: an unregulated converter and a regulated converter. Similar control strategy, as proposed in FIGS. 10 and 11 can be used for this power supply 100-3.

unregulated Hybrid Switched capacitor converter: formed by an interleaved flying capacitor structure connected to an autotransformer (i.e. having two windings with $N_1$ turns connected as shown in FIG. 34). An additional inductance in parallel with the autotransformer is added to achieve zero voltage switching (ZVS) for all MOSFETs. This inductance can be integrated in the autotransformer (i.e. as magnetizing inductance). All switches can be divided into two switch groups: the first switch group is formed by $Q_1$, $Q_3$ $Q_5$ and $Q_{11}$ (control logic $PWM_H$ as shown in FIG. 8), and the second switch group ($Q_2$, $Q_4$, $Q_6$, $Q_{10}$) is commanded by a 180° phase shifted PWM signal (control logic $PWM_L$ as shown in FIG. 33) with respect to the first group having the same duty cycle. The converter operates with a fixed duty cycle ideally near 50% to obtain a minimum RMS current. Two additional reservoir capacitors $C_{c1}$ and $C_{c2}$ are added to act as source voltage for the regulated stage respectively between $Q_2$ $Q_3$ and $Q_5$ $Q_6$.

regulated buck converter: comprises 3 FETs $Q_7$ (control logic $PWM_{H_1}$), $Q_B$ (control logic $PWM_{H_2}$) and $Q_9$ (control logic $PWM_{L_{12}}$) and an output inductance Lou. MOSFET $Q_7$ and $Q_B$ are acting as high side FET sharing the same MOSFET low side $Q_9$.

Figure 35:
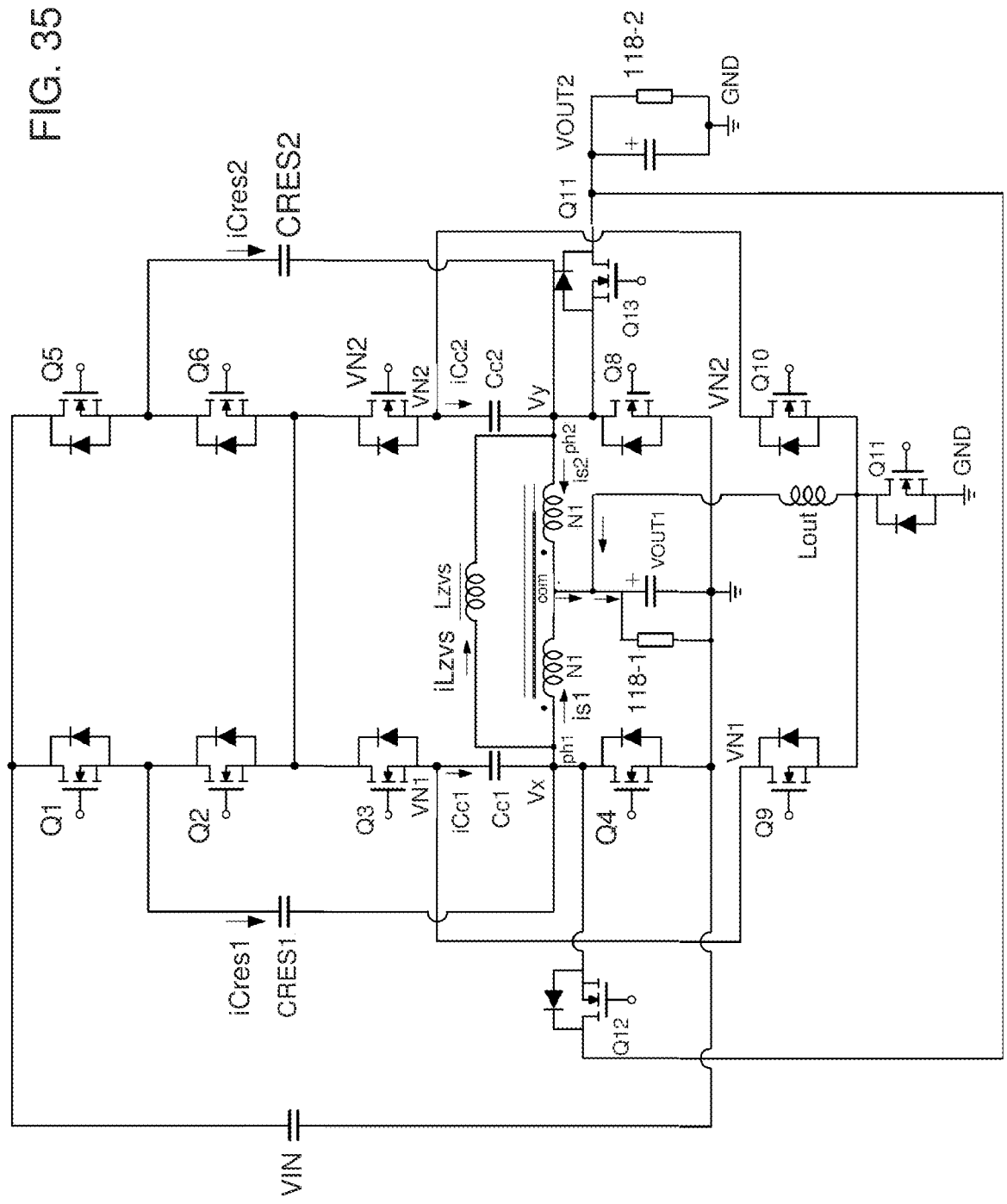
FIG. 35 is an example diagram of a multi-rail hybrid power converter with unregulated multi-rail hybrid switched capacitor dual phase resonant circuits as described herein.

FIG. 35 is an example diagram of a multi-rail hybrid power converter with unregulated multi-rail hybrid switched capacitor dual phase resonant circuits as described herein.

To use a better figure of merit (FOM) for the FETs of the converter reported in FIG. 34, an alternative solution is proposed in FIG. 35, which shows an Hybrid Sigma converter implemented with an Hybrid Switched capacitor dual-phase resonant converter as unregulated stage. The unregulated converter performs by design at a fixed ratio having two windings fully coupled with the same turns.

unregulated Hybrid Switched capacitor converter: formed by an interleaved flying capacitor structure connected to an autotransformer (i.e. having two windings with $N_1$ turns). An additional inductance in parallel with the autotransformer is added to achieve zero voltage switching (ZVS) for all MOSFETs. This inductance can be integrated in the autotransformer (i.e. as magnetizing inductance). All switches can be divided into two switch groups: the first switch group is formed by $Q_1$, $Q_3$, $Q_6$, $Q_8$ and $Q_{12}$ (control logic $PWM_H$ as shown in FIG. 33 and other FIGS.), and the second switch group ($Q_2$, $Q_4$, $Q_5$, $Q_7$ and $Q_{13}$) is commanded by a 180° phase shifted PWM signal (control logic $PWM_L$ as shown in FIG. 11) with respect to the first group having the same duty cycle. The converter operates with a fixed duty cycle ideally near 50% to obtain a minimum RMS current. Two additional reservoir capacitor $C_{c1}$ and $C_{c2}$ are added to act as source voltage for the regulated stage respectively between $Q_3$ $Q_4$ and $Q_7$ $Q_8$.

regulated buck converter: comprises 3 FETs $Q_9$ (control logic $PWM_{H_1}$), $Q_{10}$ (control logic $PWM_{H_2}$) and $Q_{11}$ (control logic $PWM_{L_{12}}$) and an output inductance $L_{out}$. MOSFET $Q_9$ and $Q_{10}$ are acting as high-side FET sharing the same MOSFET low-side $Q_{11}$.

Figure 36:
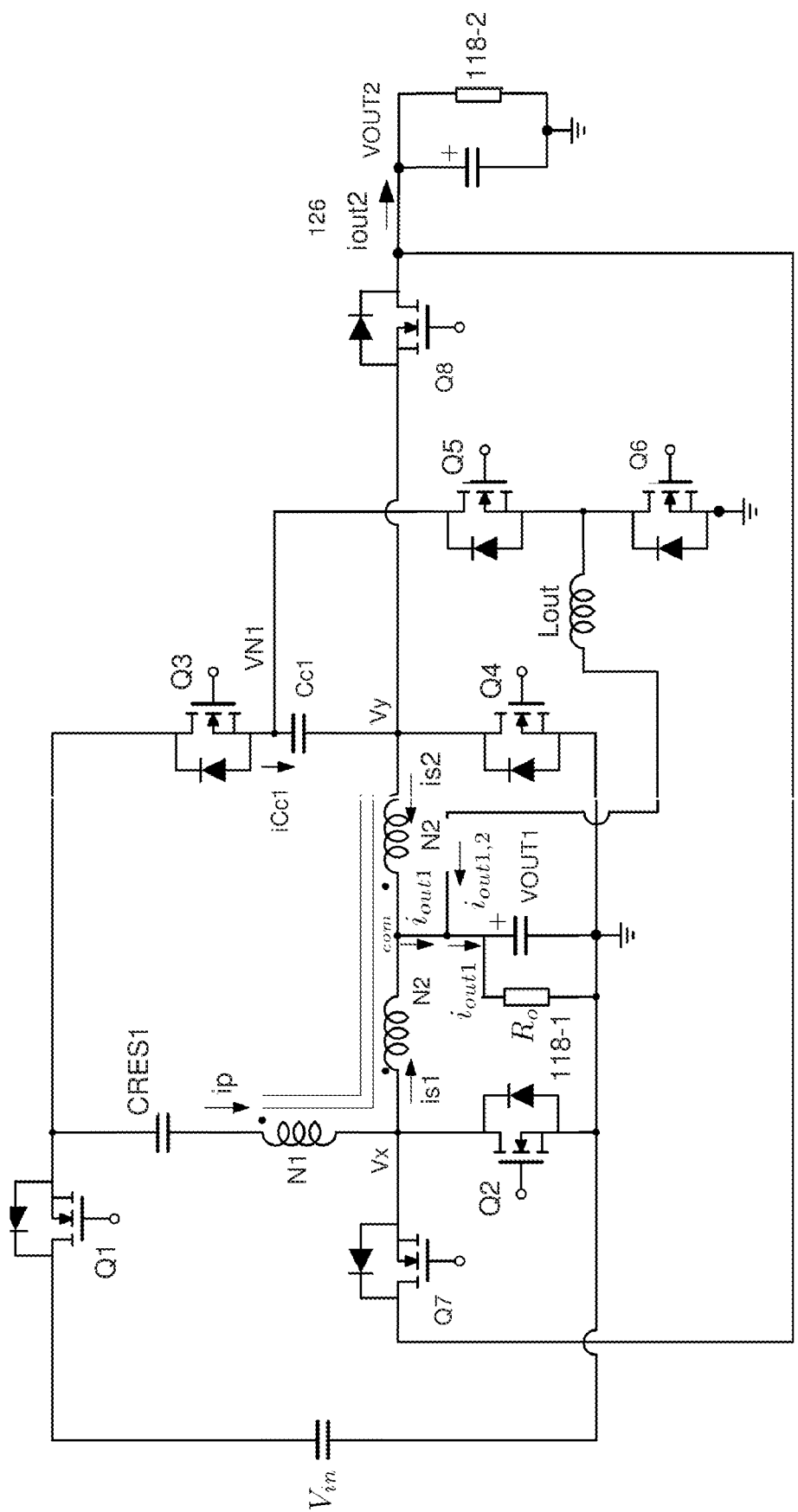
FIG. 36 is an example diagram illustrating a multi-rail hybrid power converter as described herein.

FIG. 36 is an example diagram illustrating a multi-rail hybrid power converter as described herein.

In general, FIG. 36 shows a $3^{rd}$ example using an Hybrid Switched capacitor mono-phase resonant converter as unregulated stage. The unregulated stage performs by design at a variable ratio dependent on the actual ratio between $N_1$ and $N_2$, where the three windings are fully coupled. The Multi Rail Hybrid Sigma converter in FIG. 36 can be configured to include an unregulated Multi Rail Hybrid Switched capacitor mono-phase resonant converter having variable designed voltage ratio (i.e. designing the ratio between $N_1$ and $N_2$).

unregulated Hybrid Switched capacitor converter: formed by a flying capacitor structure connected to an autotransformer (i.e. having one winding with $N_1$ turns and two windings with $N_2$ turns). An additional inductance in parallel with the autotransformer can be added to achieve zero voltage switching (ZVS) for all MOSFETs (i.e. between node $v_x$ and node $v_y$). This inductor can be integrated in the autotransformer (i.e. as magnetizing inductance). All switches can be divided into two switch groups: the first switch group is formed by $Q_1$, $Q_4$ and $Q_7$ (control logic $PWM_H$), and the second switch group ($Q_2$, $Q_3$ and $Q_8$) is commanded by a 180° phase shifted PWM (control logic $PWM_L$ as shown in FIG. 8) with respect to the first group having the same duty cycle. The converter operates with a fixed duty cycle ideally near 50% to obtain a minimum RMS current. An additional reservoir capacitor $C_{c1}$ is added to act as source voltage for the regulated stage between $Q_3$ and $Q_4$.

regulated buck converter: comprises 2 FETs $Q_5$ (control logic $PWM_{H_1}$), $Q_6$ (control logic $PWM_{L_1}$=inverted ($PWM_{H_1}$)) and an output inductance Lout. MOSFET $Q_5$ is acting as high-side FET with MOSFET low-side $Q_6$.

Figure 37:
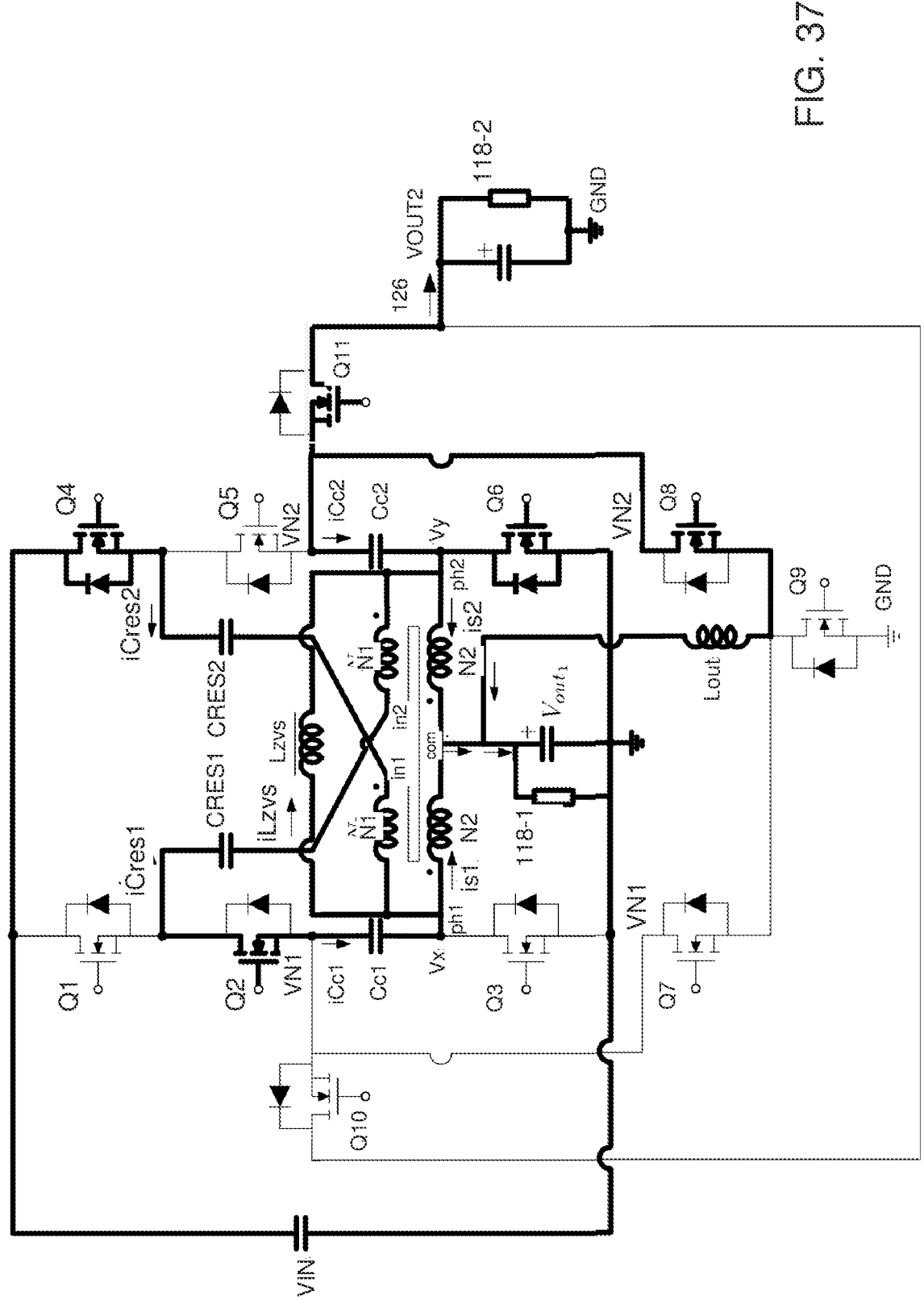
FIG. 37 is an example hybrid power converter with an active synchronous rectifier as described herein.
Figure 38:
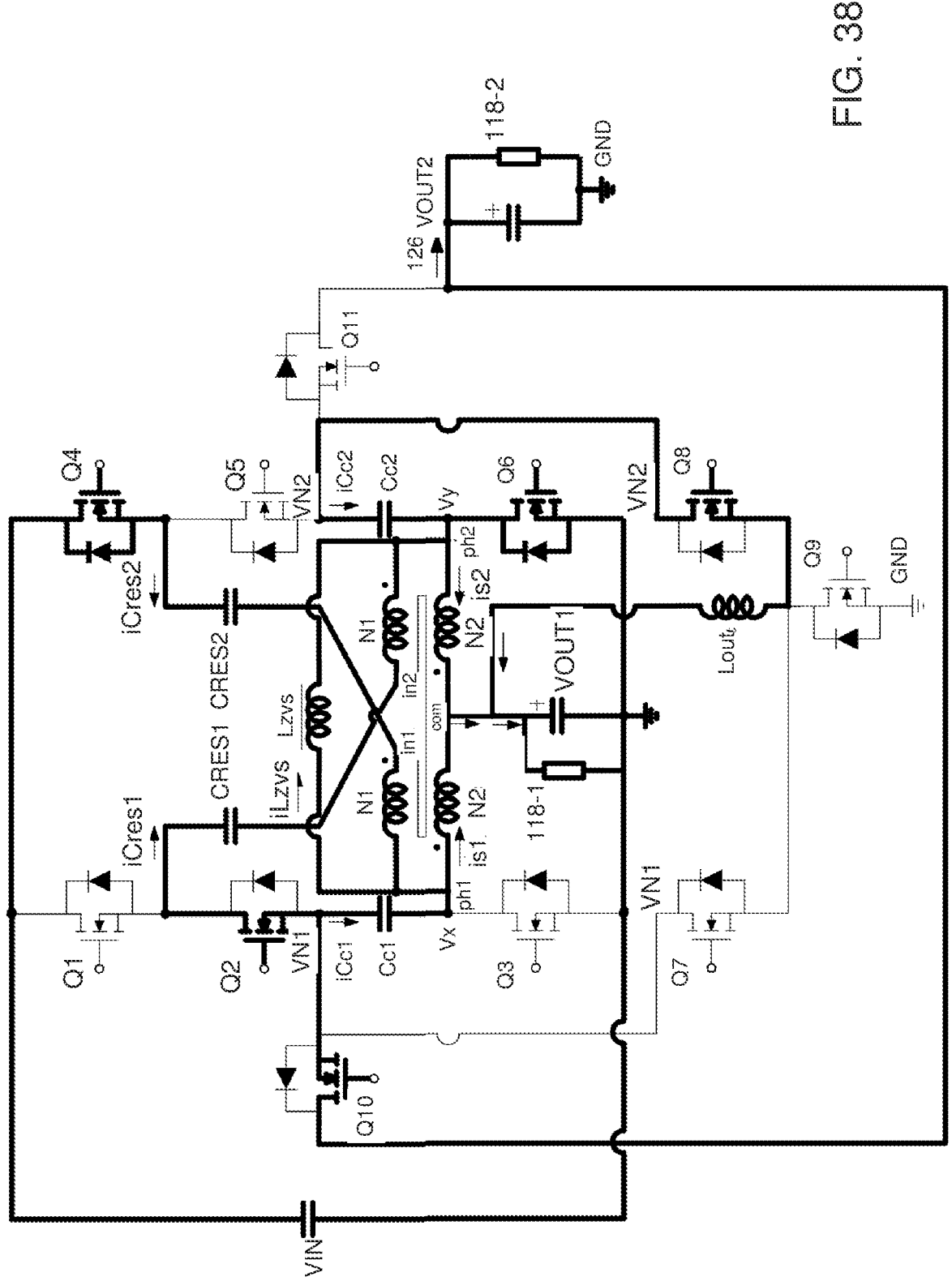
FIG. 38 is an example hybrid power converter with a non-active synchronous rectifier as described herein.

FIG. 37 and is an example hybrid power converter with an active synchronous rectifier as described herein. FIG. 38 is an example hybrid power converter with a non-active synchronous rectifier as described herein.

More specifically, FIG. 37 is an example of M-SHSC with synchronous rectifier active, corresponded to sigma capacitor C_cx and pass-transistor for V_out2 connected to positive potential of C_cx.

As previously discussed, the regulated stage can be designed with different regulated topologies (i.e. buck derived topologies, buck-boost derived topologies and boost derived topologies). Moreover, such regulated stage can be connected to either $V_{out1}$ or $V_{out2}$.

The pass-transistor MOSFETs (the two MOSFETs directly connected to $V_{out2}$) can also be connected to capacitors $C_{c1}$ and $C_{c2}$ in each aforementioned topology. In this way, one can chose to activate the pass-transistors in two cases:
1. When the corresponding unregulated converter's synchronous rectifier is active, i.e. when the sigma capacitors $C_{c1}$ or $C_{c2}$ is connected to GND on one side through the respective synchronous rectifier, as in FIG. 37. In this case $V_{out2}=V_{cc1}=V_{cc2}=V_{out1}/D$.
2. In the symmetric situation, i.e. when the corresponding synchronous rectifier is in the OFF state, as in FIG. 38. In this case $V_{out2}=(2+1/D)\cdot V_{out1}$.

As shown, there are many possibilities in terms of achievable voltage on the second rail.

Accordingly, a benefit of the of the multi-rail Hybrid Switched capacitor converter as discussed herein is the capability to supply, at high efficiency and high power density two rails, where the size of the magnetic is defined by the rail at lowest voltage (i.e. small core size can be used).

Note again that techniques herein are well suited for use in circuit applications such as those that that generate an output voltage to power a load. However, it should be noted that examples herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred examples thereof, it will be understood by those skilled in the art that various changes in form and details may be made therein without departing from the spirit and scope of the present application as defined by the appended claims. Such variations are intended to be covered by the scope of this present application. As such, the foregoing description of examples of the present application is not intended to be limiting. Rather, any limitations to the invention are presented in the following claims.

The invention claimed is:

1. An apparatus comprising:
a first power converter operative to: i) derive a first output current from an input voltage, and ii) convert the input voltage into an intermediate voltage;
a second power converter operative to produce a second output current based on the intermediate voltage, the intermediate voltage supplied from a first node of the first power converter to the second power converter, the first node disposed in a resonant circuit path of the first power converter; and
an output node operative to output a summation of the first output current and the second output current to produce a first output voltage.

2. The apparatus as in claim 1, wherein the first power converter is operative to derive the first output current based at least in part on third current conveyed through a capacitor, the capacitor operative to store the intermediate voltage.

3. The apparatus as in claim 2 further comprising:
a third power converter operative to produce a second output voltage based at least in part on the first output current, the first output current supplied from the capacitor.

4. The apparatus as in claim 1, wherein the first power converter includes a capacitor to store the intermediate voltage; and
wherein the capacitor is a flying capacitor disposed in the resonant circuit path of the first power converter.

5. The apparatus as in claim 4, wherein the flying capacitor is switched in and out of the resonant circuit path to produce the first output current and generate the intermediate voltage.

6. The apparatus as in claim 1 further comprising:
an energy storage device to store the intermediate voltage; and
a controller operative to switch the energy storage device in and out of the resonant circuit path of the first power converter, the energy storage device charged while switched into the resonant circuit path, the energy storage device discharged while switched out of the resonant circuit path.

7. The apparatus as in claim 6, wherein the output node is a first output node, the apparatus further comprising:
a first switch coupled to the energy storage device and controlled by the controller, the first switch operative to produce a second output voltage outputted from a second output node via energy received from the energy storage device while the energy storage device is switched into the resonant circuit path during a first portion of a control cycle.

8. The apparatus as in claim 7, wherein the controller is operative to prevent a flow of energy through the first switch to the second output node during a second portion of the control cycle during which the energy storage device is switched out of the resonant circuit path.

9. The apparatus as in claim 8, wherein the resonant circuit path includes a second switch, the second switch disposed in series with the energy storage device; and wherein the controller is operative to activate the second switch to an ON-state to switch the energy storage device into the resonant circuit path.

10. The apparatus as in claim 1, wherein the resonant circuit path of the first power converter includes a first switch, the first switch operative to control a flow of third current through the first node of the first power converter.

11. The apparatus as in claim 10, wherein the flow of the third current is operative to charge a first capacitor disposed in the resonant circuit path of the first power converter.

12. The apparatus as in claim 11, wherein the first capacitor is a flying capacitor disposed in the resonant circuit path of the first power converter.

13. The apparatus as in claim 1, wherein the first power converter is a hybrid switched capacitor converter; and wherein the second power converter is a buck converter.

14. The method as in claim 1, wherein the first power converter is an unregulated power converter, and wherein the second power converter is a regulated power converter.

15. The apparatus as in claim 1 further comprising:
an energy storage device disposed in the resonant circuit path between the first node of the first power converter and a second node of the first power converter, the energy storage device operative to store the intermediate voltage.

16. An apparatus comprising:
a first power converter operative to: i) derive a first output current from an input voltage, and ii) convert the input voltage into an intermediate voltage;
a second power converter operative to produce a second output current based on the intermediate voltage:
an output node operative to output a summation of the first output current and the second output current to produce a first output voltage;
an energy storage device operative to store the intermediate voltage;
wherein the first power converter is operative to produce the first output current based at least in part via current supplied from a first node of the energy storage device; and
wherein the second power converter is operative to receive the intermediate voltage from a second node of the energy storage device while the first node is switched to a reference voltage.

17. A method comprising:
via a first power converter: i) deriving a first output current from an input voltage, and ii) converting the input voltage into an intermediate voltage;
via a second power converter, producing a second output current based on the intermediate voltage, the intermediate voltage stored in a flying capacitor disposed in the first power converter; and
outputting a summation of the first output current and the second output current from an output node.

18. The method as in claim 17 further comprising:
via the first power converter, deriving the first output current via current conveyed through the flying capacitor.

19. The method as in claim 18 further comprising:
via a third power converter, producing a second output voltage based at least in part on the current conveyed through the flying capacitor.

20. The method as in claim 17 further comprising:
controlling multiple switches disposed in the first power converter and the second power converter based on a first control mode and a second control mode;
wherein control of the multiple switches in the first control mode is operative to charge the flying capacitor via control of a first switch to an ON-state and control of a second switch to an OFF-state; and
wherein control of the multiple switches in the second mode is operative to discharge the flying capacitor via control of the first switch to an OFF-state and control of the second switch to an ON-state.

21. An apparatus comprising:
a capacitor switched in and out of a series circuit path of a power supply including a first power converter, a second power converter, and a third power converter;
the first power converter operative to, during a first portion of a control cycle during which the capacitor is switched into the series circuit path, produce a first output voltage to power a first load;
the second power converter operative to, during the first portion of the control cycle during which the capacitor is switched into the series circuit path, produce a second output voltage to power a second load; and
the third power converter operative to, during a second portion of the control cycle during which the capacitor is switched out of the series circuit path, produce the first output voltage to power the first load.

22. The apparatus as in claim 21, wherein a flow of current through the capacitor and the series circuit path during the first portion of the control cycle contributes to generation of both the first output voltage and the second output voltage.

23. The apparatus as in claim 22, wherein the third power converter includes a switch coupled to a first node of the capacitor, the switch operative to convey an intermediate voltage stored in the capacitor to an inductor of the power supply outputting the first output voltage to the first load during the second portion of the control cycle.

24. The apparatus as in claim 21 further comprising:
a controller operative to produce a first switch control signal to control a first switch of the first power converter, switching of the first switch ON and OFF based on the first switch control signal operative to switch the capacitor in and out of the series circuit path to generate the first output voltage; and
wherein the first switch control signal is operative to control a second switch disposed in the second power converter, switching of the second switch ON and OFF via the first switch control signal operative to generate the second output voltage.

25. The apparatus as in claim 24, wherein the controller is further operative to generate the first switch control signal to a first state to activate each of the first switch and the second switch to an ON-state during the first portion of the control cycle; and
wherein the controller is operative to generate the first switch control signal to a second state to deactivate each of the first switch and the second switch to an OFF-state during the second portion of the control cycle.

* * * * *